(12) United States Patent
Seok et al.

(10) Patent No.: US 12,526,121 B2
(45) Date of Patent: Jan. 13, 2026

(54) METHOD AND DEVICE FOR TRANSMITTING SIGNALS IN WIRELESS COMMUNICATION SYSTEM

(71) Applicant: WILUS INSTITUTE OF STANDARDS AND TECHNOLOGY INC., Gyeonggi-do (KR)

(72) Inventors: Geunyoung Seok, Gyeonggi-do (KR); Minseok Noh, Gyeonggi-do (KR); Youngjoon Yoon, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 19/200,412

(22) Filed: May 6, 2025

(65) Prior Publication Data
US 2025/0266979 A1    Aug. 21, 2025

Related U.S. Application Data

(63) Continuation of application No. PCT/KR2023/017665, filed on Nov. 6, 2023.

(30) Foreign Application Priority Data

Nov. 6, 2022   (KR) .................. 10-2022-0146616
Nov. 6, 2022   (KR) .................. 10-2022-0146617
Dec. 16, 2022  (KR) .................. 10-2022-0177634
Jan. 6, 2023   (KR) .................. 10-2023-0002533

(51) Int. Cl.
*H04L 5/14*      (2006.01)
*H04L 1/1867*    (2023.01)

(52) U.S. Cl.
CPC .............. *H04L 5/14* (2013.01); *H04L 1/1867* (2013.01)

(58) Field of Classification Search
CPC ................................. H04L 5/14; H04L 1/1867
USPC ........................................................ 370/329
See application file for complete search history.

(56) References Cited

U.S. PATENT DOCUMENTS

2021/0352667 A1   11/2021   Abotab et al.
2023/0224880 A1    7/2023   Xiong et al.

FOREIGN PATENT DOCUMENTS

WO    2023/172418    9/2023
WO    2024/096716    5/2024

OTHER PUBLICATIONS

International Search Report for PCT/KR2023/017665 mailed on Feb. 19, 2024 and its English translation from WIPO (published as WO2024/096716).
Written Opinion of the International Searching Authority for PCT/KR2023/017665 mailed on Feb. 19, 2024 and its English translation by Google Translate (published as WO2024/096716).
(Continued)

*Primary Examiner* — Angel T Brockman
(74) *Attorney, Agent, or Firm* — WOMBLE BOND DICKINSON (US) LLP

(57) ABSTRACT

The present invention relates to a wireless communication system and, more specifically, to a method wherein resource allocation information for downlink reception or uplink transmission is acquired, and if the downlink reception or uplink transmission is required on a sub-band slot/symbol, the downlink reception or uplink transmission is performed in consideration of sub-band operations, and a wireless device therefor.

16 Claims, 28 Drawing Sheets

(56) References Cited

OTHER PUBLICATIONS

Spreadtrum Communications: "Discussion on subband non-overlapping full duplex", 3GPP TSG RAN WG1 #110bis-e, R1-2208552, e-Meeting, Sep. 30, 2022, pp. 1-15.
CATT: "Discussion on subband non-overlapping full duplex", 3GPP TSG RAN WG1 #110bis-e, R1-2208974, e-Meeting, Sep. 30, 2022, pp. 1-15.
Qualcomm Incorporated: "Feasibility and techniques for Subband non-overlapping full duplex", 3GPP TSG RAN WG1, Meeting #111, R1-2212115, Toulouse, France, Nov. 5, 2022, pp. 1-42.
NTT Docomo, Inc.: "Discussion on subband non-overlapping full duplex", 3GPP TSG RAN WG1 #110bis-e, R1-2209902, e-Meeting, Sep. 30, 2022, pp. 1-17.

Unavailable for PDSCH transmission

Unavailable for PDSCH transmission

SBFD operation is released in slot n+1 via SFI

SFI to release SBFD operation is detected in slot n+1

(a)

SFI to release SBFD operation is not detected in slot n+1

(b)

METHOD AND DEVICE FOR TRANSMITTING SIGNALS IN WIRELESS COMMUNICATION SYSTEM

This application is a continuation of International Patent Application No. PCT/KR2023/017665 filed on Nov. 6, 2023, which claims the priority to Korean Patent Application No. 10-2022-0146616 filed in the Korean Intellectual Property Office on Nov. 6, 2022, Korean Patent Application No. 10-2022-0146617 filed in the Korean Intellectual Property Office on Nov. 6, 2022, Korean Patent Application No. 10-2022-0177634 filed in the Korean Intellectual Property Office on Dec. 16, 2022, and Korean Patent Application No. 10-2023-0002533 filed in the Korean Intellectual Property Office on Jan. 6, 2023, the entire contents of which are incorporated herein by reference.

TECHNICAL FIELD

The disclosure relates to a wireless communication system. Particularly, the disclosure relates to a method of transmitting a signal in a wireless communication system, and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IOT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

An aspect of the present disclosure is to provide a method for efficiently transmitting and receiving a signal in a wireless communication system and a device using the same.

Solution to Problem

In an aspect of the disclosure, a user equipment (UE) used in a wireless communication system including a communication module and a processor configured to control the communication module is provided, and the processor is configured to acquire resource allocation information for downlink reception or uplink transmission, and perform the downlink reception or the uplink transmission by considering a sub-band operation when the downlink reception or the uplink transmission is required on a sub-band slot/symbol.

Preferably, resource block group (RBG)-based resource allocation information is received and a physical downlink shared channel (PDSCH) based on the resource allocation information is received, but when the PDSCH is received in a subband non-overlapping full duplex (SBFD) slot/symbol, interpretation of the resource allocation information may be performed based on the sub-band configuration within the SBFD slot/symbol.

Preferably, when a PDSCH is repeated in multiple slots/symbols, the multiple slots/symbols include SBFD slots/symbols and non-SBFD slots/symbols, and the frequency resource of the PDSCH in the SBFD slot/symbol overlaps with an uplink (UL) subband, the reception of the PDSCH in the non-SBFD slot/symbol may be restricted in the frequency resource corresponding to the UL subband of the SBFD slot/symbol.

Preferably, a channel state information reference signal (CSI-RS) is received by an SBFD slot/symbol, but the SBFD slot/symbol may be divided into multiple CSI-subbands (SBs), a channel may be measured/reported per CSI-SB unit for the CSI-SB within a downlink (DL) subband, and a channel may be measured/reported only for the RB that overlaps with the DL subband among CSI-SBs for the CSI-SB that overlaps both the UL subband and the DL subband.

Preferably, a physical uplink shared channel (PUSCH) is transmitted on an SBFD slot/symbol, but when the SBFD slot/symbol corresponds to a downlink slot/symbol according to a time division duplex (TDD) configuration, the PUSCH may be restricted from transmission in a DL subband and a guard band, and when the SBFD slot/symbol corresponds to a flexible slot/symbol according to the TDD configuration, the PUSCH may be allowed to be transmitted in a DL subband and a guard band.

Preferably, information on a resource set is received through a higher layer signal, and when a PUSCH is transmitted in the SBFD slot/symbol, and the SBFD slot/symbol corresponds to a downlink slot/symbol or a flexible slot/symbol according to a TDD configuration, the PUSCH may be rate-matched based on the resource set, and when a PUSCH is transmitted in a non-SBFD slot/symbol, the PUSCH may not be rate-matched based on the resource set.

Preferably, when a symbol in which a synchronization signal and physical broadcast channel (SS/PBCH) block is configured and a symbol allocated for PUSCH repeated transmission overlap on an SBFD slot/symbol, at least a part of the PUSCH repeated transmission may be restricted based on the overlapping symbol.

Preferably, when a symbol in which a synchronization signal and physical broadcast channel (SS/PBCH) block is configured and a symbol allocated for physical uplink control channel (PUCCH) transmission overlap on an SBFD slot/symbol, at least a part of the PUCCH transmission is restricted based on the overlapping symbol.

Preferably, PUSCH repeated transmission is performed in multiple slots/symbols and an HARQ process number (HPN) is determined for each PUSCH repetition, but when a PUSCH repetition is located on an SBFD slot/symbol, the HPN of the PUSCH repetition may be determined by considering the frequency resource of the PUSCH repetition and the sub-band configuration within the SBFD slot/symbol.

Advantageous Effects of Invention

The present disclosure provides a method for efficiently transmitting and receiving a signal in a wireless communication system and a device using the same.

The effects that can be obtained from the disclosure are not limited to the effects mentioned above, and other effects that are not mentioned will be clearly understood by those skilled in the art to which the disclosure belongs from the description below.

MODE FOR CARRYING OUT THE INVENTION

Figure 1:
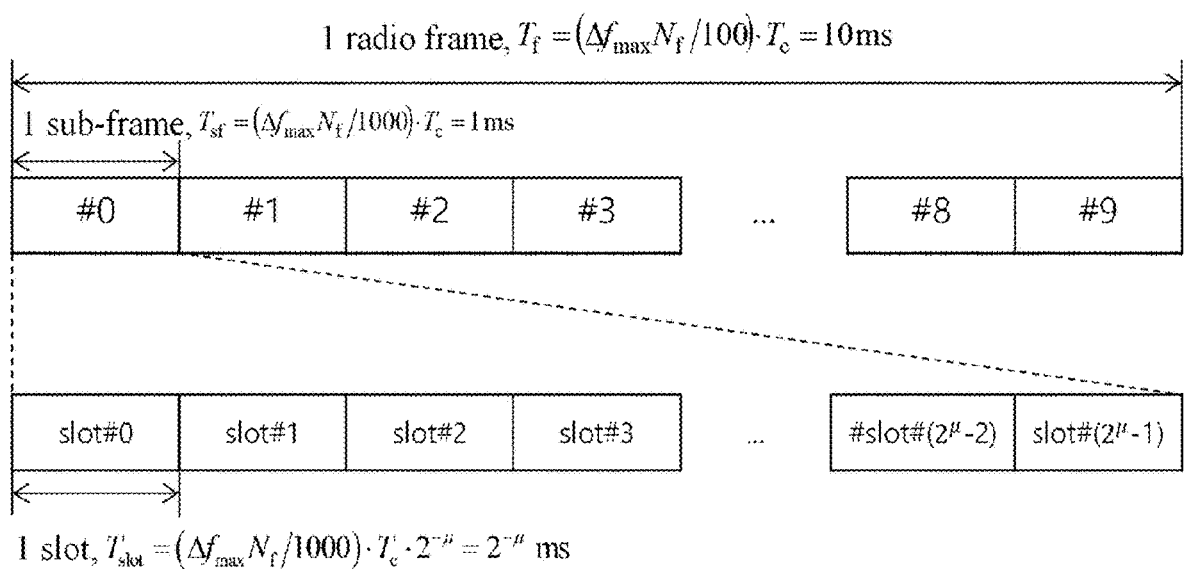
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max} = 480 * 10^3$ Hz, $N_f = 4096$, $T_c = 1/(\Delta f_{ref} * N_{f,ref})$, $\Delta f_{ref} = 15 * 10^3$ Hz, and $N_{f,ref} = 2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15 * 2^\mu$ kHz, and $\mu$ can have a value of $\mu = 0 \sim 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu - 1$ may be respectively allocated to $2^\mu$ slots within one wireless frame. In addition, numbers from 0 to $10 * 2^\mu - 1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
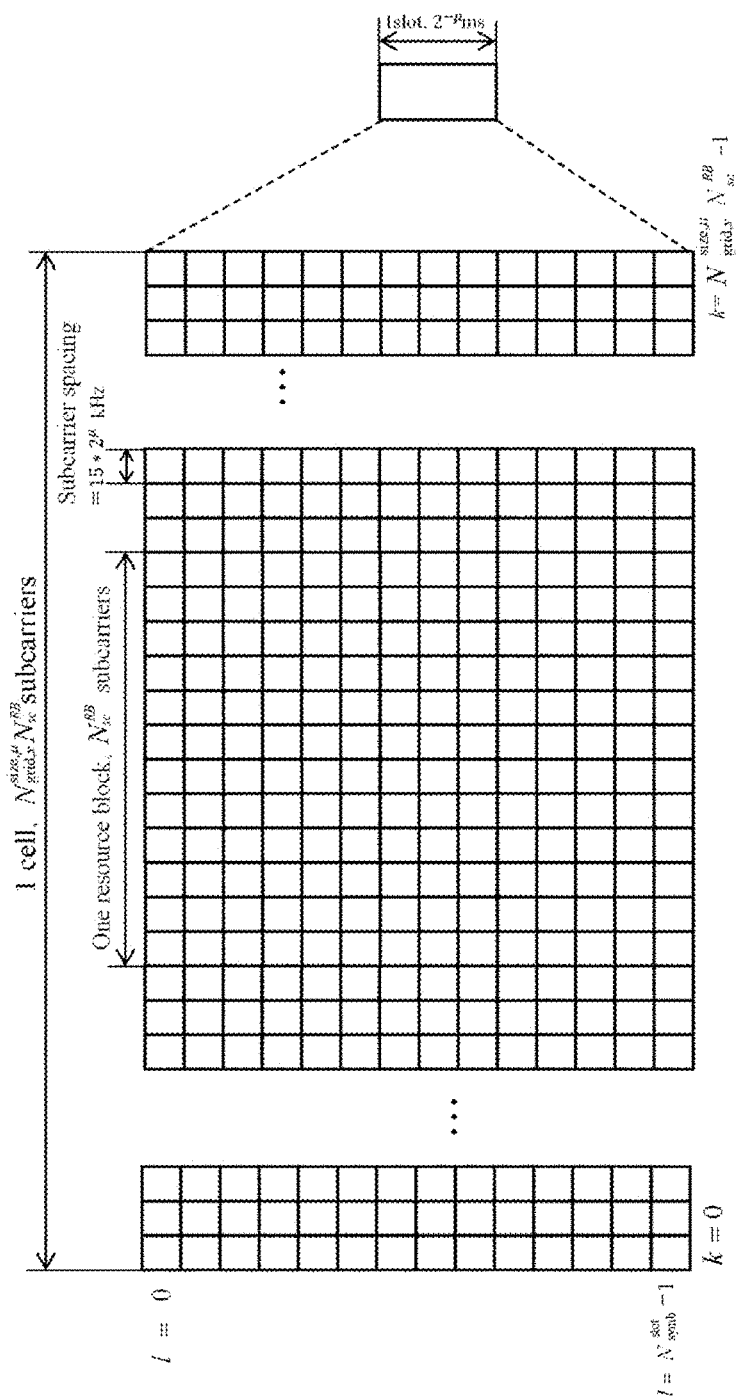
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
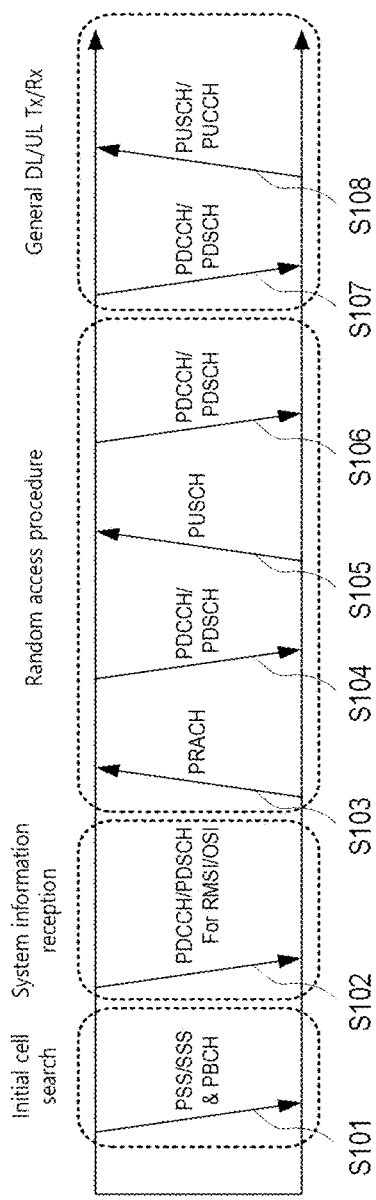
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a response message for the preamble from the base station through the PDCCH and the corresponding PDSCH (S104). When a valid random access response is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
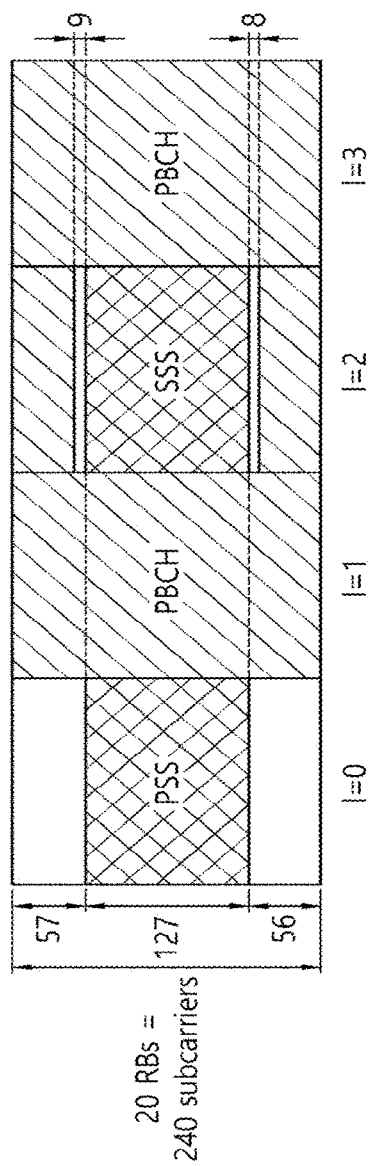
FIG. 4 illustrates an SS/PBCH block for initial cell access in a 3GPP NR system.
Figure 4B:
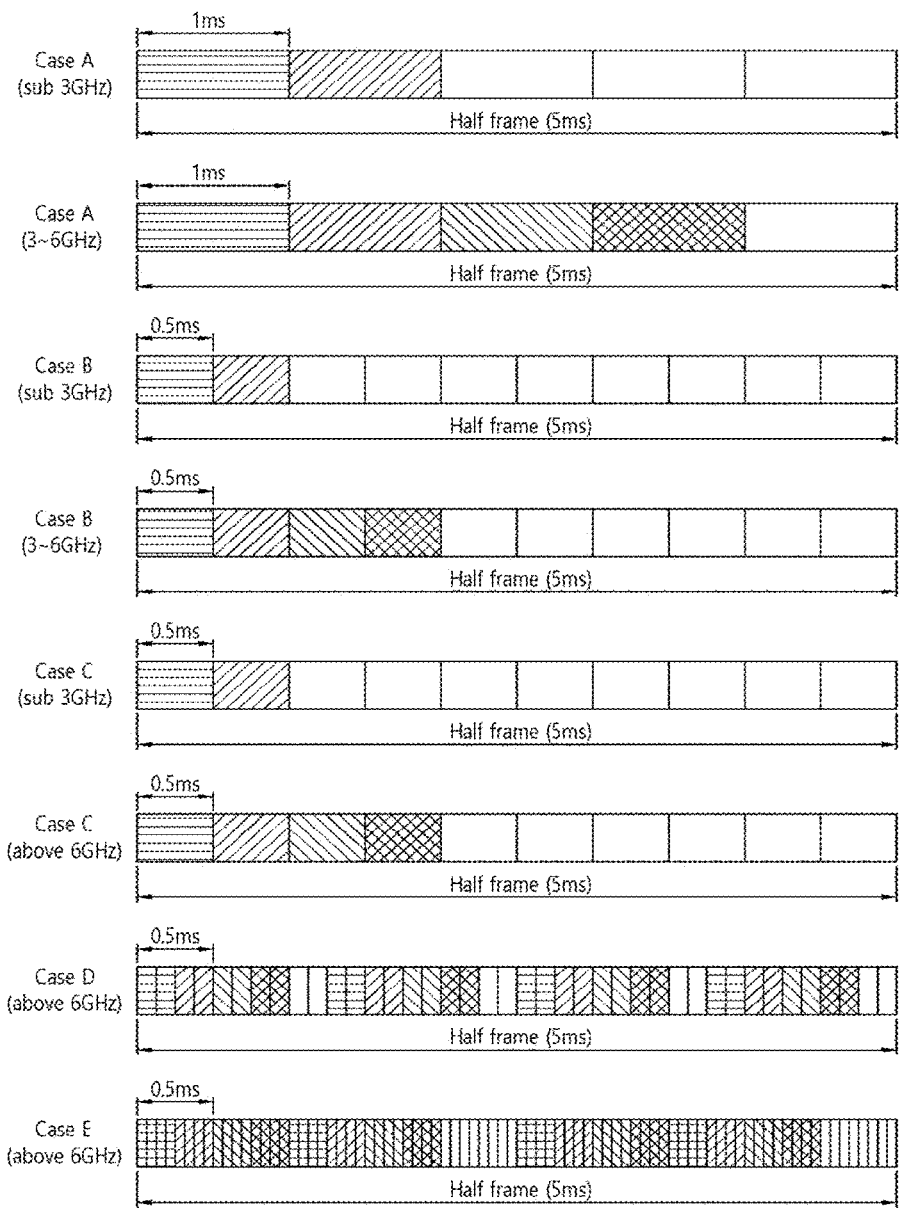

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number/relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$
$$m = \left(n + 43N^{(2)}_{ID}\right) \mod 127$$
$$0 \le n < 127$$

Here, $x(i+7)=(x(i+4)+x(i))\mod 2$ and is given as,
[x(6) x(5) x(4) x(3) x(2) x(1) x(0)]=[1 1 1 0 1 1 0]
Further, the sequence $d_{SSS}(n)$ of the SSS is as follows.

$$d_{sss}(n) = [1 - 2x_0((n + m_0) \mod 127)][-2x_1((n + m_1) \mod 127)]$$
$$m_0 = 15\left\lfloor \frac{N^{(1)}_{ID}}{112} \right\rfloor + 5N^{(2)}_{ID}$$
$$m_1 = N^{(1)}_{ID} \mod 112$$
$$0 \le n < 127$$
$$x_0(i+7) = (x_0(i+4) + x_0(i)) \mod 2$$

Here, $x_1(i+7)=(x_1(i+1)+x_1(i))\mod 2$ and is given as,
[x₀(6) x₀(5) x₀(4) x₀(3) x₀(2) x₀(1) x₀(0)]=[0 0 0 0 0 0 1]
[x₁(6) x₁(5) x₁(4) x₁(3) x₁(2) x₁(1) x₁(0)]=[0 0 0 0 0 0 1]

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
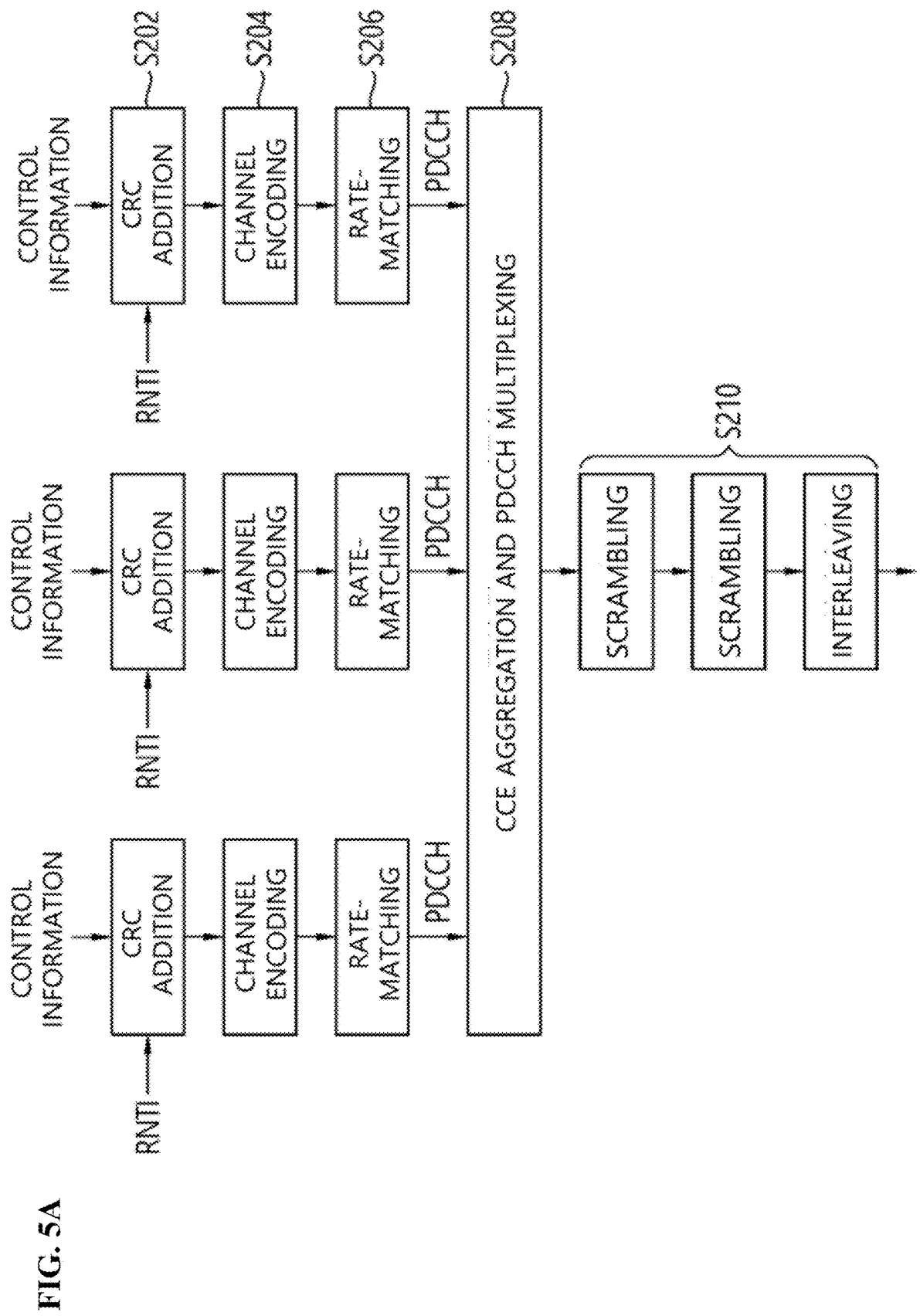
FIG. 5a and FIG. 5b illustrate a procedure for transmitting control information and a control channel in a 3GPP NR system.
Figure 5B:
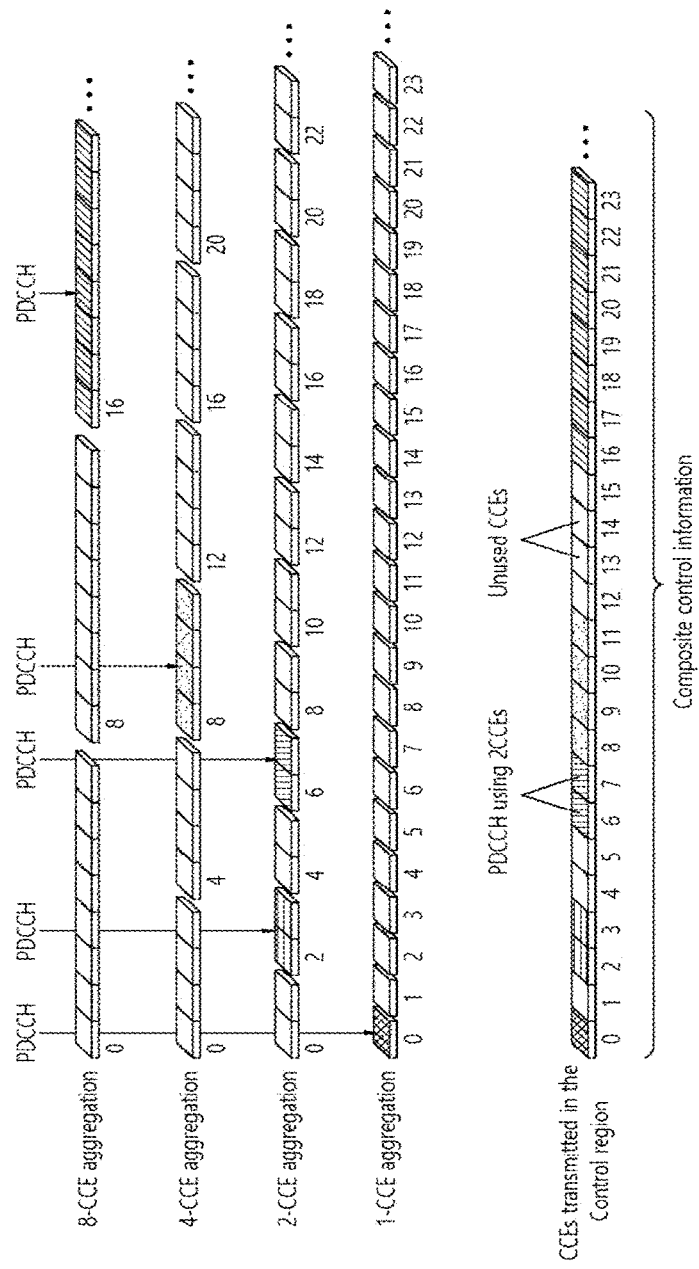

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., 6) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
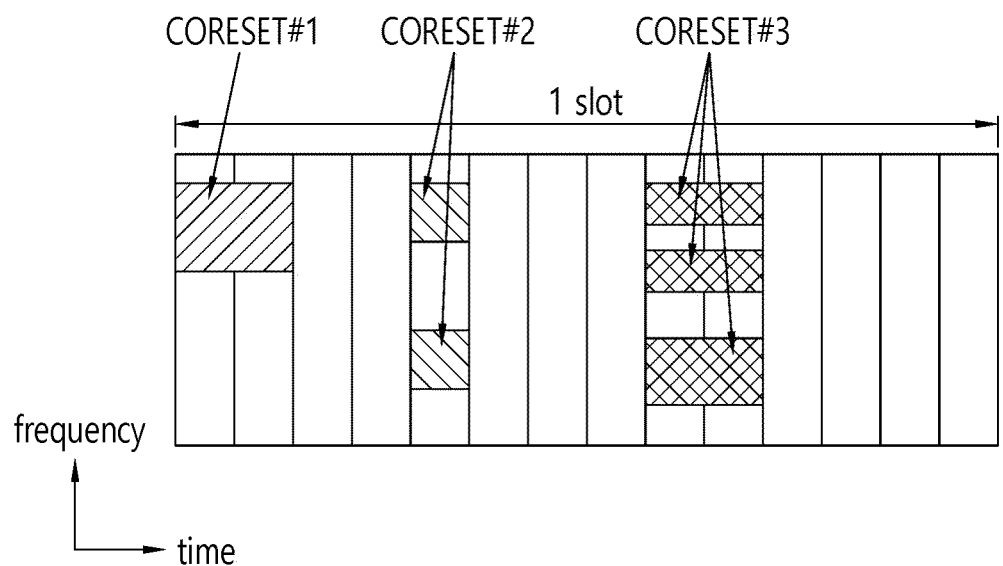
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
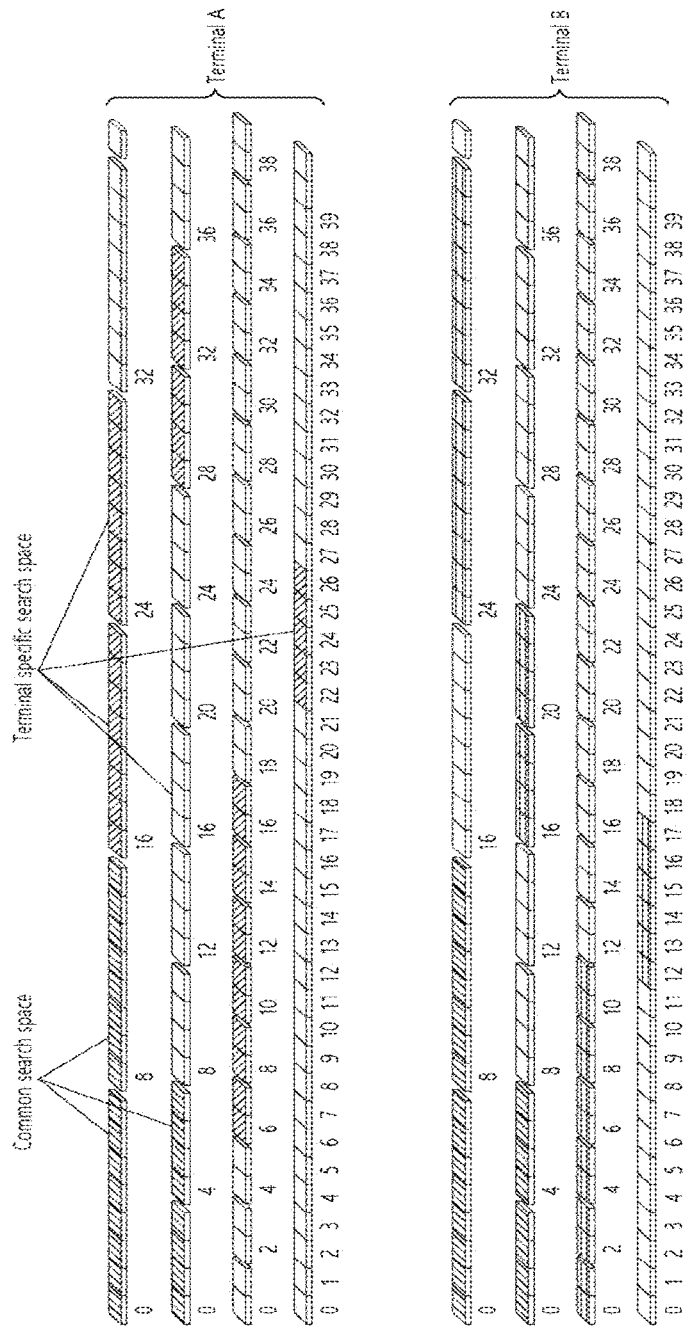
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
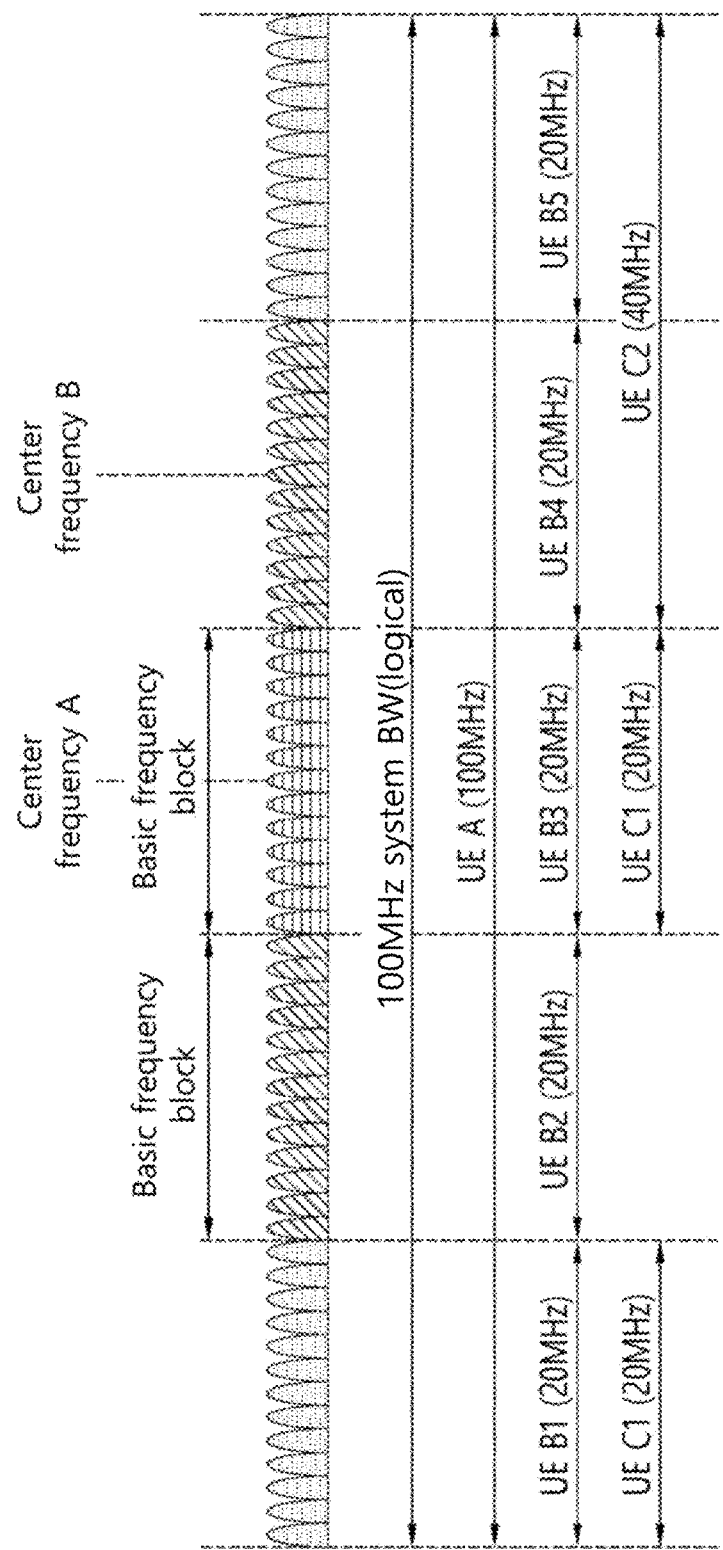
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
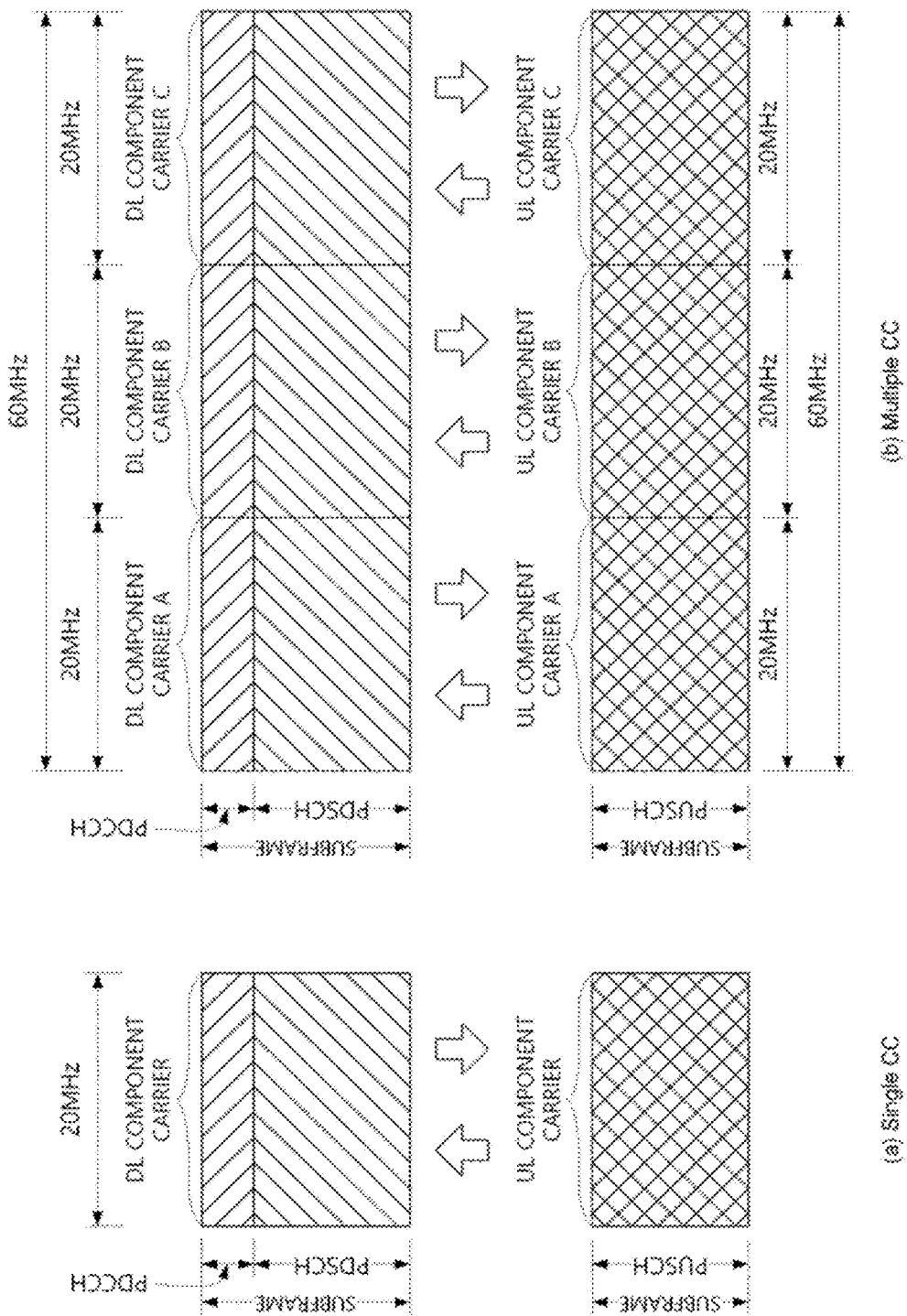
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
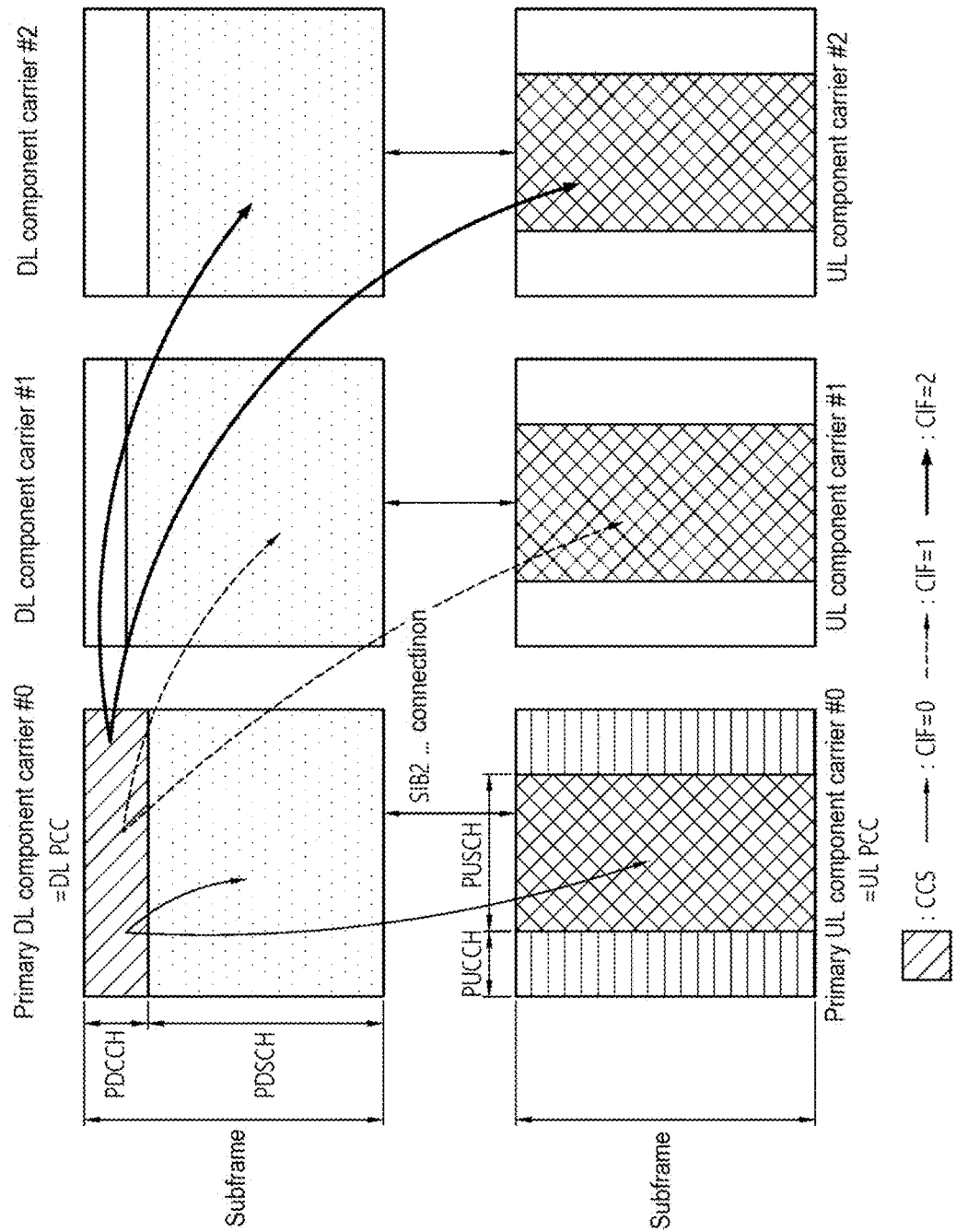
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
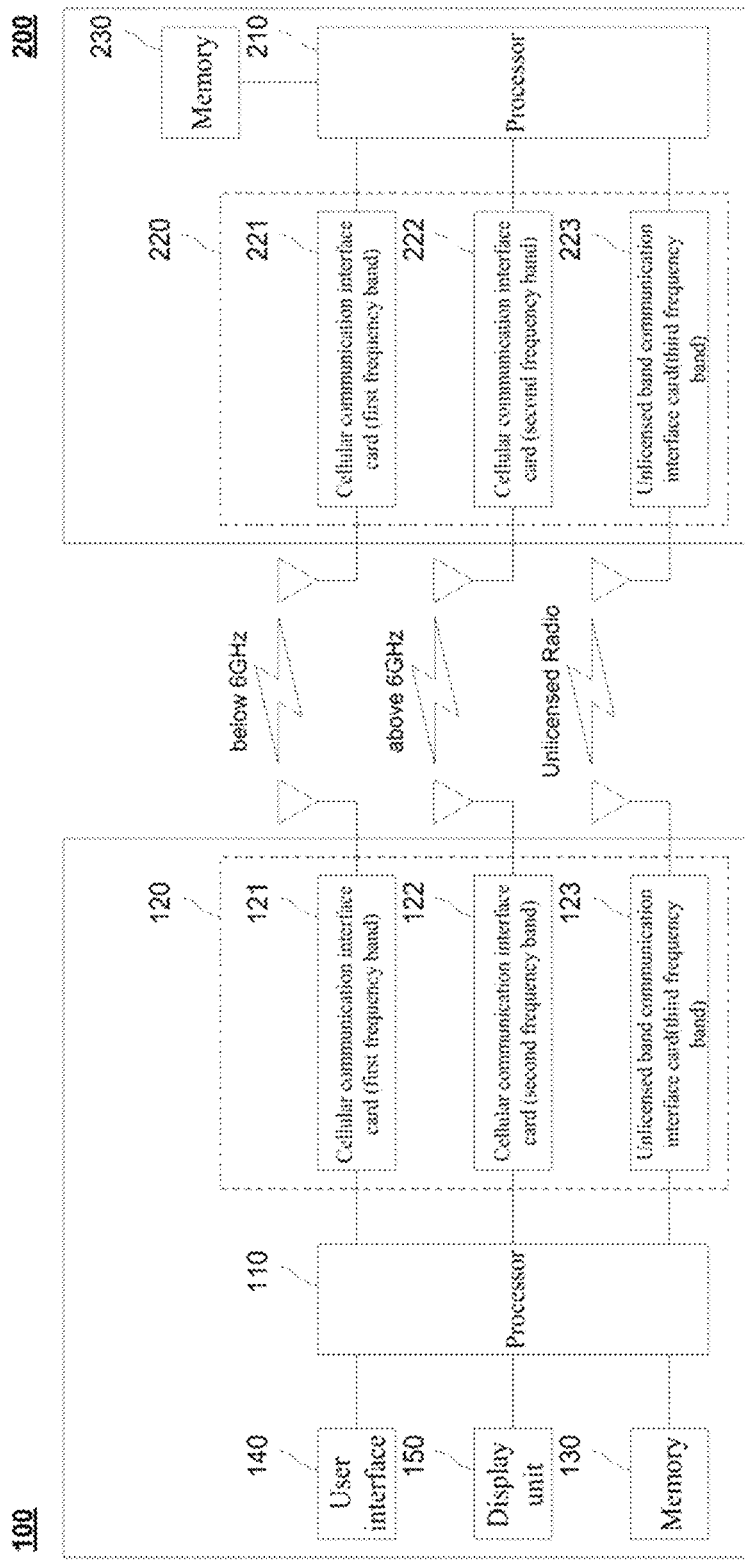
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

A slot format may be configured for the UE by the base station in a TDD or unpaired spectrum system. The slot format may refer to the type of symbols in the slot. The symbol type may be at least one of a downlink symbol (DL symbol), an uplink symbol (UL symbol), or a flexible symbol. A symbol type of a slot in a radio frame may be configured for the UE by the base station. The flexible symbol may refer to a symbol that is not configured as a downlink symbol or an uplink symbol.

The UE may be semi-statically configured with information about the type of each symbol in the slot by receiving information about the type of each symbol in the slot from the base station through a cell-specific or cell-common radio resource control (RRC) signal. Here, the cell-specific (or, cell-common or UE-common) RRC signal includes tdd-UL-DL-ConfigurationCommon. Further, the UE may be semi-statically configured with information about the type of each symbol in the slot by receiving information about the type of each symbol in the slot from the base station through a SIB1. Furthermore, the UE may semi-statically configured with information about the type of each symbol in the slot from the base station by receiving information about the type of each symbol in the slot from the base station through a UE-specific or UE-dedicated RRC signal. The base station may configure/set the type of each symbol in the slot for the UE by using the information about the type of each symbol in the slot.

When the UE receives information on each symbol type in the slot from the base station through a cell-specific RRC signal, the information on each symbol type may include at least one of the period of a cell-specific slot, the number of slots consisting of only downlink symbols from the cell-specific slot where the period starts, the number of downlink symbols from the first symbol of the slot immediately following the last slot consisting of only downlink symbols, the number of slots consisting of only uplink symbols from the last cell-specific slot of the period, and the number of uplink symbols immediately preceding the last slot among the slots consisting of only uplink symbols. In addition, when the UE receives information on each symbol type in a slot from the base station through a cell-specific RRC signal, the information on each symbol type may include up to two slot patterns. In this case, the two patterns may be applied consecutively to symbols in the time domain, respectively. A downlink symbol, an uplink symbol, and a flexible symbol configured based on a cell-specific RRC signal or SIB1 may be referred to as a cell-specific downlink symbol, a cell-specific uplink symbol, and a cell-specific flexible symbol, respectively.

When the UE receives information on each symbol type in a slot from the base station through a UE-specific RRC signal, the cell-specific flexible symbol may be configured as a downlink symbol or an uplink symbol. In this case, the information on each symbol type may include at least one of an index for a slot in a period, the number of downlink symbols from the first symbol of the slot indicated by the index, and the number of uplink symbols from the last symbol of the slot indicated by the index. In addition, the UE may be configured with that all symbols in the slot are downlink symbols or may be configured with that all symbols in the slot are uplink symbols. A downlink symbol, an uplink symbol, and a flexible symbol configured based on the UE-specific RRC signal may be referred to as a UE-specific downlink symbol, a UE-specific uplink symbol, and a UE-specific flexible symbol, respectively.

The base station may transmit information on the slot format to the UE through a slot format indicator (SFI) of DCI format 2_0 included in the group common (GC)-PDCCH. The GC-PDCCH may be CRC scrambled with an SFI-RNTI for UEs receiving information on the slot format. Hereinafter, the SFI transmitted through the GC-PDCCH may be referred to as a dynamic SFI.

The UE may receive a dynamic SFI through GC-PDCCH to receive indication of whether symbols in a slot are cell-specific flexible symbols or UE-specific flexible symbols, downlink symbols, uplink symbols, or flexible symbols. In other words, only a flexible symbol semi-statically configured for the UE may be indicated as one of a downlink symbol, an uplink symbol, and a flexible symbol via a dynamic SFI. The UE may not expect that a semi-statically configured downlink symbol or uplink symbol will be indicated as a different type of symbol by the dynamic SFI. The UE may perform blind decoding at each monitoring period configured by the base station to receive a GC-PDCCH transmitting DCI format 2_0 including the dynamic SFI. When the UE successfully receives the GC-PDCCH by performing the blind decoding, the UE may apply information about a slot format indicated by the dynamic SFI, starting from a slot in which the GC-PDCCH has been received.

A combination of slot formats that can be indicated through a dynamic SFI may be configured for the UE by the base station. The slot format combination may be for each of 1 to 256 slots, and a slot format combination for one of the 1 to 256 slots may be configured for the UE through a dynamic SFI. The dynamic SFI may include an index indicating a slot to which the slot format combination is applied. Table 3 shows a slot format combination for each slot (see 3GPP TS38.213).

TABLE 3

| Format | Symbol number in a slot | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |

TABLE 3-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | D | D | U | D | D | F | U | U | U | U |
| 48 | D | F | U | U | D | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In Table 3, D denotes a downlink symbol, U denotes an uplink symbol, and F denotes a flexible symbol. As shown in Table 3, DL/UL switching may be allowed up to two times within a slot.

In the present specification, the terms "configuration", "setting", and "indication" may be used interchangeably. That is, the terms "configured", "set", and "indicated" may have the same meaning, and similarly, the terms "is configured", "is set", and "is indicated" may have the same meaning.

FIGS. 12 to 18 illustrate a sub-band configuration method according to an embodiment of the disclosure.

When a slot format is configured or indicated for the UE in a TDD or unpaired spectrum system, if limited time domain resources are allocated as uplink resources, problems such as reduced uplink coverage, increased latency, and reduced capacity may occur. To solve these problems, specific time domain resources within a cell may be used for both downlink reception and uplink transmission. Even if the base station uses specific time domain resources for both downlink reception and uplink transmission, the UE may perform only one operation of downlink reception or uplink transmission in the same specific time domain resource by supporting only a half-duplex communication method.

The specific time domain resource may be a cell-specific flexible symbol among the semi-statically configured slot formats. This is to minimize inter-UE interference due to transmission and reception in different symbol types (DL/UL or UL/DL).

Figure 12:
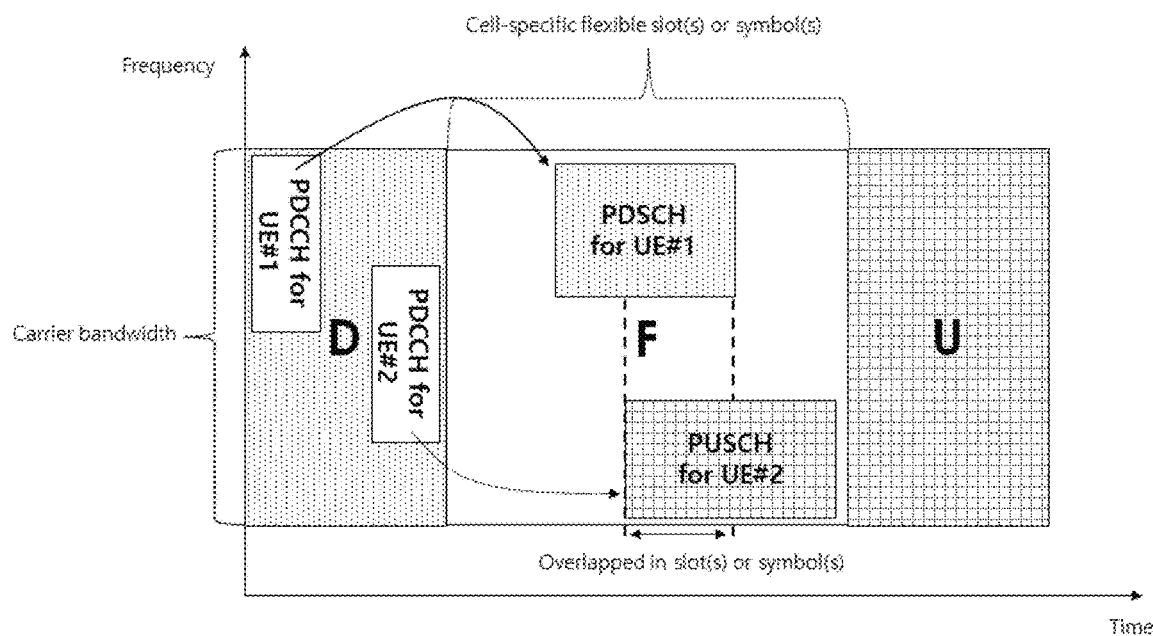
FIGS. 12 to 18 illustrate a subband configuration method.

Referring to FIG. 12, a cell-specific slot may be configured for the UE semi-statically. The UE may perform downlink reception or uplink transmission on a resource scheduled from the base station. A resource scheduled for PDSCH reception to a first UE and a resource scheduled for PUSCH transmission to a second UE may include the same symbol in the time domain, but may be different RBs in the frequency domain. A method in which one base station schedules multiple UEs to use specific time domain resources for both downlink reception and uplink transmission may be inefficient when considering inter-cell interference, spectrum regulation, and power consumption for PDCCH monitoring of the UE. Hereinafter, a method for solving such an inefficient situation will be described. The subband in the disclosure may be configured on the frequency domain resource (slot or symbol) within a time domain resource. In this case, the frequency domain resource may be included in the carrier bandwidth of the UE.

Spectrum Partitioning

A specific time domain resource (cell-specific flexible slot/symbol) that may be used for both downlink reception and uplink transmission may be configured in the form of multiple subbands in the frequency domain for the UE by the base station. The multiple subbands may be subbands of the same or different formats. The sub-band format may include a downlink subband, an uplink subband, and a flexible subband. The downlink subband may be configured with one or more downlink RB(s), the uplink subband may be configured with one or more uplink RB(s), and the flexible subband may be configured with one or more flexible RB(s), and the downlink RB(s) may refer to resources available for downlink reception and the uplink RB(s) may refer to resources available for uplink transmission. The flexible RB(s) may refer to resources available for downlink reception and uplink transmission depending on the configuration of the base station.

Figure 13:
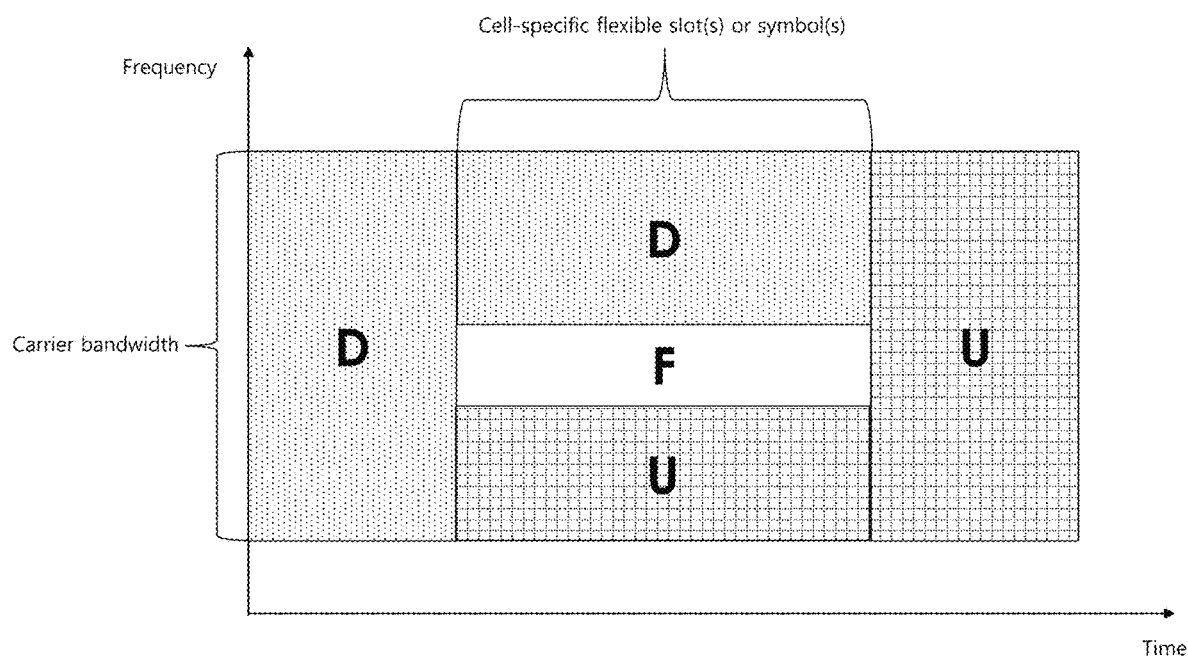

(Method 1-1) When the UE is configured with multiple subbands, the subband of the same format may be at most 1. That is, one cell-specific flexible slot/symbol section may be configured with at most 1 downlink subband, 1 uplink subband, and 1 flexible subband each. Referring to FIG. 13, a cell-specific flexible slot/symbol may be configured with multiple subbands. In this case, the multiple subbands may be configured with 1 downlink subband, 1 uplink subband, and 1 flexible subband each. A guard band may be required to minimize the effect of UL/DL interference between the downlink subband and the uplink subband. Limiting the subband of the same format to only one is to minimize the number of guard bands and configure the downlink subband, uplink subband, and flexible subband, thereby increasing the efficiency of frequency resources during downlink reception and uplink transmission.

Figure 14:
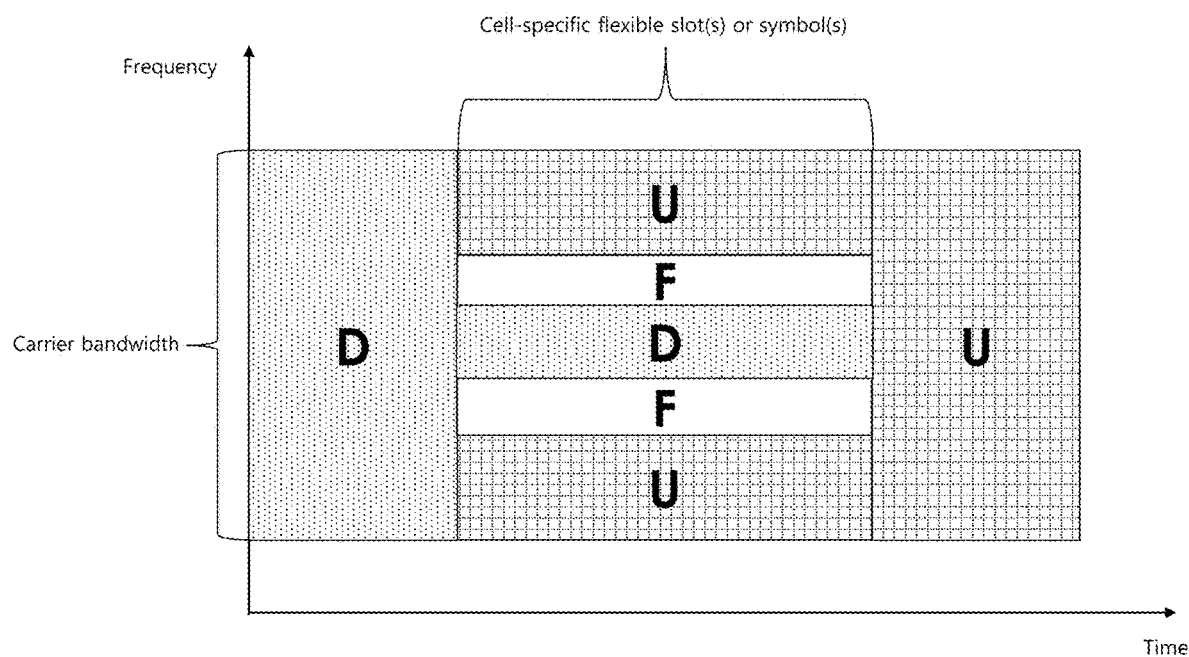

(Method 1-2) In addition, when the UE is configured with multiple subbands, there may be multiple subbands of the same format. That is, one cell-specific flexible slot/symbol section may be plural in one or more of a downlink subband, an uplink subband, and a flexible subband. Referring to FIG. 14, a cell-specific flexible slot/symbol may be configured with multiple subbands. In this case, the multiple subbands may be configured with one downlink subband, two uplink subbands, and two flexible subbands.

In Methods 1-1 and 1-2, multiple subbands may be configured with non-overlapping RBs in the frequency domain.

In Methods 1-1 and 1-2, the flexible subband may be configured by considering a guard band between the uplink subband and the downlink subband.

That is, there may be at least one flexible subband between the uplink subband and the downlink subband. Method 1-1 may require a smaller number of guard bands compared to Method 1-2. Therefore, more resources may be available for downlink reception and uplink transmission. In addition, since Method 1-1 has more frequency resources available when CORESET resources for PDCCH monitoring are configured for the UE compared to Method 1-2, CORESET may be flexibly configured within one downlink subband (or flexible subband). In addition, Method 1-1 may have more frequency domain resources available for uplink transmission than Method 1-2. Therefore, Method 1-1 may be advantageous in terms of frequency resource usage efficiency compared to Method 1-2. Hereinafter, the methods described in the disclosure are based on Method 1-1, but are not limited thereto. In the disclosure, an RB within a downlink subband may be described as a downlink RB, an RB within an uplink subband may be described as an uplink RB, and an RB within a flexible subband may be described as a flexible RB.

A method of configuring multiple subbands in the frequency domain may be applied to cell-specific flexible slots or symbols, as well as cell-specific downlink slots or symbols or cell-specific uplink slots or symbols. Accordingly, the UE may be configured with multiple subbands in the frequency domain for the cell-specific downlink slots or symbols and cell-specific flexible slots or symbols. Alternatively, the UE may be configured with multiple subbands in the frequency domain for the cell-specific uplink slots or symbols and cell-specific flexible slots or symbols.

The method of configuring multiple subbands in the frequency domain may be applied to UE-specific flexible slots or symbols. In addition, the method of configuring multiple subbands in the frequency domain may be applied to UE-specific downlink slots or symbols.

Semi-Static Sub-Band Format Configuration

The UE may receive the subband configured semi-statically through a cell-specific RRC signal or SIB1. The UE may receive the information for sub-band configuration semi-statically from the base station and configure the subband. The information for sub-band configuration may include information related to the location of the subband and information (RB type) related to the type of the subband.

Figure 15:
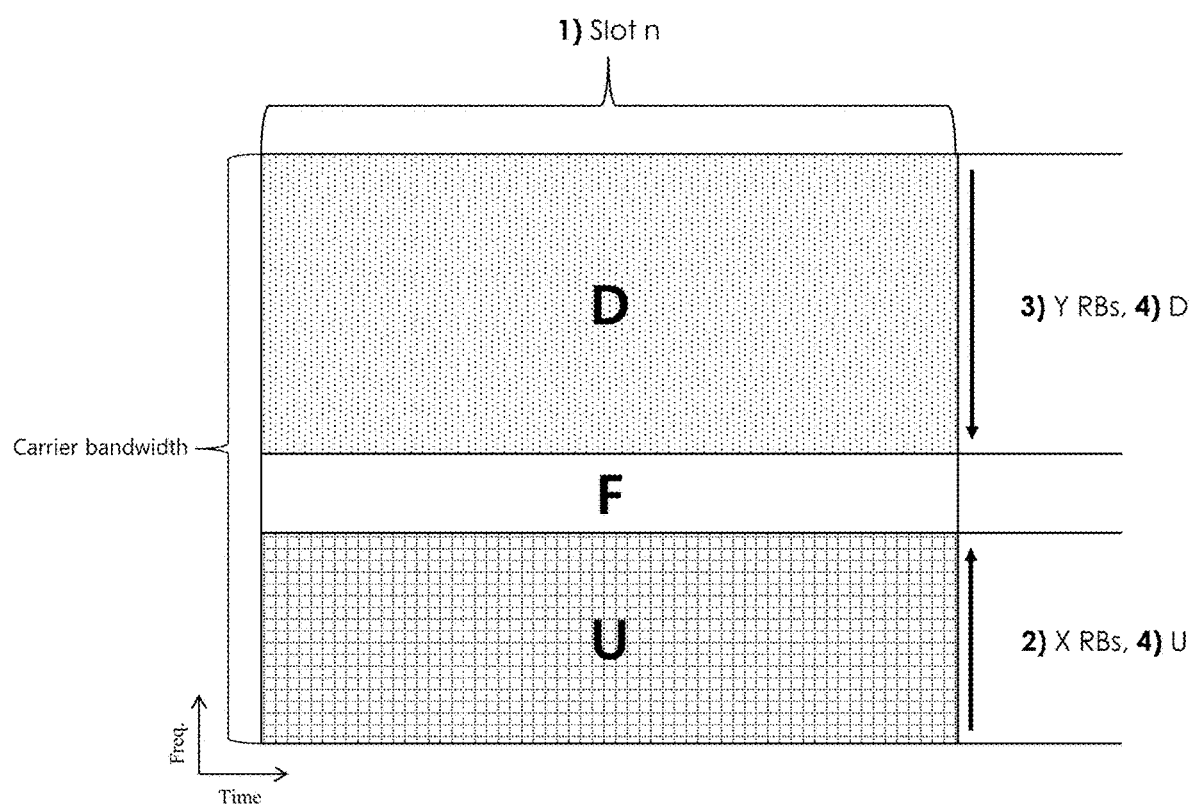

(Method 2-1) The UE may receive information for sub-band configuration from the base station and configure the number of downlink RBs and the number of uplink RBs. In this case, the information for sub-band configuration may include at least one of an index for one slot among slots in a period, the number of uplink RBs from the first RB of the slot corresponding to the index, the number of downlink RBs, the number of downlink RBs from the last RB of the slot corresponding to the index, the number of uplink RBs, and information on the location of downlink subbands and uplink subbands. Among the RBs in the slot, an RB that is not configured as a downlink RB or an uplink RB may be determined as a flexible RB. Referring to FIG. 15, 1) the index for the slot is n, 2) X RBs from the first RB of slot n may be uplink RBs, and 3) Y RBs from the last RB of slot n may be downlink RBs. 4) A subband configured with X RBs from the first RB of slot n may be an uplink subband, and a subband configured with Y RBs from the last RB of slot n may be a downlink subband. Alternatively, conversely to FIG. 15, a subband configured with X RBs from the first RB of slot n may be configured as a downlink subband, and a subband configured with Y RBs from the last RB of slot n may be configured as an uplink subband.

Figure 16:
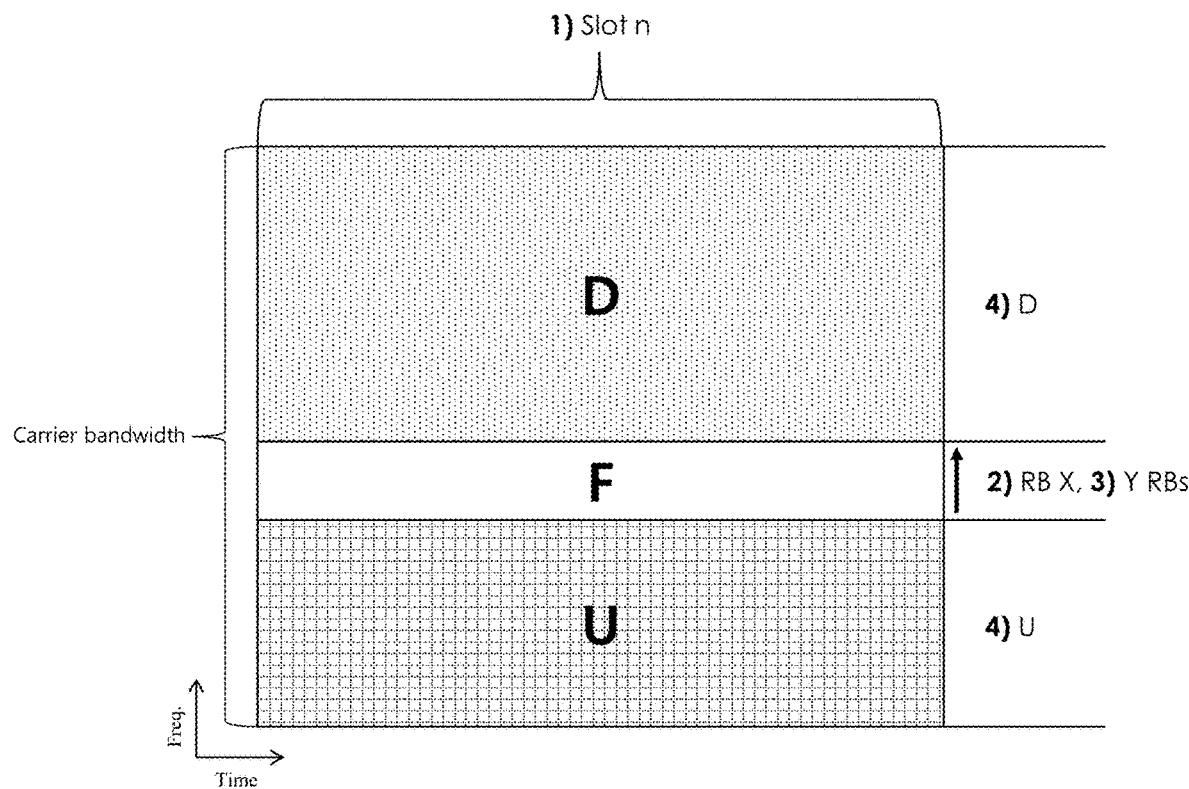

(Method 2-2) The UE may receive information for sub-band configuration from the base station and configure the number of flexible RBs and the starting RB. In this case, the information for sub-band configuration may include at least one of an index for one slot among slots in a period, the index of the first flexible RB among the flexible RBs of the slot corresponding to the index, the number of flexible RBs of the slot corresponding to the index, and information on the locations of the downlink subband and the uplink subband. Among the RBs in the slot, an RB that is not configured as a flexible RB may be determined as a downlink RB and an uplink RB. Referring to FIG. 16, 1) the index for the slot is n, 2) the index of the first flexible RB of slot n is X, 3) from X to Y RBs are flexible subbands, and 4) the subbands excluding the flexible subbands in slot n may be configured as downlink subbands and uplink subbands. That is, an uplink subband may be configured with RBs from the first RB of slot n to before the first flexible RB of the flexible subband, and a downlink subband may be configured with RBs from the last RB of slot n to after the last RB of the last flexible subband. Conversely, a downlink subband may be configured with RBs from the first RB of slot n to the first flexible RB of the flexible subband, and an uplink subband may be configured with RBs from the last RB of slot n to the last RB of the last flexible subband.

(Method 2-3) The UE may receive information for sub-band configuration from the base station. The UE may configure the uplink (or downlink) starting RB, the number of uplink (or downlink) RBs, and the number of flexible RBs based on the information for sub-band configuration. Specifically, the information for sub-band configuration may include information on any one of an index for one of the slots in a period, a starting index of an uplink (or downlink) RB of the slot corresponding to the index, the number of uplink (or downlink) RBs of the slot corresponding to the index, and the number of flexible RBs of the slot corresponding to the index. The UE may determine an RB that is not configured as an uplink (or downlink) RB or a flexible RB as a downlink (or uplink) RB.

The number of flexible RBs may not be configured by the base station. The number of flexible subbands may not be pre-defined for the guard band, and the number of pre-defined RBs for the guard band may be determined.

The flexible subband may be located between the downlink subband and the uplink subband. Accordingly, there is the effect that the UE may determine the flexible location even without being separately indicated with the starting index of the flexible RB.

(Method 2-4) For sub-band configuration, the uplink starting RB, the number of uplink RBs, the downlink starting RB, and the number of downlink RBs may be configured for the UE from the base station. In this case, the information that the UE receives for sub-band configuration may be 1) a slot index within a slot configuration period, 2) a starting index of an uplink RB of the corresponding slot, 3) a number of uplink RBs of the corresponding slot, 4) a starting index of a downlink RB of the corresponding slot, and 5) a number of downlink RBs of the corresponding slot. Here, the UE may determine an RB that is not configured with a downlink RB and an uplink RB as a flexible RB. Therefore, the UE may know the location of the flexible subband without ambiguity even without separately configuring the starting index of the flexible RB and the number of flexible RBs.

In Methods 2-1 to 2-4, information for sub-band configuration may be commonly transmitted to UEs within a cell, and in this case, the downlink RB, uplink RB, and flexible RB configured for each UE may be configured in units of common resource block (CRB). In addition, in Methods 2-1 to 2-4, information for sub-band configuration may be transmitted to specific UEs within a cell, and in this case, the downlink RB, uplink RB, and flexible RB configured for each UE may be configured in units of physical resource blocks (PRBs).

Methods 2-1 to 2-4 have the effect that the UE may identify information on all subbands even when partially receiving information for sub-band configuration. In Methods 2-1 to 2-4, RBs in a semi-static downlink subband may be described as semi-static downlink RBs, RBs in a semi-static uplink subband may be described as semi-static uplink RBs, and RBs in a semi-static flexible subband may be described as semi-static flexible RBs.

The method of semi-statically configuring a subband based on Methods 2-1 to 2-4 may include a cell-specific flexible slot or symbol, a cell-specific downlink slot or symbol, and a cell-specific uplink slot or symbol. Accordingly, the UE may be semi-statically configured with a subband for the cell-specific downlink slot or symbol and the cell-specific flexible slot or symbol. Alternatively, the UE may be semi-statically configured with a subband for the cell-specific uplink slot or symbol and the flexible slot or symbol. Alternatively, the method of semi-statically configuring a subband based on Methods 2-1 to 2-4 may include a UE-specific flexible slot or symbol. In addition, the method of semi-statically configuring a subband based on Methods 2-1 to 2-4 may include a UE-specific downlink slot or symbol.

The UE may perform a method of semi-statically configuring a subband based on Methods 2-1 to 2-4 through a cell-specific RRC signal, SIB1, or a UE-specific RRC signal.

In Methods 2-1 to 2-4, the slot index within the slot configuration period included in the information for sub-band configuration may include multiple slot indices. That is, the UE may be configured with subbands for multiple slots within the slot configuration period.

In Methods 2-1 to 2-4, the flexible RB may be an RB for the guard band. That is, the flexible RB may not be used by the UE for downlink reception and uplink transmission depending on the configurations of the base station, but may be used only as a resource for the guard band. That is, in Methods 2-1 to 2-4, the flexible RB (flexible subband) may be considered as a guard RB (guard band) and may not be used for downlink reception and uplink transmission.

Dynamic Sub-Band Format Indication

The UE may be configured (set/indicated) with a sub-band format through dynamic signaling. That is, the UE may be configured with a sub-band format from DCI transmitted through PDCCH. If the UE does not receive a semi-static format configuration, the UE may consider all frequency domain resources in the slot as semi-static flexible subbands. In addition, the UE may be dynamically indicated with a sub-band format through DCI. That is, the semi-static downlink subband and the semi-static uplink subband configured through the semi-static format configuration cannot be indicated with a different format through DCI. If the semi-static sub-band format is not configured for the UE, the UE may apply the sub-band format indicated through DCI to a cell-specific flexible slot/symbol. The sub-band format indicated by DCI may be described as a dynamic subband.

The UE may be indicated with sub-band RB(s) in the frequency domain through the RIV method, which is a method of indicating consecutively scheduled resources in the frequency domain in the NR system. RIV may be a joint-coded value of the starting RB index and the number of consecutively allocated RBs. Equation 1 represents a method of determining RIV (refer to 3GPP TS38.214).

$$\text{if } (L_{RBs} - 1) \leq \lfloor N_{BWP}^{size}/2 \rfloor \text{ then} \quad \text{[Equation 1]}$$
$$RIV = N_{BWP}^{size}(L_{RBs} - 1) + RB_{start} \text{ else}$$
$$RIV = N_{BWP}^{size}(N_{BWP}^{size} - L_{RBs} + 1) + (N_{BWP}^{size} - 1 - RB_{start}) \text{ where}$$
$$L_{RBs} >= 1 \text{ and shall not exceed } N_{BWP}^{size} - RB_{start}.$$

Here, $L_{RBs}$ may be the number of consecutively allocated RBs, $RB_{start}$ may be the starting RB index, and $N^{size}_{BWP}$ may be the BWP size of the UE. For example, when $N^{size}_{BWP}$ is 4, the representable starting RB index and the number of consecutively allocated RBs may be as shown in Table 4 below.

TABLE 4

| | S | | | |
|---|---|---|---|---|
| L | 0 | 1 | 2 | 3 |
| 1 | 0 | 1 | 2 | 3 |
| 2 | 4 | 5 | 6 | |
| 3 | 8 | 9 | | |
| 4 | 7 | | | |

In Table 4, S represents the starting RB index, and L represents the number of consecutively allocated RBs. According to Table 4, when $N^{size}_{BWP}$ is 4, the RIV value may be one of 0 to 9. The UE may determine the starting RB index and the number of consecutively allocated RBs with the indicated RIV value. For example, when the UE is indicated that the RIV value is 5, the UE may identify that two consecutive RBs from RB #1 in the frequency domain are allocated.

Hereinafter, a method for the UE is indicated to perform a sub-band format in the frequency domain in the form of RIV by the base station through DCI.

(Method 3-1) The UE may be indicated with the number of downlink RBs and the number of uplink RBs as information for configuring the subband by the base station. The UE may be indicated with the number of downlink and uplink RBs as a single jointly coded value. When the single value is acquired in the form of RIV, the single value may be determined through Equation 2.

if $L_{RBs}^2 \leq \lfloor N_F^{size}/2 \rfloor$ then  [Equation 2]

$RIV = (N_F^{size} + 1)L_{RBs}^2 + L_{RBs}^1$ else $RIV = (N_F^{size} + 1)(N_F^{size} + 1 - L_{RBs}^2) + (N_F^{size} - L_{RBs}^1)$ where $L_{RBs}^1 > = 0$, $L_{RBs}^2 > = 0$, and $L_{RBs}^1 + L_{RBs}^2$ shall not exceed $N_F^{size}$.

Here, $L^1_{RBs}$ may mean the number of the first RBs allocated consecutively, and $L^1_{RBs}$ may mean the number of the second RBs allocated consecutively. If the sub-band format is configured semi-statically for the UE, $N^{size}_F$ may be the size of a flexible subband among the semi-statically configured sub-band formats. If the sub-band format is not configured semi-statically for the UE, $N^{size}_F$ may be the size of the total carrier bandwidth. For example, if $N^{size}_F$ is 4, the number of two consecutively allocated RBs may be as shown in Table 5.

TABLE 5

| L2 | L1 | | | | |
|---|---|---|---|---|---|
| | 0 | 1 | 2 | 3 | 4 |
| 0 | 0 | 1 | 2 | 3 | 4 |
| 1 | 5 | 6 | 7 | 8 | |
| 2 | 10 | 11 | 12 | | |
| 3 | 14 | 13 | | | |
| 4 | 9 | | | | |

In Table 5, L1 may be the number of the first RB allocated consecutively, and L2 may be the number of the second RB allocated consecutively. According to Table 5, if $N^{size}_F$ is 4, the RIV value may be one of 0 to 14. The UE may determine the number of RBs allocated consecutively to the downlink and uplink subbands with the indicated RIV value. That is, the UE may determine L1 as the number of RBs allocated consecutively in the uplink subband, and L2 as the number of RBs allocated consecutively in the downlink subband. Conversely, the UE may determine L1 as the number of RBs allocated consecutively in the downlink subband, and L2 as the number of RBs allocated consecutively in the uplink subband.

Figure 17:
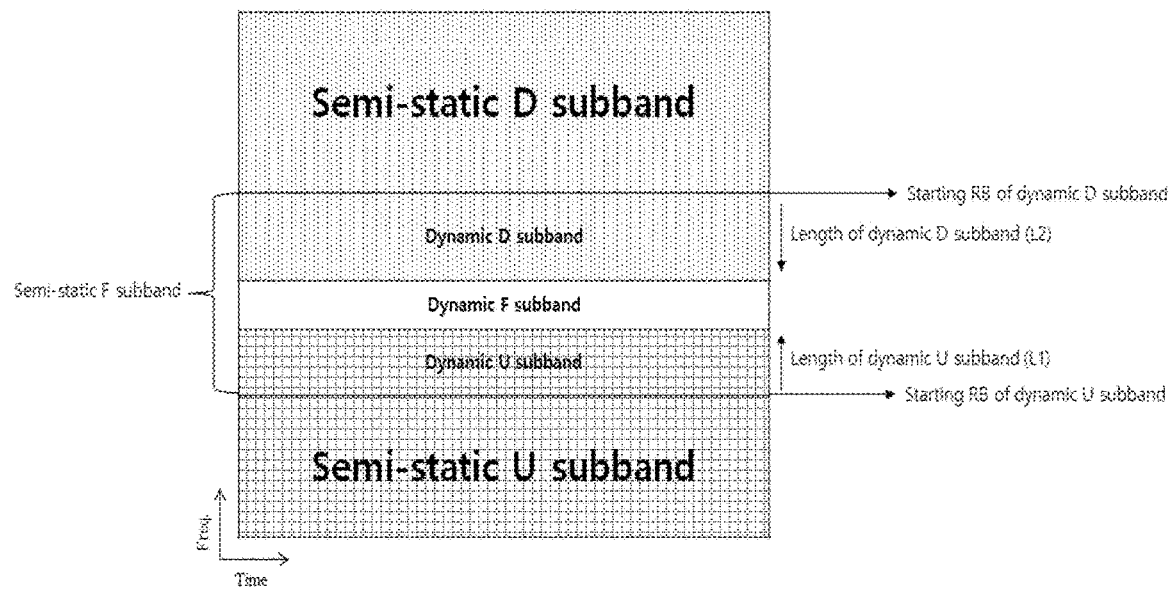

When the UE determines L1 and L2 as the number of RBs sequentially allocated to the uplink (or downlink) subband and the downlink (or uplink) subband, respectively, the UE may implicitly determine the starting RB index of each subband according to the semi-statically configured subband format. Specifically, when L1 and L2 indicated to the semi-static flexible subband according to Method 3-1 are applied, the starting RB of the downlink subband may be determined as the previous or next RB of the semi-statically configured cell-specific downlink subband, and the starting RB of the uplink subband may be determined as the next or previous RB of the semi-statically configured cell-specific uplink subband. In addition, RB(s) not determined as the dynamic downlink subband and the dynamic uplink subband in the semi-static flexible subband may be determined as the dynamic flexible subband. Referring to FIG. 17, the UE may be indicated with L1 as the number of RBs sequentially allocated to the dynamic uplink subband for the semi-static flexible subband, and L2 as the number of RBs sequentially allocated to the dynamic downlink subband. In addition, in the semi-static sub-band configuration, the semi-static uplink subband may be configured from the first RB of slot n to the RB before the RB of the first dynamic subband (dynamic uplink (or downlink) sub-band RB), and the semi-static downlink subband may be configured from the last RB of slot n to the RB after the dynamic sub-band RB (dynamic uplink (or downlink) sub-band RB)). Therefore, the UE may determine L1 RBs from the next RB of the semi-statically configured uplink subband as the dynamic uplink subband, and L2 RBs from the previous RB of the semi-statically configured downlink subband as the dynamic downlink subband. The UE may determine RBs that are not dynamically indicated as downlink subbands or uplink subbands in a semi-static flexible subband as dynamic flexible subbands.

Figure 18:
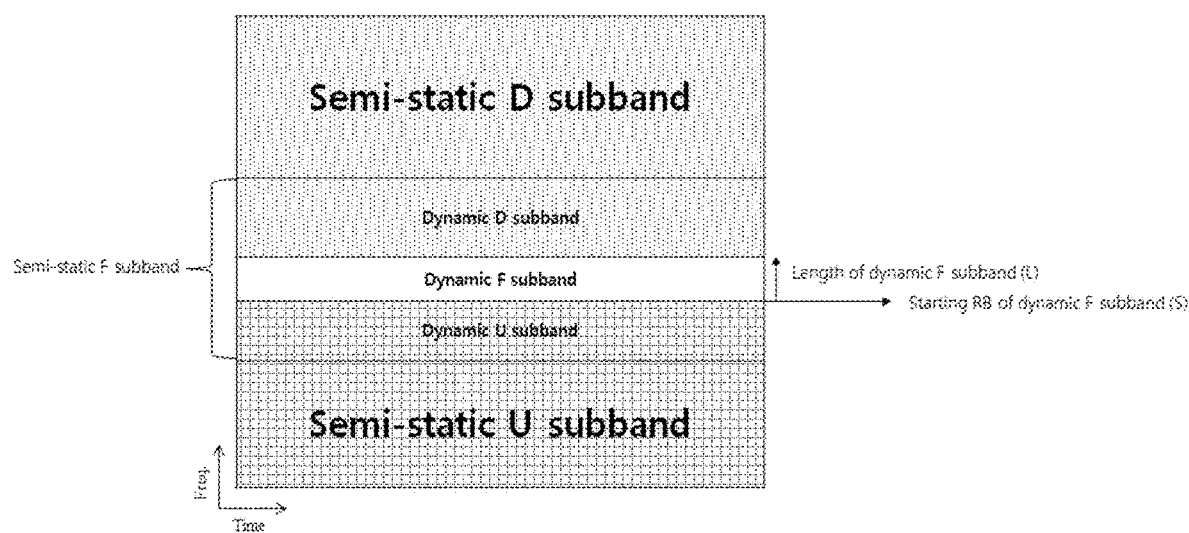

(Method 3-2) The UE may be indicated with the index of the starting RB of the flexible subband and the number of RBs as information for sub-band configuration. The UE may be indicated with the index of the starting RB of the flexible subband and the number of RBs as a single jointly coded value. When single value is determined in the form of RIV, the single value may be acquired through Equation 1. In this case, $N^{size}_F$ is used instead of $N^{size}_{BWP}$ of Equation 1, and $N^{size}_F$ is the same as the definition in Equation 2. In addition, RBs that are not determined as dynamic flexible subbands may be determined as dynamic downlink subbands and dynamic uplink subbands. In this case, the dynamic downlink subband and dynamic uplink subband may be configured with semi-statically configured semi-static downlink subbands and semi-static uplink subbands and consecutive RBs in the frequency domain. Referring to FIG. 18, the dynamic flexible subband may be located within the semi-static flexible subband. S may be an index of the starting RB of the dynamic flexible subband, and L may be the number of RBs consecutively allocated to the dynamic flexible subband. The UE may determine the dynamic flexible subband based on the index of the starting RB configured for the semi-static flexible subband and the number of consecutive RBs. The UE may determine RBs that are not configured as dynamic flexible subbands among the semi-static flexible subbands as RBs of the dynamic downlink subband and dynamic uplink subband. The UE may determine RBs that are consecutive to the semi-static downlink subband among the RBs that are not configured for configuring the dynamic flexible subband as RBs of the dynamic downlink subband. The UE may determine the semi-static uplink subbands and the consecutive RBs among the RBs that are not indicated as dynamic flexible subbands as RBs of the dynamic uplink subband.

The unit of RB in Methods 3-1 and 3-2 may be PRB.

(Method 3-3) The base station may indicate to the UE the index of the starting RB of the uplink (or downlink) subband and the number of RBs. The UE may be indicated with a single value in which the index of the starting RB and the number of RBs are jointly coded by the base station. In this case, one joint-coded value may be acquired through Equation 1. The UE may determine an RB that is not indicated as an uplink (or downlink) RB as a downlink (or uplink) RB or a flexible RB. In addition, the number of flexible RBs may be the number of flexible RBs that the UE has semi-statically configured or determined. The UE may determine an RB that is not an uplink (or downlink) RB or a flexible RB as a downlink (or uplink) RB.

The flexible subband may be located between a downlink subband and an uplink subband. Therefore, the UE may identify the location of the flexible subband without ambiguity even without being separately indicated with the starting index of the flexible RB.

In Methods 3-1, 3-2, and 3-3, the dynamic downlink subband, the dynamic uplink subband, and the dynamic flexible subband may be configured with consecutive RBs in the frequency domain.

In Methods 3-1, 3-2, and 3-3, information for configuring subbands may be commonly transmitted to UEs within a cell, and in this case, the downlink RB, uplink RB, and flexible RB configured for each UE may be configured in units of common resource block (CRB).

When the UE is indicated to perform a dynamic sub-band format according to Methods 3-1, 3-2, and 3-3, the corresponding sub-band format information may be transmitted to the UE through group common signaling. For example, the dynamic sub-band format information may be included in DCI format 2_0 used in legacy NR. The DCI format 2_0 may be transmitted through GC-PDCCH, and the GC-PDCCH may be CRC scrambled with SFI-RNTI for UEs receiving the sub-band format information. The UE may perform blind decoding for each monitoring period configured by the base station in order to receive the GC-PDCCH including the DCI format 2_0 including the sub-band format information. If the UE performs blind decoding and succeeds in performing the GC-PDCCH, the UE may apply the sub-band format information during the monitoring period configured by the base station from the slot in which the PDCCH is received. In addition, the dynamic sub-band format information may be transmitted through a new DCI format (e.g., DCI format 2_x) rather than the DCI format used in legacy NR. The DCI format 2_x may be transmitted through GC-PDCCH, and the GC-PDCCH may transmit slot formation indication in frequency domain (SFI-F) to inform the UEs receiving the sub-band format information of the slot format in the frequency domain. The SFI-F may be CRC scrambled with SFIF-RNTI. In order to receive the PDCCH including the DCI format 2_x, blind decoding may be performed for each monitoring period configured by the base station. If the UE performs blind decoding and succeeds in performing the GC-PDCCH, the UE may apply the sub-band format information during the monitoring period configured by the base station from the slot in which the GC-PDCCH is received.

When the UE is configured with a dynamic sub-band format according to Method 3-1, the payload size of the DCI format 2_0 or DCI format 2_x including the dynamic sub-band format information may be $$\lceil \log_2((N_F^{size}+1)(N_F^{size}+2)/2) \rceil$$

bits. When the UE is configured with a dynamic sub-band format according to Method 3-2, the payload size of the DCI format 2_0 or DCI format 2_x including the dynamic sub-band format information may be $$\lceil \log_2(N_F^{size}(N_F^{size}+1)/2) \rceil$$

When the UE is configured with a dynamic sub-band format according to Method 3-3, the payload size of the DCI format 2_0 or DCI format 2_x including the dynamic sub-band format information may be $$\lceil \log_2(N_{BWP}^{size}(N_{BWP}^{size}+1)/2) \rceil$$

bits

An RB within a dynamic downlink subband determined according to Methods 3-1, 3-2, and 3-3 may be described as a dynamic downlink RB, an RB within a dynamic uplink subband may be described as a dynamic uplink RB, and an RB within a dynamic flexible subband may be described as a dynamic flexible RB.

The method of dynamically indicated with a subband based on Methods 3-1, 3-2, and 3-3 may be applied to a cell-specific flexible slot or symbol, and may be applied to a cell-specific downlink slot or symbol or an uplink slot or symbol. Therefore, the UE may be dynamically indicated with a subband for a cell-specific downlink slot or symbol and a cell-specific flexible slot or symbol. In addition, the UE may be dynamically indicated with a subband for a cell-specific uplink slot or symbol.

The method of dynamically configuring a subband based on Methods 3-1, 3-2, and 3-3 for the UE may be applied to a UE-specific flexible slot or symbol. In addition, the method of dynamically configuring a subband based on Methods 3-1, 3-2, and 3-3 for the UE may be applied to a UE-specific downlink slot or symbol.

The UE may be dynamically indicated to activate or release the sub-band operation of the UE through medium access control (MAC) signaling or dynamic signaling from the base station. The UE may be indicated with information to activate or release the sub-band operation depending on channel conditions that change in real time by the base station through the reception of PDSCH including MAC control element (CE) as MAC signaling, or through DCI received through PDCCH as layer 1 (L1) dynamic signaling. Thereafter, the UE and the base station may operate as subbands or may not operate as subbands from a specific time point. The specific time point may be the slot in which the PDSCH is received when receiving a PDSCH including MAC CE, or the slot in which the ACK is transmitted as the HARQ-ACK corresponding to the PDSCH by confirming the reception of the PDSCH. Alternatively, the specific time point may be the earliest downlink slot or symbol(s) or flexible slot or symbol(s) in the time domain after the slot in which the DCI is received as L1 dynamic signaling when receiving a DCI. Alternatively, the specific time point may be the downlink slot or symbol(s) or flexible slot or symbol(s) indicated by the DCI. The above-described operation may be defined as follows depending on whether a semi-static sub-band format is configured.

When the UE is configured with a semi-static sub-band format from the base station, the UE may additionally be indicated to activate or release the sub-band operation through MAC signaling or dynamic signaling. When the UE is configured to operate as a subband from the base station, but is indicated to release the sub-band operation through MAC signaling or dynamic signaling, the UE may not operate as the subband from a specific time point. When the UE is subsequently indicated to activate the sub-band operation through MAC signaling or dynamic signaling, the UE may operate as the subband again from a specific time point. In this case, resource allocation for the sub-band operation (i.e., downlink RB, uplink RB, or flexible RB) may follow the sub-band format with that the UE has been configured semi-statically.

When the UE is dynamically indicated by the base station to release (or de-activate) the sub-band operation, the UE may receive an SFI included in the DCI format 2_0 transmitted through GC-PDCCH. The GC-PDCCH may be CRC scrambled with SFI-RNTI for the UEs receiving the slot configuration information. Specifically, the UE may receive a dynamic SFI through the GC-PDCCH for a slot or symbol(s) in which multiple subbands are semi-statically configured in the frequency domain from the base station, and may be indicated as one of a downlink symbol, an uplink symbol, and a flexible symbol, or may be configured to fallback to a previously configured TDD slot format in the dynamic SFI, for example, to follow a TDD UL/DL slot format without sub-band configuration, depending on the TDD-UL/DL-common or TDD-UL/DL-dedicated configuration. Therefore, the UE may not operate as a subband in the corresponding slot or symbol(s). The slot or symbol(s) in which the UE is configured with multiple subbands may include a downlink symbol (cell-specific or UE-specific) or a flexible symbol (cell-specific or UE-specific). For convenience of description, a downlink symbol configured with multiple subbands may be referred to as an SBFD-downlink symbol, and a flexible symbol configured with multiple subbands may be referred to as an SBFD-flexible symbol.

When the slot or symbol(s) for which the sub-band operation is released are SBFD-downlink symbols, the UE may be indicated with the corresponding symbols as downlink symbols through dynamic SFI. That is, the UE may not expect to be indicated with the SBFD-downlink symbols as symbols of a different type (i.e., flexible or uplink) through dynamic SFI. Alternatively, when fallback to a TDD slot format prior to the sub-band configuration is indicated by the dynamic SFI, the UE may assume the corresponding slot or symbol as a preconfigured TDD slot format. Therefore, the UE may not expect to be indicated with a slot or symbol other than a preconfigured TDD slot or symbol type for the corresponding slot or symbol.

When the slot or symbol(s) for which the sub-band operation is released are SBFD-flexible symbols, the UE may be indicated with the corresponding symbols as either downlink symbols or flexible symbols through dynamic SFI. That is, the UE may not expect to be indicated with the SBFD-flexible symbols as uplink symbols through dynamic SFI. Alternatively, when fallback to a TDD slot format prior to the sub-band configuration is indicated by the dynamic SFI, the UE may assume the corresponding slot or symbol as a preconfigured TDD slot format. Therefore, the UE may not expect to be indicated with a slot or symbol other than a preconfigured TDD slot or symbol type for the corresponding slot or symbol.

Embodiment: Signal Transmission and Reception when Subbands are Configured

First, the terms used in the disclosure are defined.
SBFD (subband non-overlapping full duplex): It refers to a method of supporting simultaneous transmission and reception operations using a subband within a cell/BWP. Here, the subband refers to a frequency band configured/indicated for SBFD operation within a cell/BWP. One subband may be configured with one consecutive (P) RB set. Examples of sub-band configuration/format may be referred to FIGS. 12 to 18. For example, in the case of unpaired spectrum (i.e., TDD cell/BWP), a UL subband may be configured on a DL slot/symbol, or a UL subband may be configured on a flexible slot/symbol. Alternatively, in the case of unpaired spectrum, a DL subband may be configured on a flexible slot/symbol. Here, DL slots/symbols, flexible slots/symbols may be configured through cell-specific RRC signals (e.g., TDD-ConfigCommon) and/or UE-specific RRC signals (e.g., TDD-ConfigDedicated). When the SBFD operation is configured for a cell/BWP, the cell/BWP may include TDMed SBFD intervals and non-SBFD intervals in the time domain.

SBFD interval (or subband interval): It refers to a time interval in which a subband is configured/indicated on a cell/BWP. For example, the SBFD interval includes a time interval in which an uplink subband is configured/indicated. For example, the SBFD interval includes a slot in which an uplink subband is configured/indicated. For example, the SBFD interval includes symbol(s) (or symbol set) in which an uplink subband is configured/indicated. The SBFD interval includes an SBFD-slot (or sub-band slot) and/or an SBFD-symbol (or sub-band symbol). Here, the SBFD-slot indicates a slot in which a subband is configured/indicated, and the SBFD-symbol indicates a symbol in which a subband is configured/indicated. The SBFD interval may include one or more subbands in the frequency domain. When multiple subbands are configured in the SBFD interval, the subbands are FDMed. In the SBFD interval, multiple subbands (DL subbands or UL subbands) may be configured non-overlapping in the frequency domain.

Non-SBFD interval (or non-subband interval): It refers to a time interval in which a subband is not configured/indicated on a cell/BWP. The non-SBFD interval includes a non-SBFD slot and/or a non-SBFD symbol. Here, the non-SBFD-slot (or non-subband-slot) indicates a slot in which a subband is not configured/indicated, and a non-SBFD-symbol (or non-subband symbol) indicates a symbol in which a subband is not configured/indicated. The non-SBFD interval refers to a legacy interval or a normal interval. The non-SBFD interval includes at least one of a DL symbol, a flexible symbol, and a UL symbol depending on the slot format.

Legacy NR system: It refers to a system that operates according to the existing NR method because SBFD operation is not supported or configured.

Hereinafter, a method of receiving or transmitting a radio channel/signal by a UE in a wireless communication system supporting SBFD will be described.

[1] PDSCH Reception on Sub-Band Symbol
(1-1) PDSCH Resource Allocation

Figure 19:
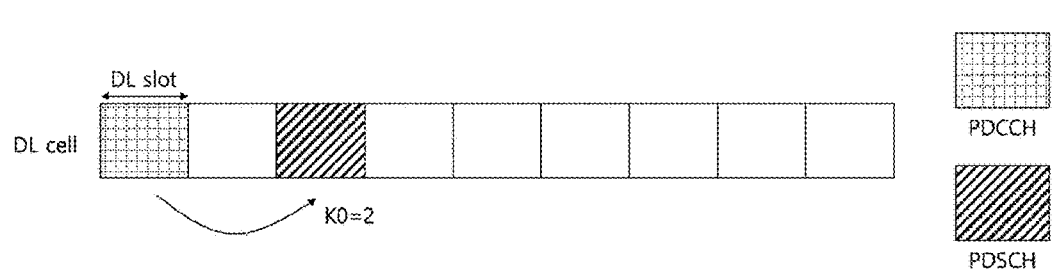
FIG. 19 illustrates a physical downlink shared channel (PDSCH) reception method.

A method of receiving a PDSCH by the UE will be described with reference to FIG. 19.

When a UE receives a DCI format (e.g., DCI format 1_0, 1_1, or 1_2) for scheduling a PDSCH, the UE must receive the PDSCH scheduled by the DCI format. For convenience, the DCI format for scheduling the PDSCH is referred to as a DL grant DCI or a DL grant DCI format. In order to receive the PDSCH, the UE must interpret (determine) the slot in which the PDSCH is scheduled and the starting index and length of the symbol within the slot from the DCI format. The time domain resource assignment (TDRA) field of DCI format 1_0, 1_1, or 1_2 may indicate the K0 value, which is the timing information (e.g., slot offset) of the scheduled slot, and the starting length indicator value (SLIV), which is the index and length of the starting symbol within the slot. Here, the value of K0 may be a non-negative integer value. Here, SLIV may be a jointly encoded value of the index(S) and length (L) of the starting symbol within the slot. In addition, SLIV may be a value in which the index(S) and length (L) of the starting symbol within the slot are transmitted separately. Here, in the case of a normal CP, S may have one of the values 0, 1, ..., 13, and L may have one of the natural numbers satisfying the condition that S+L is less than or equal to 14. In the case of an extended CP, S may have one of the values 0, 1, ..., 11, and L may have one of the natural numbers satisfying the condition that S+L is less than or equal to 12.

The UE may determine the slot in which the PDSCH should be received based on the K0 value. Specifically, the UE may determine the slot in which the PDSCH is received based on the K0 value and the index of the slot in which the DL grant DCI is received, the subcarrier spacing (SCS) of the downlink BWP in which the DL grant DCI is received, and the subcarrier spacing of the downlink BWP in which the scheduled PDSCH is received.

For example, assume that the subcarrier spacing of the downlink BWP in which the DL grant DCI is received and the downlink BWP in which the scheduled PDSCH is received are the same. In addition, assume that the DL grant DCI is received in downlink slot n. In this case, the PDSCH may be received in downlink slot n+K0.

For example, assume that the subcarrier spacing of the downlink BWP in which the DL grant DCI is received is 15 kHz*$2^{mu\_PDCCH}$, and the subcarrier spacing of the downlink BWP in which the scheduled PDSCH is received is 15 kHz-*$2^{mu\_PDSCH}$. Assume that the DCI is received in the downlink slot n. Here, the index of the downlink slot n is an index according to the subcarrier spacing of the downlink BWP in which the DCI is received. In this case, the PDSCH must be received in the slot floor (n*$2^{mu\_PDSCH}/2^{mu\_PDCCH}$)+K0. Here, the index of the downlink slot floor (n*$2^{mu\_PDSCH}/2^{mu\_PDCCH}$)+K0 is an index according to the subcarrier spacing of the downlink BWP where the PDSCH is received. In the above description, mu_PDCCH and mu_PDSCH may each have one of the values 0, 1, 2, and 3.

The UE may determine the symbol that must receive the PDSCH by using the index(S) and length (L) of the starting symbol within the slot in which the PDSCH must be received based on the K0 value. The symbol that must receive the PDSCH is the symbol S to S+L−1 within the slot obtained based on the K0 value. For reference, the symbols S to S+L−1 are L consecutive symbols.

A downlink slot aggregation may be configured for the UE by the base station. The value of downlink slot aggregation may be 2, 4, or 8. When the downlink slot aggregation is configured, the UE may receive the PDSCH in consecutive slots corresponding to the slot aggregation value starting from the slot obtained based on the K0 value.

The frequency domain information of PDSCH indicated by the frequency domain resource allocation (FDRA) field in DCI format 1_0, 1_1, or 1_2 may be divided into two types depending on the frequency resource allocation type.

The first type is FDRA type 0, which generates a resource block group (RBG) by grouping a fixed number of PRBs according to the number of RBs included in the BWP configured for the UE, and the UE determines whether to use the corresponding RBG by receiving the indicated bitmap of RBG units. The number of PRBs (P) included in one RBG may be configured as shown in Table 6 according to the number of PRBs included in the BWP configured for the UE and the configuration from the higher layer (Configuration 1 or Configuration 2). The UE may be indicated of the PDSCH reception through FDRA type 0 only when receiving indication of the PDSCH reception through DCI format 1_1 or 1_2. In other words, when receiving indication of the PDSCH reception through DCI format 1_0, the UE cannot receive indication of the PDSCH reception through the FDRA type 0.

TABLE 6

| Bandwidth Part Size (RBs) | Configuration 1 (P) | Configuration 2 (P) |
|---|---|---|
| 1-36 | 2 | 4 |
| 37-72 | 4 | 8 |
| 73-144 | 8 | 16 |
| 145-275 | 16 | 16 |

The UE may determine the total number of RBGs, $N_{RBG}$, in the $i_{th}$ downlink BWP as shown in Equation 1 below.

$$N_{RBG} = \lceil (N^{size}_{BWP,i} + (N^{start}_{BWP,i} \bmod P))/P \rceil \quad \text{[Equation 3]}$$

Here, $N^{size}_{BWP,i}$ is the number of PRBs of the it downlink BWP. $N^{start}_{BWP,i}$ is the starting PRB index of the it downlink BWP.

The number of PRBs ($RBG^{size}_0$) of the first RBG ($RBG_0$) is P-$N^{start}_{BWP,i}$ mod P.

The number of PRBs ($RBG^{size}_{last}$) of the last RBG ($RBG_{last}$) is ($N^{start}_{BWP,i}$+$N^{size}_{BWP,i}$) mod P when ($N^{start}_{BWP,i}$+$N^{size}_{BWP,i}$) mod P>0, and P when ($N^{start}_{BWP,i}$+$N^{size}_{BWP,i}$) mod P≤0.

The number of PRBs of the remaining RBGs excluding the first and last RBGs is P.

The second type is FDRA type 1, which may indicate information on consecutive PRBs allocated according to the size of the initial BWP or active BWP of the UE. This information is a resource indication value (RIV) in which the starting index(S) and length (L) of consecutive PRBs are jointly encoded, and may be determined according to Equation 4. When indicated to receive PDSCH through DCI format 1_0, 1_1, or 1_2, the UE may be indicated to receive PDSCH with FDRA type 1.

$$\text{if } (L_{RBs} - 1) \le \lfloor N^{size}_{BWP}/2 \rfloor \text{ then} \quad \text{[Equation 4]}$$
$$RIV = N^{size}_{BWP}(L_{RBs} - 1) + RB_{start} \text{ else}$$
$$RIV = N^{size}_{BWP}(N^{size}_{BWP} - L_{RBs} + 1) + (N^{size}_{BWP} - 1 - RB_{start}) \text{ where}$$
$$L_{RBs} >= 1 \text{ and shall not exceed } N^{size}_{BWP} - RB_{start}.$$

Here, $L_{RBs}$ is the number of consecutively allocated RBs, $RB_{start}$ is the starting RB index, and $N^{size}_{BWP}$ is the BWP size of the UE.

For DCI format 1_1 or 1_2 that schedules PDSCH, the UE may be configured by the higher layer to use only one of the two FDRA types or to dynamically use both FDRA types. When configured to dynamically use two FDRA types, the UE may determine the FDRA type through the most significant bit (MSB) 1 bit of the FDRA field in DCI format 1_1 or 1_2 that schedules PDSCH.

(1-2) PDSCH Reception on Sub-Band Symbol

One of the problems to be solved in the disclosure relates to a PDSCH frequency domain resource allocation method when the UE is configured or indicated to receive PDSCH in slots or symbol(s) configured or indicated to operate as a subband from the base station.

Figure 20:
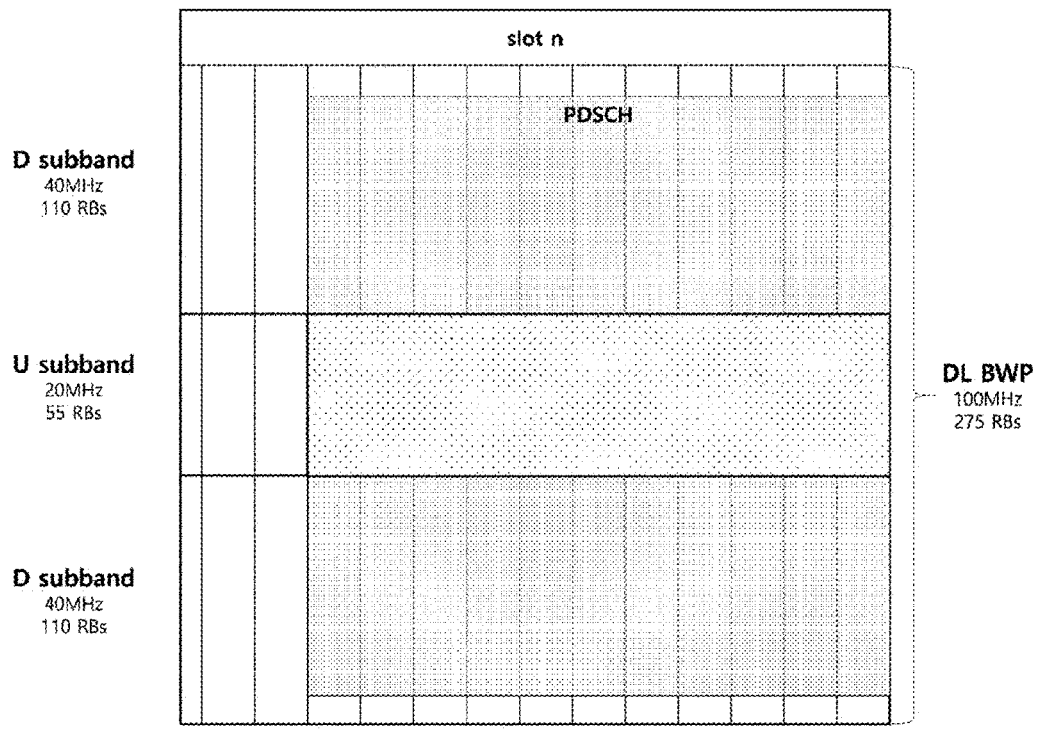
FIGS. 20 to 25 illustrate a PDSCH reception method according to an embodiment of the disclosure.

Referring to FIG. 20, when the uplink and downlink subcarrier spacing is 30 kHz and the downlink BWP is 100 MHz (275 RBs), the UE may be allocated two downlink subbands of 40 MHz (110 RBs) each and the uplink subband of 20 MHz (55 RBs). In this case, the UE may be configured or indicated to receive one PDSCH in two inconsecutive (non-contiguous) downlink subbands. The method for the UE to receive the PDSCH in the inconsecutive resources of the frequency domain is as follows.

Method 1: The UE may be configured or indicated to receive PDSCH from FDRA type 0 in a slot or symbol(s) operating as a subband. In the existing NR system, FDRA type 0 supports reception of inconsecutive PDSCH in the frequency domain, so PDSCH may be scheduled from the base station through the corresponding type of FDRA.

Figure 21:
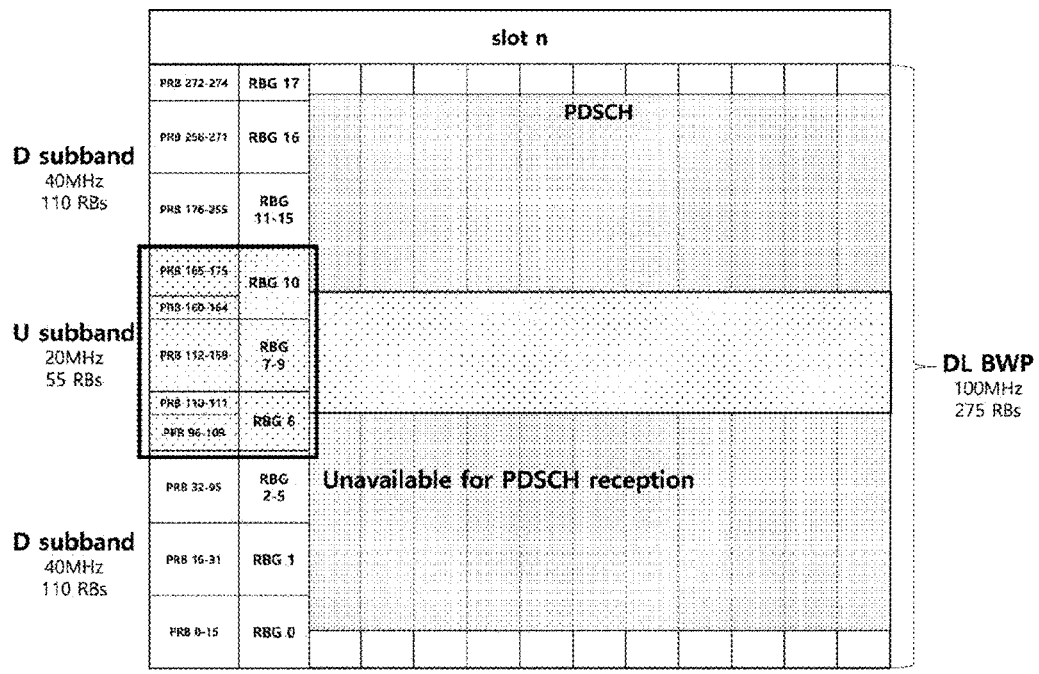

Referring to FIG. 21, when the uplink and downlink subcarrier spacing is 30 kHz and the downlink BWP is 100 MHz (275 RBs), the UE may be allocated two downlink subbands of 40 MHz (110 RBs) each and the uplink subband of 20 MHz (55 RBs). In addition, the number of PRBs (i.e., P) per RBG for PDSCH FDRA type 0 may be configured as 16. According to Equation 3, the UE may determine multiple PRBs as one RBG as follows.

Number of RBGs=

$$\left\lceil \left(N^{size}_{BWP,i} + \left(N^{start}_{BWP,i} \bmod P\right)\right)/P \right\rceil = \lceil (275 + (0 \bmod 16))/16 \rceil = 18$$

Number of PRBs of the first RBG (RBG 0): $P-N^{start}_{BWP,i}$ mod $P=16-0$ mod $16=16$ Number of PRBs of the last RBG (RBG 17): $(N^{start}_{BWP,i}+N^{size}_{BWP,i})$ mod $P=(0+275)$ mod $16=3$ Number of PRBs of the remaining RBGs (RBG 1-16): $P=16$ In this case, some (or all) RBs in the RBG may overlap the uplink subband. In FIG. 21, five RBGs (RBG 6-10) overlap uplink subbands partially (RBG 6, RBG 10) or entirely (RBG 7-9). Therefore, RBG 6-10 cannot be indicated as an RBG for PDSCH reception. Accordingly, PRB 96-109 of RBG 6 and PRB 165-175 of RBG 10 are included in the downlink subband but cannot be used for PDSCH reception. Hereinafter, a method for solving this problem is disclosed.

Figure 22:
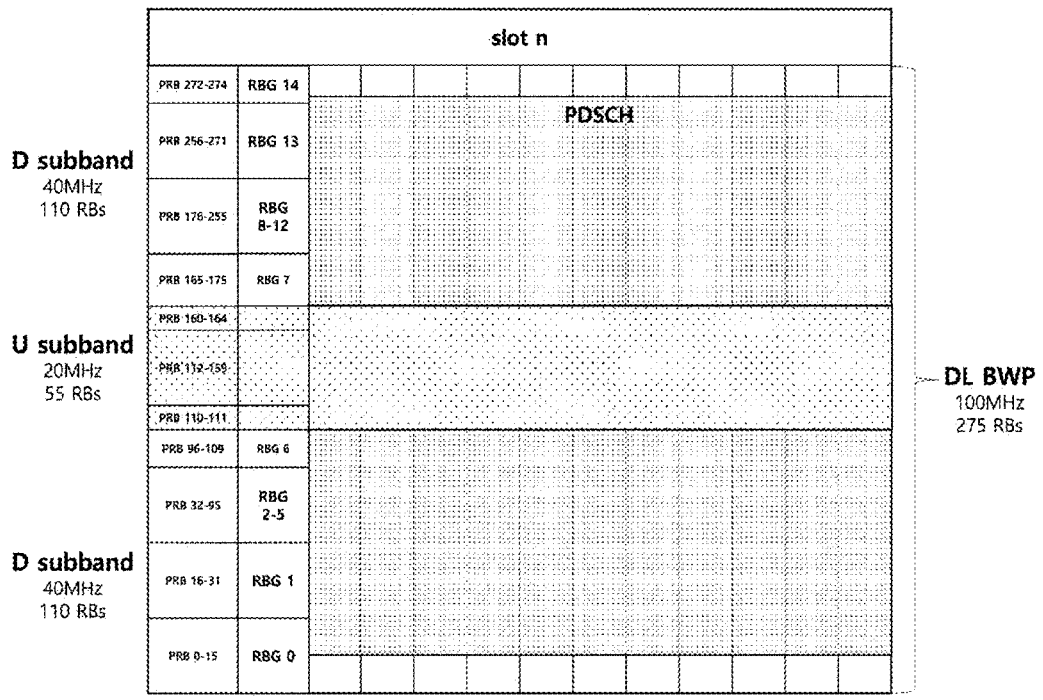

Method 1-1: Method 1-1 is illustrated in FIG. 22. The UE may determine RBG based on consecutive PRBs. That is, only consecutive PRBs in each of two downlink subbands excluding the uplink subband may be determined as one RBG. In this method, RBG may be determined according to Equation 5 below.

$$N_{RBG} = \left\lceil \left(N^{size}_{BWP,i,DL(1)} + \left(N^{start}_{BWP,i,DL(1)} \bmod P\right)\right)/P \right\rceil + \left\lceil \left(N^{size}_{BWP,i,DL(2)} + \left(N^{start}_{BWP,i,DL(2)} \bmod P\right)\right)/P \right\rceil \quad \text{[Equation 5]}$$

Here, $N^{size}_{BWP,i,DL(1)}$ is the number of PRBs of the first downlink subband of the it downlink BWP, and $N^{size}_{BWP,i,DL(2)}$ is the number of PRBs of the second downlink subband of the $i_{th}$ downlink BWP. $N^{start}_{BWP,i,DL(1)}$ is the starting PRB index of the first downlink subband of the $i_{th}$ downlink BWP, and $N^{start}_{BWP,i,DL(2)}$ is the starting PRB index of the second downlink subband of the $i_{th}$ downlink BWP.

The first downlink subband may be a downlink subband with a lower PRB index than the second downlink. The number of PRBs included in the first RBG, the last RBG, and other RBGs in the $j_{th}$ (first or second) downlink subband may be determined as follows.

The number of PRBs ($RBG^{size}_0$) of the first RBG ($RBG_0$) is $P-N^{start}_{BWP,i,DL(j)}$ mod $P$.

The number of PRBs ($RBG^{size}_{last}$) of the last RBG ($RBG_{last}$) is $(N^{start}_{BWP,i,DL(j)}+N^{size}_{BWP,i,DL(j)})$ mod $P$ when $(N^{start}_{BWP,i,DL(j)}+N^{size}_{BWP,i,DL(j)})$ mod $P>0$, and $P$ when $(N^{start}_{BWP,i,DL(j)}+N^{size}_{BWP,i,DL(j)})$ mod $P\leq 0$.

The number of PRBs of the remaining RBGs excluding the first and last RBGs is P.

In FIG. 22, the UE may determine multiple PRBs as one RBG according to Equation 5 as follows.

Figure 23:
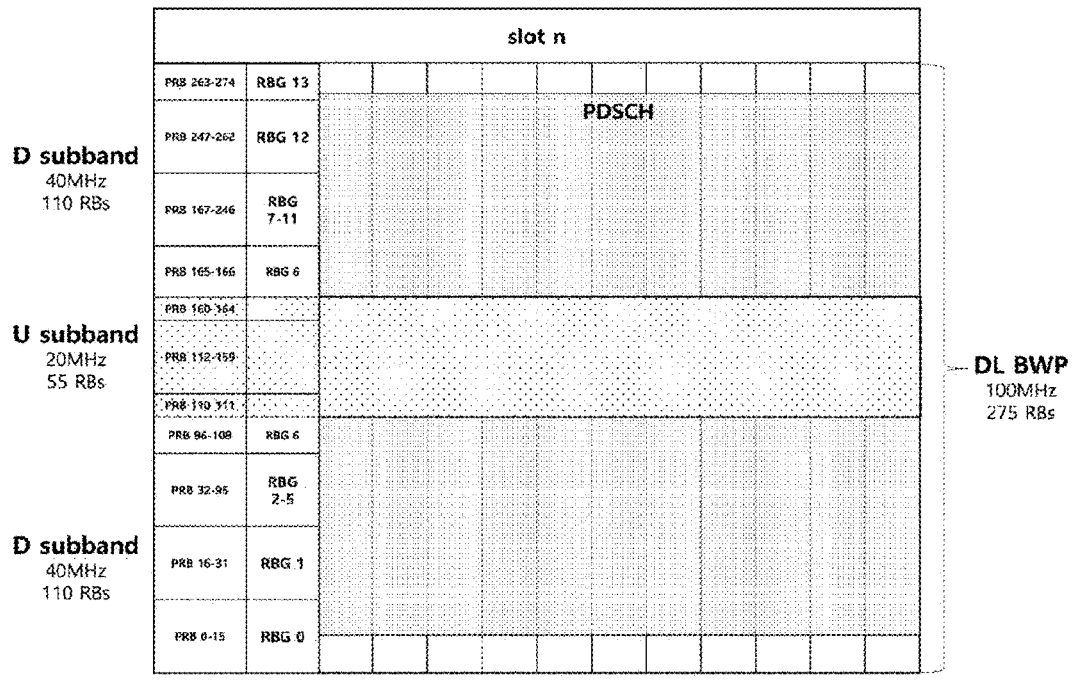

Number of RBGs=$\lceil(110+(0 \bmod 16))/16\rceil + \lceil(110+(165 \bmod 16))/16\rceil=15$ Number of PRBs of the first RBG (RBG 0) of the first downlink subband: $16-0$ mod $16=16$ Number of PRBs of the last RBG (RBG 6) of the first downlink subband: $(0+110)$ mod $16=14$ Number of PRBs of the remaining RBGs (RBG 1-5) of the first downlink subband: $P=16$ Number of PRBs of the first RBG (RBG 7) of the second downlink subband: $16-165$ mod $16=11$ Number of PRBs of the last RBG (RBG 14) of the second downlink subband: $(165+110)$ mod $16=3$ Number of PRBs of the remaining RBGs (RBG 8-13) of the second downlink subband: $P=16$ Method 1-2: Method 1-2 is illustrated in FIG. 23. The UE may determine RBG based on inconsecutive PRBs. That is, the inconsecutive PRBs of two downlink subbands excluding the uplink subband may be determined as one RBG. In this method, RBG may be determined according to Equation 6 below.

$$N_{RBG} = \left\lceil \left(N^{size}_{BWP,i,DL} + \left(N^{start}_{BWP,i} \bmod P\right)\right)/P \right\rceil \quad \text{[Equation 6]}$$

Here, $N^{size}_{BWP,i,DL}$ is the number of PRBs in the downlink subband of the $i_{th}$ downlink BWP. $N^{start}_{BWP,i}$ is the starting PRB index of the $i_{th}$ downlink BWP.

The number of PRBs ($RBG^{size}_0$) of the first RBG ($RBG_0$) of the downlink subband is $P-N^{start}_{BWP,i}$ mod $P$.

The number of PRBs ($RBG^{size}_{last}$) of the last RBG ($RBG_{last}$) of the downlink subband is $(N^{start}_{BWP,i}+N^{size}_{BWP,i,DL})$ mod $P$ when $(N^{start}_{BWP,i}+N^{size}_{BWP,i,DL})$ mod $P>0$, and $P$ when $(N^{start}_{BWP,i}+N^{size}_{BWP,i,DL})$ mod $P\leq 0$.

The number of PRBs of RBGs excluding the first RBG and the last RBG of the downlink subband is P.

In FIG. 23, the UE may determine multiple PRBs as one RBG according to Equation 6 as follows.

Number of RBGs=$\lceil(220+(0 \bmod 16))/16\rceil=14$

Number of PRBs of the first RBG (RBG 0) of the downlink subband: $16-0$ mod $16=16$ Number of PRBs of the last RBG (RBG 13) of the downlink subband: $(0+220)$ mod $16=12$ Number of PRBs of the remaining RBGs (RBG 1-12) of the downlink subband: $P=16$ Method 1-1 to Method 1-2 may improve downlink coverage by allowing all PRBs included in a downlink subband to be used for PDSCH reception when the UE is configured or indicated by the base station to receive PDSCH with FDRA type 0. In addition, since the number of RBGs may be reduced compared to conventional techniques, there is an advantage in that the bits of the FDRA field in the DCI scheduling the PDSCH may be used to indicate other information.

The Method 1, i.e., FDRA type 0, cannot be used when PDSCH reception is indicated through DCI format 1_0. Therefore, when PDSCH reception is indicated through DCI format 1_0 (i.e., FDRA type 1), the same problem may still occur. Hereinafter, a method for the UE to receive PDSCH in PRBs within the inconsecutive downlink subband regardless of the FDRA type is described.

Method 2: When the UE is configured or indicated to receive PDSCH from the base station in the slot or symbol(s) operating as a subband, the PRBs included in the uplink subband may be assumed to be unavailable for PDSCH reception. According to Method 2, in FIG. 21, the UE may be configured to receive PDSCH as FDRA type 0 from the base station. In this case, even if the UE is indicated to receive PDSCH in RBG 6-10, the UE may assume that the PRBs included in the uplink subband among RBG 6-10 are unavailable for PDSCH reception. Accordingly, the UE may not receive PDSCH in the unavailable PRBs, and may receive PDSCH in the PRBs included in the downlink subband among the PRBs of RBG 6 and RBG 10.

Figure 24:
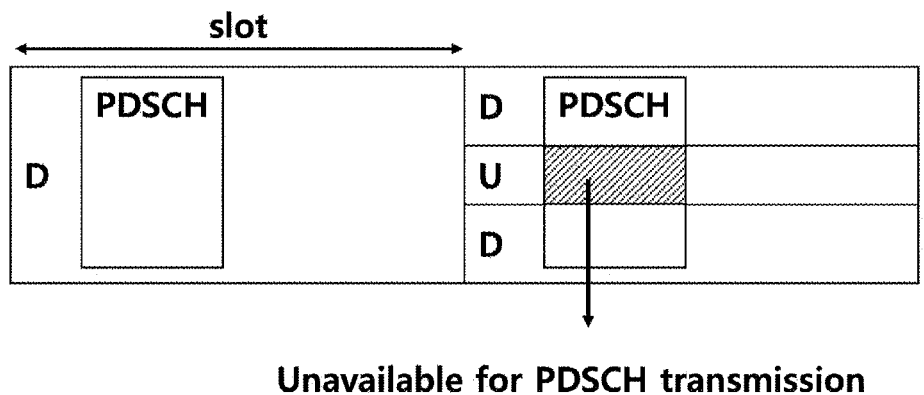

When the UE receives the PDSCH according to Method 2, the UE may be additionally configured or indicated to receive the PDSCH in multiple slots from the base station (i.e., slot aggregation). In this case, the multiple slots may include slots that operate as subbands and slots that do not operate as subbands. Referring to FIG. 24, the UE may be indicated to receive the PDSCH in two slots from the base station. The first slot is a slot that operates as a downlink slot without configuring a subband, and the second slot is a slot that operates as a sub-band slot with a configured subband. In this case, all PRBs to which PDSCH is allocated in the first slot are available for PDSCH reception, but PRBs included in the uplink subband in the second slot are unavailable for PDSCH reception. Therefore, the UE may determine different transport block size (TBS) of PDSCH for the two slots. Accordingly, the UE may not be able to soft combine PDSCHs received in the two slots, which may deteriorate PDSCH reception performance. The TBS may be determined based on (i) the number of (available) PRBs for PDSCH reception, and (ii) the number of (available) symbols for PDSCH reception.

Figure 25:
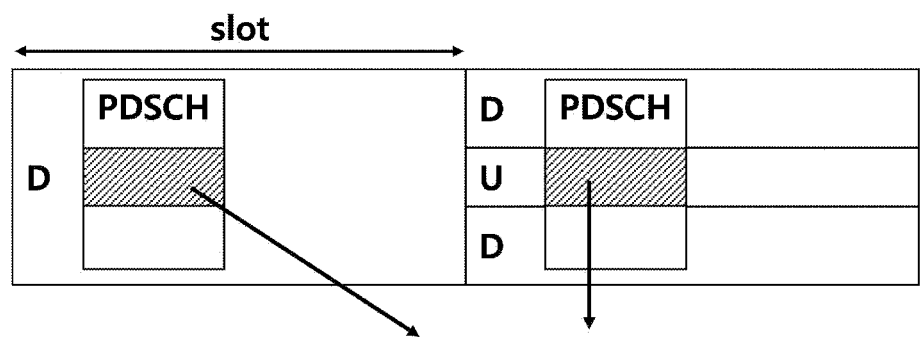

Hereinafter, an example of the disclosure for solving the above problem is described. When the UE receives PDSCH by slot-merging in multiple slots, the multiple slots may include both slots that operate as subbands (i.e., subband-slots) and slots that do not operate as subbands (i.e., non-subband-slots). In this case, the base station may configure a TBS for the UE based on the subband-slot. In addition, the UE may receive the PDSCH assuming the TBS configured based on the subband-slot. That is, referring to FIG. 25, in the first slot in which the UE is indicated to receive PDSCH from the base station, PRBs corresponding to the uplink subband of the second slot are available for PDSCH reception, but in the second slot, PRBs included in the uplink subband are not available for PDSCH reception. Accordingly, the base station may rate-match or puncture resources for PDSCH in the PRBs corresponding to the uplink subband of the second slot (the slot in which the sub-band configuration is configured) in the first slot, or may transmit PDSCH by excluding transmission of PDSCH in the corresponding PRBs. Accordingly, when receiving PDSCH in the first slot, the UE may assume that PRBs included in the uplink subband of the second slot (subband-slot) are unavailable for PDSCH reception, and rate-match or puncture resources for PDSCH in the PRBs included in the uplink subband, or may receive PDSCH by excluding transmission of PDSCH in the corresponding PRBs.

CSI-RS Reception and CSI Reporting when Subbands are Configured (2-1) CSI Framework Channel state information-reference signal (CSI-RS) may be used for time and/or frequency tracking, CSI computation, layer 1 (L1)-reference signal received power (RSRP) computation, and mobility. Here, CSI computation is related to CSI acquisition, and L1-RSRP computation may be related to beam management (BM).

The configuration information related to CSI may include at least one of CSI-IM (interference management) resource related information, CSI measurement configuration related information, CSI resource related information, CSI-RS resource related information, or CSI reporting configuration related information.

CSI-IM resource related information may include CSI-IM resource information, CSI-IM resource set information, etc. CSI-IM resource set is identified by a CSI-IM resource set identifier (ID), and one resource set includes at least one CSI-IM resource. Each CSI-IM resource may be identified by a CSI-IM resource ID. CSI resource configuration related information may be expressed as a CSI-ResourceConfig IE (information element). The CSI resource configuration related information defines a group including at least one of a non-zero power (NZP) CSI-RS resource set, a CSI-IM resource set, or a CSI-SSB resource set. That is, the CSI resource configuration related information includes a CSI-RS resource set list, and the CSI-RS resource set list may include at least one of an NZP CSI-RS resource set list, a CSI-IM resource set list, or a CSI-SSB resource set list. CSI-RS resource set is identified by a CSI-RS resource set ID, and one resource set includes at least one CSI-RS resource. Each CSI-RS resource may be identified by the CSI-RS resource ID.

The UE may perform CSI measurement and CSI reporting on resources configured to receive CSI-RS. To this end, the UE may perform aperiodic/semi-persistent/periodic channel measurement (CM) or interference measurement (IM) in the time domain.

CSI report configuration related information includes reportConfigType parameter indicating time domain behavior and reportQuantity parameter indicating CSI related quantity to report. Time domain behavior may be periodic, aperiodic or semi-persistent. CSI report configuration related information may be expressed as CSI-ReportConfig IE.

(2-2) CSI-RS Resource Configuration

A method for the UE to receive a resource configured for receiving a CSI-RS by the UE is described.

The CSI resource setting "CSI-ResourceConfig" configured for the UE from the base station for receiving CSI-RS may include configurations for S>1 CSI resource sets (given by the higher layer (e.g., RRC) parameter csi-RS-Resource-SetList). The CSI resource setting corresponds to CSI-RS-resourcesetlist. Here, S represents the number of configured CSI-RS resource sets. Here, the configuration for S≥1 CSI resource sets includes each CSI resource set including CSI-RS resources (configured with NZP CSI-RS or CSI-IM) and SS/PBCH block (SSB) resources used for L1-RSRP computation.

Here, each CSI resource setting is located in a DL BWP identified by the higher layer parameter bwp-id. In addition, all CSI resource settings linked to a CSI report setting have the same DL BWP.

Within the CSI resource settings included in the CSI-ResourceConfig IE, the time domain behavior of the CSI-RS resource is indicated by the higher layer parameter resourceType, which may be configured to aperiodic, periodic or semi-persistent. In periodic and semi-persistent CSI resource settings, the number of CSI-RS resource sets(S) is limited to "1". In periodic and semi-persistent CSI resource settings, the periodicity and slot offset of the CSI resource are given by the numerology information of the associated DL BWP.

When the UE is configured with multiple CSI-ResourceConfigs including the same NZP CSI-RS resource ID, the same time domain behavior is configured for the CSI-ResourceConfig.

When the UE is configured with multiple CSI-ResourceConfigs including the same CSI-IM resource ID, the same time domain behavior is configured for the CSI-ResourceConfig.

One or more CSI resource settings for the following CM and IM are configured through higher layer (e.g., RRC) signaling.

CSI-IM resource for interference measurement
NZP CSI-RS resource for interference measurement
NZP CSI-RS resource for channel measurement When NZP CSI-RS resource or CSI-IM resource is configured from the base station, the UE may be configured with the frequency domain resource (or bandwidth) of CSI-RS as follows.

The UE may determine the bandwidth of the CSI-RS resource in the BWP and the initial common resource block (CRB) index based on the parameters nrofRBs and startingRB configured by the base station, respectively. Here, both nrofRB and startingRB are configured as integer multiples of 4 RBs, and the reference point of startingRB is CRB 0 in the CRB grid.

When startingRB<$N^{start}_{BWP}$, the UE may assume that the initial CRB index of the CSI-RS resource is $N_{initial\_RB}=N^{start}_{BWP}$.

When startingRB>$N^{start}_{BWP}$, the UE may assume $N_{initial\_RB}$=startingRB.

When nrofRBs>$N^{size}_{BWP}+N^{start}_{BWP}-N_{initial\_RB}$, the UE may assume that the bandwidth of the CSI-RS resource is $N^{BW}_{CSI-RS}=N^{size}_{BWP}+N^{start}_{BWP}-N_{initial\_RB}$.

When nrofRBs≤$N^{size}_{BWP}+N^{start}_{BWP}-N_{initial\_RB}$, the UE may assume that the bandwidth of the CSI-RS resource is $N^{BW}_{CSI-RS}\geq\min(24, N^{size}_{BWP})$. Therefore, the minimum bandwidth of the CSI-RS resource configured for the UE is 24 RBs.

Figure 26:
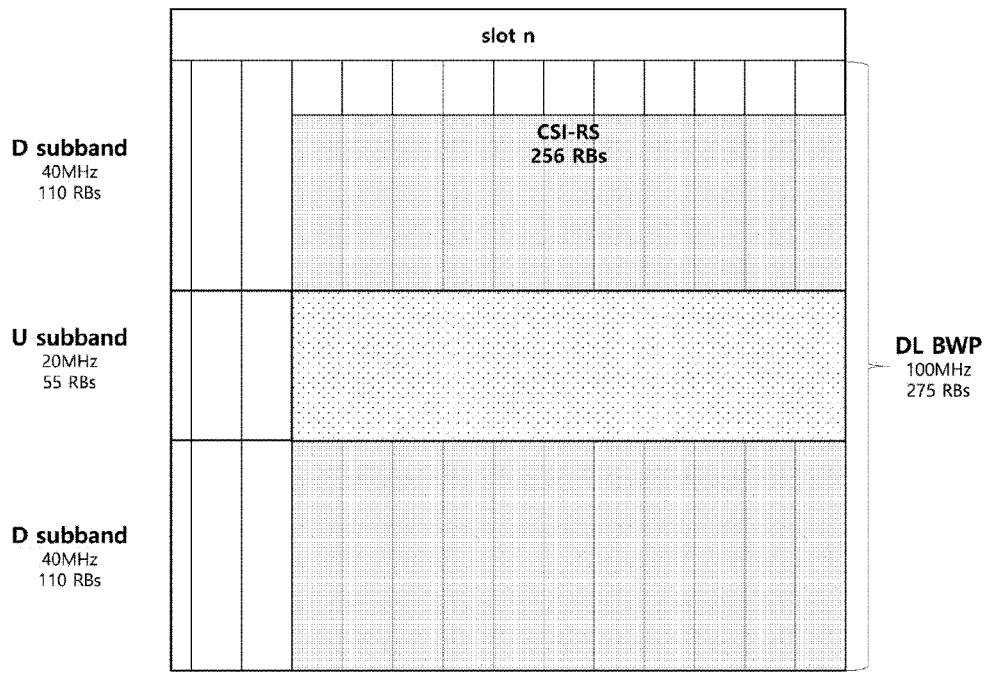
FIGS. 26 to 29 illustrate a channel state information reference signal (CSI-RS) reception method according to an embodiment of the disclosure.

FIG. 26 illustrates a problem in a case where the UE is configured with CSI-RS resources according to the method described above. When the uplink and downlink subcarrier spacing is 30 kHz and the downlink BWP is 100 MHz (275 RBs), the UE may be allocated two downlink subbands of 40 MHz (110 RBs) each and an uplink subband of 20 MHz (55 RBs). In addition, the UE may be configured with startingRB=0 and nrofRBs=256 for CSI-RS resources in slot n where the subband is configured. When the UE assumes that the UE cannot perform downlink reception in the uplink subband, the UE cannot receive CSI-RS in the uplink subband and may receive CSI-RS only in the downlink subband or in a frequency domain other than the uplink subband. In addition, nrofRBs, which is the bandwidth of the CSI-RS resource configured for the UE in the frequency domain, may be configured only with 4 consecutive RBs. Therefore, a method for receiving CSI-RS in inconsecutive downlink subbands in the frequency domain, or a method for receiving CSI-RS when frequency domains other than uplink subbands are configured inconsecutively, is required. Examples for solving this are disclosed below. Here, the non-uplink subband frequency domains may include at least one of a downlink subband, a flexible subband, and a guard band, or a combination thereof. In the description below, the downlink subband may be replaced with a non-uplink subband frequency domain.

Method 1: The UE may be configured with separate CSI-RS resources for each downlink subband. The UE may be configured with two separate CSI-RS resources to receive CSI-RS on inconsecutive downlink subbands. Specifically, the UE may be configured with two CSI-RS resources having separate resource IDs. The UE may be configured with each CSI-RS resource for inconsecutive downlink subbands in the frequency domain, or for subbands in the frequency domain that are not uplink subbands but are inconsecutively configured. In Method 1, the UE must always be configured with two CSI-RS resource IDs. However, since the maximum number of configurable resource IDs may be limited depending on the UE capability, flexible CSI-RS resource configuration may be difficult. In addition, considering that the minimum bandwidth of CSI-RS resources configured for the UE is 24-RB, if one downlink subband includes fewer than 24-RB RBs, a problem of not receiving CSI-RS resource configuration may occur. In addition, since the Method 1 requires receiving two CSI-RS resource configurations in performing CSI measurement in a specific slot, RRC configuration overhead may occur.

Method 2: The UE may be configured with inconsecutive CSI-RS resources for inconsecutive downlink subbands, or for subbands in which frequency domains other than uplink subbands are configured inconsecutively. Specifically, the UE may be configured with multiple startingRBs and nrofRBs for a resource having one CSI-RS resource ID. This enables more flexible CSI-RS resource configuration compared to the Method 1 by enabling inconsecutive CSI-RS resource configuration at least within the same resource ID. In addition, compared to Method 1, the total RBs of multiple downlink subbands may include more than 24 RBs, so the CSI-RS resource configuration may be relatively less restrictive. However, in Method 2, additional RRC configuration overhead may occur for CSI-RS resource configuration.

Method 3: The UE may assume that the RB included in the uplink subband is unavailable for CSI-RS reception. The UE may be configured with that the CSI-RS resource configuration includes uplink subbands in the same manner as in the conventional technology from the base station, but actual CSI-RS reception may only be received in RBs excluding RBs included in the uplink subbands among the configured resources. Since the UE and the base station know information on the downlink subband and uplink subband without ambiguity, the UE may receive CSI-RS in RBs excluding RBs included in the uplink subband in the slot or symbol(s) in which the subbands are configured. Considering that additional overhead for the CSI-RS resource configuration may occur in Methods 1 and 2, Method 3 has the advantage of being able to receive CSI-RS without additional overhead.

Figure 27:
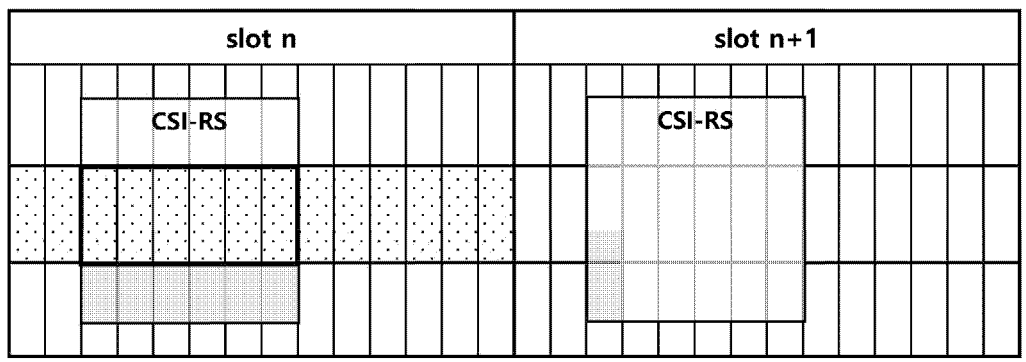

In addition, when the UE is indicated to release (or deactivate) the sub-band operation through dynamic SFI, the RBs included in the uplink subband may also be used again for CSI-RS reception. Referring to FIG. 27, when the UE is configured to receive CSI-RS with the same resource ID in slot n and slot n+1, the UE may receive CSI-RS in RBs excluding RBs included in the uplink subband in slot n for which the subband is configured, and may receive CSI-RS in all configured RBs including RBs included in the uplink subband in slot n+1 for which the sub-band operation is indicated to be released (through SFI).

(2-3) CSI Reporting

The UE may be configured or determine either wideband-based CSI reporting or subband-based CSI reporting for the configured CSI-RS resources in order to report CSI. When the UE is configured or determine subband-based CSI reporting, the UE may be configured with one of two possible subband sizes from a higher layer (e.g., RRC). Here, the subband size for CSI reporting is a separate term from the subband (i.e., downlink subband, uplink subband, or flexible subband) configured for the UE in the frequency domain, and is referred to as a CSI-subband hereinafter. One CSI-subband includes NSBPRB consecutive PRBs, and two configurable CSI-subband sizes are determined according to the total number of PRBs in the BWP of the UE (refer to Table 7), and the UE may be configured with one of them from a higher layer.

TABLE 7

| Bandwidth Part Size (PRBs) | Subband size (PRBs) |
|---|---|
| 24-72 | 4, 8 |
| 73-144 | 8, 16 |
| 145-275 | 16, 32 |

The UE may determine the size of the first CSI subband as $N^{SB}_{PRB} - (N^{start}_{BWP,i} \mod N^{SB}_{PRB})$.

The UE may determine the size of the last CSI-subband as $(N^{start}_{BWP,i} + N^{size}_{BWP,i}) \mod N^{SB}_{PRB}$ when $(N^{start}_{BWP,i} + N^{size}_{BWP,i}) \mod N^{SB}_{PRB} \neq 0$, and as $N^{SB}_{PRB}$ when $(N^{start}_{BWP,i} + N^{size}_{BWP,i}) \mod N^{SB}_{PRB} = 0$.

Figure 28:
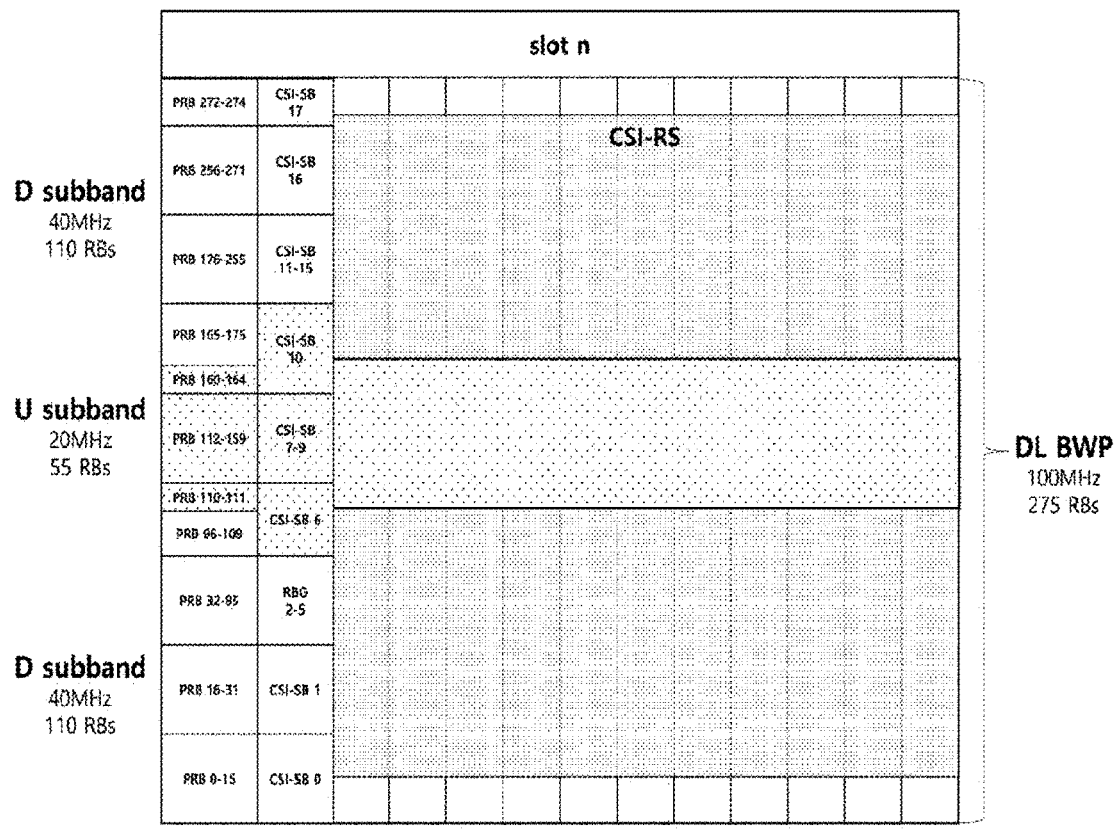

FIG. 28 illustrates a case in which the UE is configured with CSI reporting in a subband unit in a slot or symbol(s) in which subbands are configured. When the uplink and downlink subcarrier spacing is 30 kHz and the downlink BWP is 100 MHz (275 RBs), the UE may be allocated two downlink subbands of 40 MHz (110 RBs) each and an uplink subband of 20 MHz (55 RBs). In addition, when the UE is configured with the second of the two possible CSI-subband sizes (i.e., value 2) from the higher layer, the CSI-subband size may be determined as follows based on Table 7.

First CSI-subband size: 16−(0 mod 16)=16
Last CSI-subband size: (0+275) mod 16=3
Remaining CSI-subband sizes: NSBPRB=16

In FIG. 28, in CSI-subbands 7-9, since the RBs in the CSI-subbands fully overlap with the uplink subbands, the UE may not perform CSI reporting in the corresponding CSI-subbands. However, for CSI-subband 6 and CSI-subband 10, some RBs (PRBs 110-111 and PRBs 160-164) overlap with the uplink subbands, but some RBs (PRBs 96-109 and PRBs 165-175) are included in the downlink subbands that receive CSI-RS. Therefore, when the UE is configured to perform CSI reporting on CSI-subband 6 and CSI-subband 10, the UE may perform CSI measurement and reporting on the corresponding RBs (i.e., PRB 96-109 and PRB 165-175).

Figure 29:
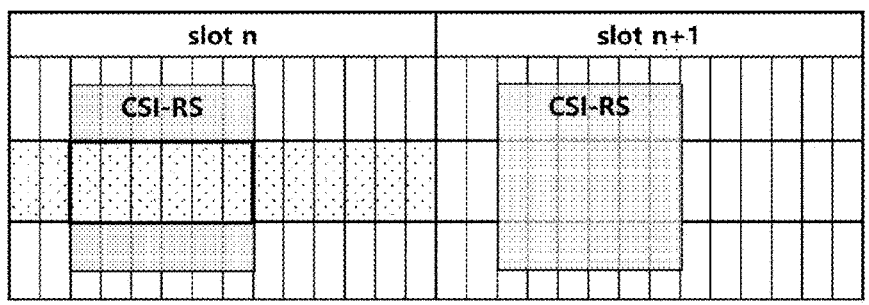
Figure 29:
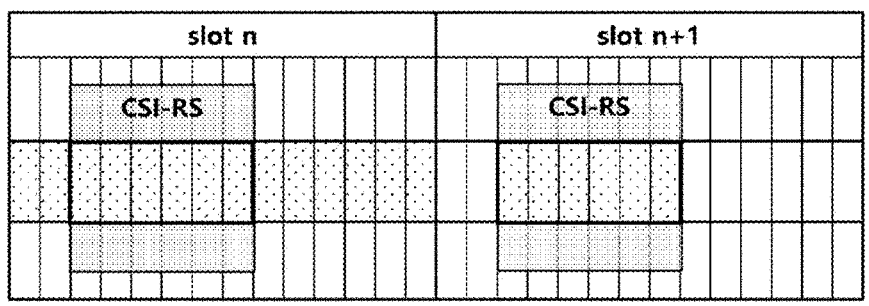

Referring to FIG. 29A, the base station may indicate the UE to release (or deactivate) the sub-band operation in slot n+1 through dynamic SFI, and the UE may detect the dynamic SFI. In this case, the UE may use the RB included in the uplink subband for CSI-RS reception again, and may also perform CSI measurement and reporting.

Referring to FIG. 29B, the base station may indicate the UE to release (or deactivate) the sub-band operation in slot n+1 through dynamic SFI, but the UE cannot detect the dynamic SFI. In this case, the UE may use the RB included in the uplink subband for CSI-RS reception again, and may also perform CSI measurement and reporting, but the UE may determine that CSI-RS reception is not possible for RBs in the uplink subband, and may not perform CSI measurement and CSI reporting. In other words, if dynamic SFI is not detected in slot n+1, the UE may perform CSI measurement and reporting only for RBs in the downlink subband in the slot. However, since the base station expects that the UE may perform CSI measurement and CSI reporting even in RBs included in the uplink subband, ambiguity may occur between the UE and the base station regarding RBs for CSI measurement and CSI reporting.

As an example to solve this, if the UE is configured to monitor GC-PDDCH (DCI format 2_0) including SFI that releases sub-band operation, and if DCI format 2_0 is not detected, the UE may not perform CSI reporting. This is a method that allows the base station to recognize that the UE does not receive SFI in the corresponding slot or symbol(s) by not performing CSI measurement and CSI reporting when the UE does not detect SFI to resolve the ambiguity between the UE and the base station described above. In other words, this is a method to resolve ambiguity between the UE and the base station by not performing CSI measurement and reporting for RBs in the downlink subband when the UE does not detect dynamic SFI in slot n+1.

Link Direction

One of the problems to be solved in the disclosure is about downlink reception and uplink transmission of the UE according to guard band. The UE may be configured with information on a subband by receiving some or all of information on an uplink subband, a downlink subband, or a guard band from the base station according to examples of the disclosure. In addition, the UE may operate as a subband in a cell-specific or UE-specific downlink slot or symbol(s) and a cell-specific or UE-specific flexible slot or symbol(s) according to examples of the disclosure.

Hereinafter, a downlink reception and uplink transmission operation of the UE according to whether the sub-band operation of the UE is an operation in a downlink slot or symbol(s) or a flexible slot or symbol(s) is described.

When the UE is configured or indicated to perform sub-band operation in a downlink slot or symbol(s) from the base station, the UE may transmit uplink signals/channels in symbol(s) and RB(s) within an uplink subband, and may not transmit uplink signals/channels in symbol(s) and RB(s) outside the uplink subband. In addition, the UE may receive downlink signals/channels in symbol(s) and RB(s) within a downlink subband, and may not receive downlink signals/channels in symbol(s) and RB(s) outside the uplink subband. The guard band may be RB(s) that are not included in any subband among an uplink subband and a downlink subband.

According to an example of the disclosure, when the UE is initially configured to operate as a subband by the base station due to insufficient uplink coverage at the time of cell access, but later when resource allocation for downlink reception is required because uplink coverage is improved or downlink traffic increases, the UE may be indicated to receive downlink signals/channels in symbol(s) and RB(s) outside the downlink subband. That is, when the UE is indicated by the base station to receive downlink signals/channels in RB(s) (i.e., uplink subband and guard band) other than the downlink subband within the downlink slot or symbol(s) configured to operate as a subband, the UE may receive downlink signals/channels in the corresponding resources. Here, the downlink slot or symbol(s) may be configured by TDD config-common (TDD-Config-Common).

The UE may be configured or indicated to perform sub-band operation in a flexible slot or symbol(s). In this case, the UE may transmit uplink signals/channels in symbol(s) and RB(s) within the uplink subband, and may not transmit uplink signals/channels in symbol(s) and RB(s) outside the uplink subband. In addition, the UE may receive downlink signals/channels in symbol(s) and RB(s) within the downlink subband, and may not receive downlink signals/channels in symbol(s) and RB(s) outside the downlink subband. Here, the flexible slot or symbol(s) may be configured by TDD config-common.

According to an example of the disclosure, the UE may be indicated to receive downlink signals/channels in symbol(s) and RB(s) outside the downlink subband. The UE is configured to operate as a subband from the base station due to lack of uplink coverage during initial cell connection, but resource allocation for downlink reception may be required due to improved uplink coverage or increased downlink traffic. Therefore, when the UE is indicated by the base station to receive downlink signals/channels in RB(s) (i.e., RB(s) within an uplink subband and RB(s) within a guard band) other than a downlink subband within a downlink slot or symbol(s) configured to operate in a subband, the UE may receive downlink signals/channels in the corresponding resources.

According to another example, the UE may be configured or indicated to receive downlink signals/channels in symbol(s) and RB(s) outside the downlink subband. In addition, the UE may be configured or indicated to transmit uplink signals/channels in symbol(s) and RB(s) outside the uplink subband. Considering that in an NR system, a flexible slot or symbol(s) may be used flexibly for downlink reception and uplink transmission, even though the UE is configured to operate as a subband, if the UE is subsequently configured or indicated by the base station to receive downlink signals/channels in RB(s) (i.e., RB(s) in the uplink subband and RB(s) in the guard band) other than the downlink subband, the UE may receive downlink signals/channels in the corresponding resources. In addition, when the UE is configured or indicated by the base station to transmit uplink signals/channels in RB(s) (i.e., RB(s) in downlink subbands and RB(s) in guard bands) other than uplink subbands, the UE may transmit uplink signals/channels in the corresponding resources.

Figure 30:
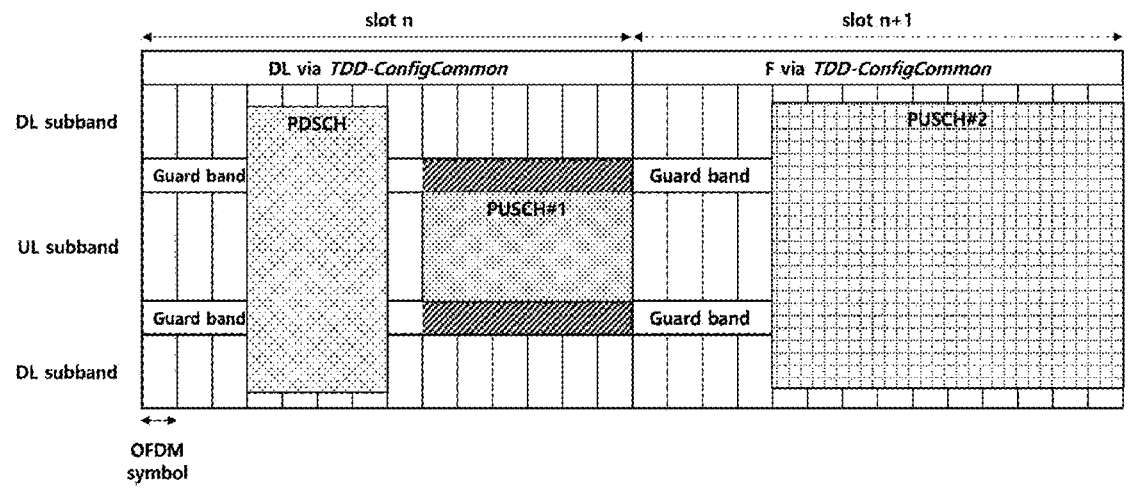
FIG. 30 illustrates a signal transmission/reception method according to an embodiment of the disclosure.

As an example of the disclosure, FIG. 30 illustrates downlink reception and uplink transmission of the UE according to the guard band. The UE may be configured to operate as a subband in the downlink slot n and the flexible slot n+1 configured through the TDD-ConfigCommon signaling. In addition, the UE may be configured or indicated to receive the PDSCH in the slot n and configured or indicated to transmit the PUSCH #1. In addition, the UE may be configured or indicated to transmit the PUSCH #2 in the slot n+1. In this case, the UE may perform the uplink transmission only in the symbol(s) and RB(s) in the uplink subband in the downlink slot n (PUSCH #1). On the other hand, the UE may receive the PDSCH not only in symbol(s) and RB(s) in the downlink subband in downlink slot n, but also in symbol(s) and RB(s) in the uplink subband and the guard band. Meanwhile, the UE may transmit PUSCH #2 not only in symbol(s) and RB(s) in the uplink subband in flexible slot n+1, but also in symbol(s) and RB(s) within the downlink subband and the guard band.

[4] PUSCH Transmission when Subbands are Configured
(4-1) Uplink Transmission

A method of transmitting a physical uplink sharing channel (PUSCH) by the UE is described. The UE may transmit uplink data (e.g., UL-SCHTB) to the base station through a PUSCH. In this case, the UE may transmit uplink data by using a method of scheduling the PUSCH acquired from DCI in the PDCCH (DG, dynamic grant) or a method of transmitting the PUSCH according to the resources and transmission method preconfigured by the base station (CG, configured grant).

The DCI that the UE may recognize by decoding the PDCCH may include PUSCH scheduling information. The PUSCH scheduling information may include information on the time domain (hereinafter referred to as TDRA, time domain resource assignment) and information on the frequency domain (hereinafter referred to as FDRA, frequency domain resource assignment). The UE may interpret the DCI transmitted through the PDCCH based on information on the control resource set (CORESET) and the search space, and perform the operation indicated in the DCI.

The DCI format for scheduling the PUSCH may be one of the DCI format 0_0, 0_1, or 0_2.

The time domain information of PUSCH indicated in the TDRA field in DCI format 0_0, 0_1, or 0_2 includes the following.

K2: A offset value between (i) a slot in which the UE receives a PDCCH from the base station and (ii) a slot in which the UE transmits the PUSCH to the base station.

SLIV (starting and length indication value): a joint-coded value of the starting symbol index(S) of the PUSCH and the symbol length (L) of the PUSCH within the slot indicated by the K2 value. The UE may be configured with K2 and SLIV from the base station. Alternatively, the UE may be configured with K2, S, and L from the base station.

When receiving DCI (e.g., DCI format 0_0, 0_1, or 0_2) scheduling PUSCH in slot n, the UE determines slot floor $(n*2^{\mu PUSCH}/n+2^{\mu PDCCH})+K2$ as a slot for transmitting PUSCH. Here, µPUSCH and µPDCCH are the SCS of the cell (or BWP) in which PUSCH is scheduled and the cell (or BWP) that received PDCCH, respectively.

PUSCH may be configured with either PUSCH mapping Type A or PUSCH mapping Type B. If the UE is configured with PUSCH mapping Type A, the UE may only receive PUSCH resource allocation that includes a DMRS symbol, and the DMRS symbol is located in the third or fourth symbol of the slot indicated by the K2 value depending on the value configured by the base station. That is, if the UE is configured with PUSCH mapping Type A, the starting symbol index(S) of PUSCH may be configured/indicated to 0, the symbol length (L) of PUSCH may be configured/indicated to one of the values from 4 to 14 (12 in the case of extended CP), or SLIV may be configured/indicated to one of the values from 4 to 14 (12 in the case of extended CP). If the UE is configured with PUSCH mapping Type B, the first symbol of the PUSCH is at least a DMRS symbol, the starting symbol index of the PUSCH may be configured to one of the values from 0 to 13 (11 for extended CP), and the symbol length of the PUSCH may be configured to one of the values from 1 to 14 (12 for extended CP). Alternatively, if the UE is configured with PUSCH mapping Type B and PUSCH repetition Type A, SLIV may be configured to one of the values from 1 to 14 (12 for extended CP). If the UE is configured with PUSCH mapping Type B and PUSCH repetition Type B, SLIV may be configured to one of the values from 1 to 27 (23 for extended CP).

The frequency domain information of PUSCH indicated in the FDRA field in DCI format 0_0, 0_1, or 0_2 may be divided into two types depending on the uplink resource allocation type.

In the case of uplink resource allocation type 0, a fixed number of PRBs are grouped according to the number of PRBs included in the BWP configured for the UE to generate a resource block group (RBG), and the UE determines whether to use the RBG by receiving a bitmap of the RBG unit. The number of PRBs included in one RBG may be configured from the base station. The more PRBs included in the BWP configured for the UE, the more PRBs may be configured to be included in one RBG. If the bit value indicated by the bitmap is 0, the UE determines/interprets that PUSCH is not scheduled for any PRB in the corresponding RBG, and if the bit value is 1, the UE determines/interprets that PUSCH is scheduled for all PRBs in the corresponding RBG. Alternatively, the bit value may be applied in reverse depending on the implementation method.

In case of uplink resource allocation type 1, resource allocation information may indicate information of consecutive PRBs allocated for uplink transmission. The resource allocation information includes a resource indication value (RIV) value in which the starting index and length of consecutive PRBs in the frequency domain are jointly coded. The RIV value may be defined to indicate the starting index and length of consecutive PRBs based on the size of the initial BWP or the active BWP of the UE.

Limited to DCI format 0_1 or 0_2, the UE may be configured by the base station to use only one of the two uplink resource allocation types, or to dynamically use both types. When configured to dynamically use two uplink resource allocation types, the UE may determine the uplink resource allocation type to be used for PUSCH transmission through the most significant bit (MSB) 1 bit of the FDRA field in DCI format 0_1 or 0_2.

The NR system supports the configured grant (CG)-based PUSCH (hereinafter, CG-PUSCH) transmission method to support uplink URLLC transmission, etc. The CG-PUSCH transmission method is also called grant-free transmission method. The CG-PUSCH transmission method is a method in which the UE is configured with resources that may be used for PUSCH transmission from the base station in advance through a higher layer (e.g., RRC) signal and transmits PUSCH through the corresponding resources. The CG-PUSCH transmission method may be divided into the following two types depending on whether activation or release is possible through DCI.

Type 1 PUSCH transmission with configured grant: The UE may be configured with the period, time/frequency resources, and transmission method for PUSCH transmission by the base station in advance through a higher layer (e.g., RRC) signal. Here, the transmission method may include modulation and coding scheme (MCS), TB size (TBS), etc.

Type 2 PUSCH transmission with configured grant: The UE may be configured with the period for PUSCH transmission by the base station through a higher layer (e.g., RRC) signal, and time/frequency resources and transmission method may be indicated through DCI (PDCCH).

The CG-PUSCH transmission method may support PUSCH repeated transmission in multiple slots to ensure reliable uplink transmission. In this case, the UE and the base station define the time point that may be assumed as the start of CG-PUSCH transmission as follows. The UE is configured with one of the redundancy version (RV) sequences {0, 2, 3, 1}, {0, 3, 0, 3}, or {0, 0, 0, 0} for repeated transmission of CG-PUSCH, and uses the RV value corresponding to the $\{mod(n-1, 4)+1\}_{th}$ value in the $n_{th}$ initial transmission occasion (TO). Here, n is an integer greater than 0. The UE configured with repeated transmission may start repeated transmission only in the slot where the RV value corresponds to 0. However, when the RV sequence is {0, 0, 0, 0} and repeated transmission is performed in 8 slots, repeated transmission cannot start in the 8th slot. When the number of repeated transmissions reaches the number of repeated transmissions configured by the higher layer or the period is exceeded, or when a UL grant with the same HARQ process ID is received, the UE may complete the repeated transmission. Here, the UL grant means the DCI that schedules the PUSCH.

In order to increase the reliability of PUSCH transmission and reception between the base station and the UE in a wireless communication system, the UE may be configured with PUSCH repeated transmission by the base station. The PUSCH repeated transmission that the UE may transmit may be divided into two types.

First, the transmission process of the PUSCH repeat transmission type A of the UE is as follows. When the UE receives DCI format 0_1 to 0_2 through the PDCCH scheduling the PUSCH from the base station, PUSCH repeat transmission is possible in K consecutive slots. Here, the K value may be configured by a higher layer (e.g., RRC) or may be indicated by the value of the TDRA field of the DCI. For example, assuming that the UE receives the PDCCH scheduling the PUSCH in slot n, receives 2 as the K2 value from the DCI format received through the PDCCH, and receives 4 as the K value, the UE starts transmitting the PUSCH in slot n+K2, i.e., n+2, and repeatedly transmits the PUSCH from slot n+2 to slot n+2+K−1, i.e., n+5. In this case, the time/frequency resources in which PUSCH is transmitted in each slot are the same as the time/frequency resources indicated in the DCI. That is, PUSCH may be repeatedly transmitted in the same symbol and PRB(s) within each slot.

Next, the transmission process of PUSCH repeated transmission type B to support low-latency PUSCH repeated transmission to satisfy the requirements of URLLC, etc., is as follows. The UE may be indicated with the starting symbol(S) of the PUSCH and the length (L) of the PUSCH through the TDRA field by the base station. Here, the PUSCH having the starting symbol and length indicated by the TDRA field is not an actual PUSCH that is actually transmitted, but a temporarily obtained PUSCH, and is called a nominal PUSCH. In addition, the UE may be indicated with the nominal repetition count (N) of the nominal PUSCH through the TDRA field. Therefore, the UE may determine N nominal PUSCHs through the TDRA field. The lengths of the N nominal PUSCHs are all the same as L, and there is no separate symbol between the nominal PUSCHs and they are consecutive on the time axis.

The UE may determine actual PUSCH(s) from nominal PUSCHs. One nominal PUSCH may be determined as one or more actual PUSCHs. The UE may be indicated/configured with symbols that cannot be used in PUSCH repeated transmission type B by the base station. These are called invalid symbols. Invalid symbols may include a symbol configured with DL symbols through TDD configuration, a symbol configured to receive SS/PBCH block, a symbol configured to receive CORESET associated with Type0-PDCCH CSS, and a symbol configured for DL-to-UL-switching. The UE may exclude invalid symbols from nominal PUSCHs. As mentioned above, nominal PUSCHs are determined as consecutive symbols, but may be determined as inconsecutive symbols if invalid symbols are excluded. The actual PUSCHs may be determined as consecutive symbols from one nominal PUSCH excluding invalid symbols. Here, if consecutive symbols cross the slot boundary, the actual PUSCHs may be divided based on the slot boundary.

For reference, the invalid symbol may include at least a DL symbol configured for the UE by the base station.

When the UE performs repeated PUSCH transmission, if a symbol scheduled for PUSCH transmission in a specific slot overlaps with a symbol location configured for reception of a semi-statically configured DL symbol or SS/PBCH block, the UE does not transmit the overlapping PUSCH in the corresponding slot and does not delay transmission to the next slot.

Alternatively, for uplink coverage extension, if a symbol scheduled for PUSCH transmission in a specific slot overlaps with a symbol location configured for reception of a semi-statically configured DL symbol or SS/PBCH block, the UE does not transmit the overlapping PUSCH in the corresponding slot and may delay transmission to the next slot. This may be limited to PUSCH repeated transmission type A.

The DL symbol may include a cell-specifically configured or UE-specifically configured downlink symbol. In addition, the symbol configured for reception of the SS/PBCH block may be a cell-specifically configured or UE-specifically configured symbol through the RRC parameter ssb-PositionsInBurst.

A method of transmitting a physical uplink control channel (PUCCH) by the UE is described.

When the UE receives a DCI format (e.g., DCI format 1_0, 1_1, or 1_2) that schedules a PUCCH, the UE must transmit the scheduled PUCCH. The PUCCH may include UCI, and the UCI may include HARQ-ACK, SR, and/or CSI information. The HARQ-ACK information may be HARQ-ACK information on whether reception of two types of channels is successful. As the first type, when scheduling a PDSCH through DCI format 1_0, 1_1, or 1_2, the HARQ-ACK information may be HARQ-ACK on whether reception of the PDSCH is successful. As the second type, if DCI format 1_0, 1_1 or 1_2 indicates the release (hereinafter, DL SPS release) of the semi-static physical downlink shared channel (SPS PDSCH), the HARQ-ACK information may be HARQ-ACK on whether reception of the DCI format 1_0, 1_1 or 1_2 (or, DL SPS release) is successful.

In order to transmit a PUCCH delivering HARQ-ACK, the PDSCH-to-HARQ_feedback timing indicator field included in DCI format 1_0, 1_1 or 1_2 may indicate a slot offset K1 for a slot in which the scheduled PUCCH should be transmitted. Here, the K1 value may be a non-negative integer value. The K1 value of DCI format 1_0 may indicate one of the values $\{0, 1, 2, 3, 4, 5, 6, 7\}$. The K1 value that may be indicated in DCI format 1_1 or 1_2 may be composed or configured by a higher layer (e.g., RRC).

The UE may determine the slot for transmitting the PUCCH including the first type of HARQ-ACK information as follows. The UE may determine the uplink slot overlapping with the last symbol of the PDSCH corresponding to the HARQ-ACK information. When the index of the uplink slot is m, the uplink slot for transmitting the PUCCH including the HARQ-ACK information by the UE may be m+K1. Here, the index of the uplink slot is a value according to the subcarrier spacing of the (uplink) BWP in which the PUCCH is transmitted. When the UE is configured with downlink slot aggregation, the ending symbol indicates the last symbol of the PDSCH scheduled in the last slot among the slots in which the PDSCH is received.

In the NR system, in order to secure wide coverage, the UE may be configured to repeatedly transmit long PUCCH (PUCCH format 1, 3, 4) in 2, 4, or 8 slots. If the UE is configured to repeatedly transmit PUCCH, the same UCI may be repeatedly transmitted in each slot. The symbol configurations of the repeatedly transmitted PUCCHs are the same. That is, the repeatedly transmitted PUCCHs start from the same symbol in each slot and consist of the same number of symbols.

When performing PUCCH repeated transmission, if the symbol(s) that should transmit PUCCH in a specific slot overlaps with an invalid symbol (e.g., a DL symbol that is configured semi-statically through a TDD configuration or a symbol configured for reception of an SS/PBCH block), the UE may not transmit PUCCH in the corresponding slot and may delay PUCCH transmission to the next slot. Thereafter, if the symbol(s) that should transmit PUCCH in the slot where PUCCH transmission is delayed do not overlap with an invalid symbol, the UE may transmit PUCCH in the corresponding slot.

The DL symbol may include a cell-specifically configured or UE-specifically configured downlink symbol. In addition, the symbol configured for reception of the SS/PBCH block may be a cell-specifically configured or UE-specifically configured symbol through the RRC parameter ssb-PositionsInBurst.

(4-2) Uplink Transmission and Rate-Matching/Puncturing

One of the problems to be solved in the disclosure is for when the UE transmits a PUSCH in a slot or symbol(s) operating as a subband.

The UE may be configured with a pattern for resource elements (REs) of a cell-specific reference signal (CRS) from a higher layer (e.g., RRC). Here, the CRS is a signal that the UE operating in a cell in the LTE system receives from the base station for downlink channel estimation.

The UE may be configured with one or more ZP resource sets for receiving a zero power (ZP) CSI-RS from a higher layer (e.g., RRC). Here, the ZP CSI-RS is a resource that is expected to have zero power transmitted from the base station for specific REs for interference measurement of the UE, beam mobility, and the like. The UE may receive resources for each of the periodic ZP CSI-RS, the semi-persistent ZP CSI-RS, and the aperiodic ZP CSI-RS from a higher layer.

The UE may be configured with a CRS or ZP CSI-RS resource in a downlink slot or symbol(s) or a flexible slot or symbol(s), and may not receive a PDSCH in REs composed of CRS or ZP CSI-RS resources. That is, the UE may assume that REs composed of CRS or ZP CSI-RS resources are not available for PDSCH reception.

Meanwhile, if the UE is configured or indicated to operate as a subband in a downlink slot or symbol(s) or flexible slot or symbol(s) configured with CRS or ZP CSI-RS resources, the UE may be configured or indicated to transmit a PUSCH in the corresponding slot or symbol(s). When the UE transmits a PUSCH in subband-slot/symbol(s), this may interfere with the CRS reception of the LTE UE in the cell or the interference measurement in the ZP CSI-RS resource of another NR UE in the cell.

According to an example of the disclosure for solving this problem, when a resource configured or indicated to transmit a PUSCH in a subband-slot/symbol(s) overlaps a resource composed of CRS or ZP CSI-RS, the UE may assume that the resource is not available for PUSCH transmission. In other words, the UE may rate-match the PUSCH for REs composed of CRS or ZP CSI-RS and transmit the same. Accordingly, when mapping the PUSCH to the time-frequency resource, the RE composed of CRS or ZP CSI-RS may be excluded from the time-frequency resource (e.g., RE set) to which the PUSCH may be mapped.

As another example, the UE may puncture and transmit PUSCH for REs composed of CRS or ZP CSI-RS in subband-slot/symbol(s). Accordingly, when mapping the PUSCH to the time-frequency resource, the RE composed of CRS or ZP CSI-RS is included in the time-frequency resource (e.g., RE set) to which the PUSCH may be mapped.

Figure 31:
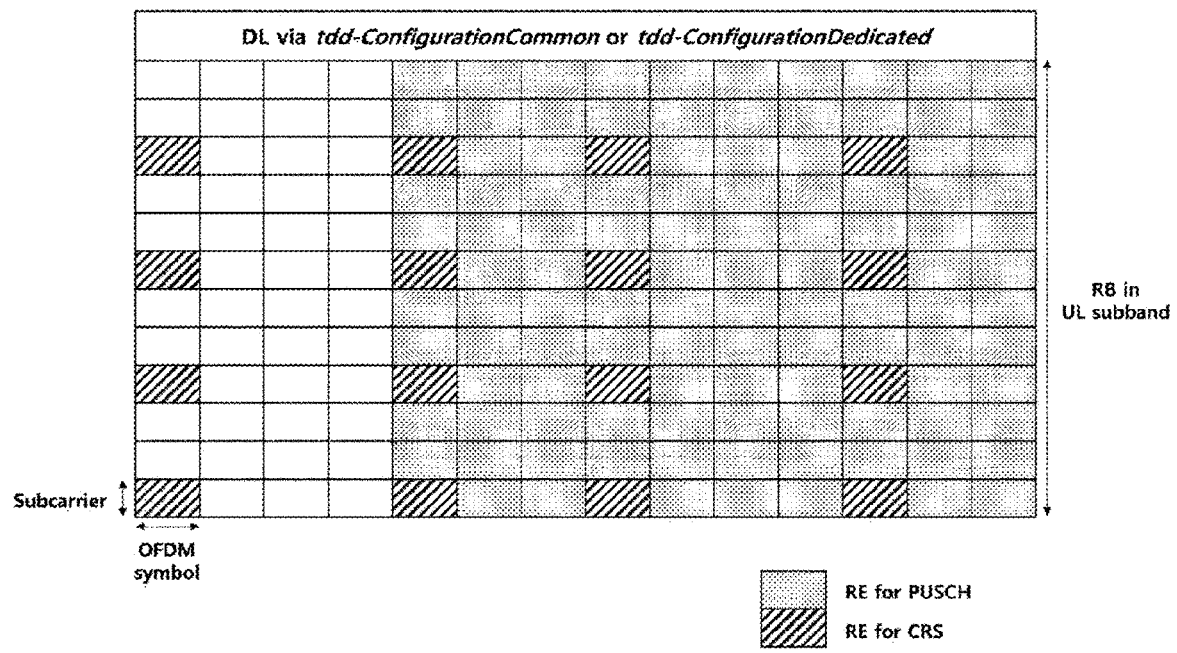
FIGS. 31 to 37 illustrate an uplink transmission method according to an embodiment of the disclosure.

Referring to FIG. 31, the UE may be configured or indicated to operate as a subband in downlink symbols configured with CRS resources, and may be configured or indicated to transmit PUSCH in resources within the uplink subband. The UE may transmit the PUSCH by rate-matching or puncturing the REs in which the PUSCH overlaps with the resource set (e.g., CRS resource) configured through a higher layer (e.g., RRC) signal according to the above embodiment. If the PUSCH is transmitted in non-subband-slot/symbol(s), the PUSCH may be transmitted normally without rate-matching.

(4-3) Uplink Repeated Transmission

One of the problems to be solved in the disclosure is for when the UE repeatedly transmits a PUSCH or PUCCH in a slot or symbol(s) configured with subbands. Here, the repeated transmission may be PUSCH repeated transmission type A, that is, PUCCH repeated transmission between slots. When the UE is scheduled to repeatedly transmit a PUSCH or PUCCH in multiple slots or is configured through RRC, the UE must determine a slot capable of repeated transmission.

Basically, in an NR-based system, only when all symbol(s) scheduled for PUSCH or PUCCH transmission or configured through a higher layer (e.g., RRC) are available for uplink transmission, the UE may determine the corresponding slot as a slot capable of repeated transmission. When a symbol scheduled for PUSCH or PUCCH transmission in a specific slot or configured through RRC overlaps with a symbol location configured for reception of a semi-static DL symbol or SS/PBCH block, the UE may delay transmission to the next slot without transmitting overlapping PUSCH or PUCCHs in the corresponding slot. That is, the UE may not determine the corresponding slot as a slot capable of repeated transmission. Alternatively, the UE may delay the transmission of PUCCH repeat transmissions to the next slot where repeat transmissions are available, but may not delay the transmission of PUSCH repeat transmissions. That is, the UE may perform PUSCH repeat transmissions less than the number of repeat transmissions configured or indicated by the base station.

Figure 32:
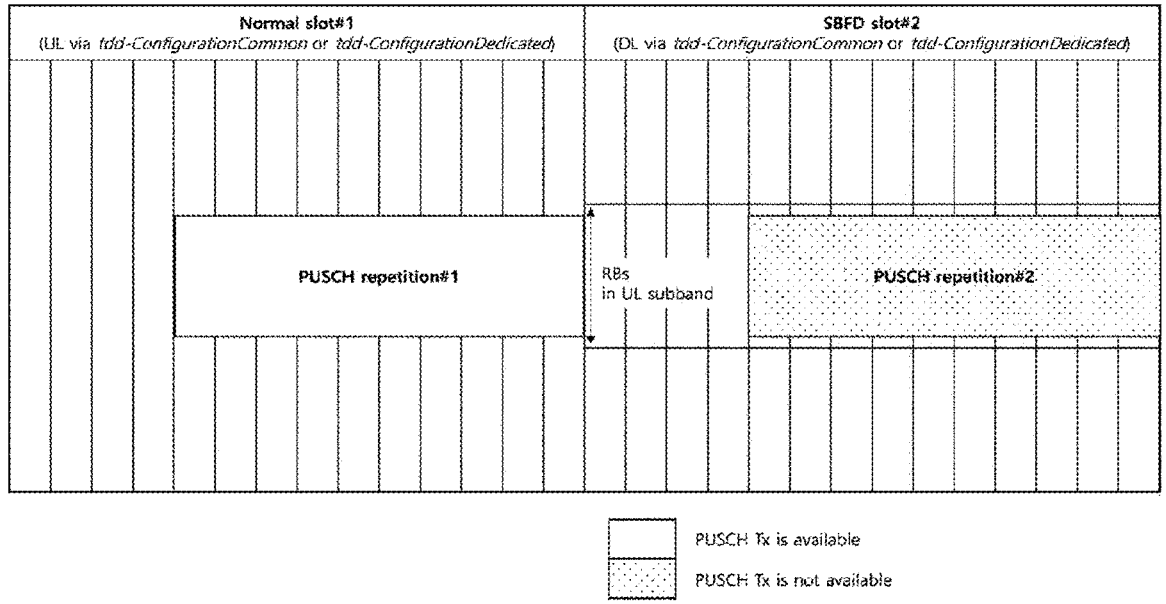

Referring to FIG. 32, the UE may be configured or indicated to transmit PUSCH twice repeatedly with PUSCH repeated transmission type A. Here, normal slot #1 may be a slot or symbol(s) in which the UE is not configured with a subband, and SBFD slot #2 may be a slot or symbol(s) in which the UE is configured with a subband. Since all resources scheduled to transmit PUSCH are uplink symbols in normal slot #1, the UE may determine the corresponding slot as a slot in which PUSCH repeated transmission is possible. However, the symbols in SBFD slot #2 are symbols configured with cell-specific downlink symbols (DL through tdd-ConfigurationCommon) or UE-specific downlink symbols (DL through tdd-ConfigurationDedicated) by the TDD configuration. Therefore, if the conventional technology is applied, the UE cannot determine SBFD slot #2 as a slot in which PUSCH repeated transmission is possible even if the symbols scheduled to transmit PUSCH are symbols included in the uplink subband. That is, although the UE is configured or indicated to operate as an uplink subband in a downlink or flexible slot for uplink performance improvement (e.g., coverage improvement, latency reduction, etc.), it may be difficult to expect uplink performance improvement for repeated PUSCH transmissions because the corresponding slot is not determined as a slot capable of repeated transmission.

In the first method of the disclosure to solve this problem, when the UE is configured or indicated to operate as a subband, the UE may determine resources capable of repeated transmission by considering not only the availability of resources for repeated transmission in the time domain, that is, in the slot or symbol unit, but also the availability of resources for repeated transmission in the frequency domain, that is, in the RB unit. Specifically, if all symbols and RBs scheduled for PUSCH or PUCCH repeated transmission or configured through RRC are available for uplink transmission in a slot or symbol(s) configured or indicated to operate as a subband, the UE may determine the slot as a slot capable of repeated transmission. If the symbols and RBs scheduled for PUSCH or PUCCH transmission or configured through RRC in a specific slot overlap with DL symbols included in RBs other than uplink subbands (i.e., RBs within downlink subbands or guard bands) or symbols configured for reception of SS/PBCH blocks in RBs other than uplink subbands (i.e., RBs within downlink subbands or guard bands), the UE may not determine the slot as a slot capable of PUSCH or PUCCH repeated transmission and may delay PUSCH or PUCCH transmission to the next slot capable of repeated transmission. Alternatively, the UE may delay the transmission of PUCCH repeat transmission to the next slot where repeated transmissions are possible, but may not delay the transmission of PUSCH repeated transmissions. That is, the UE may perform PUSCH repeated transmissions less than the number of repeated transmissions configured or indicated by the base station.

Figure 33:
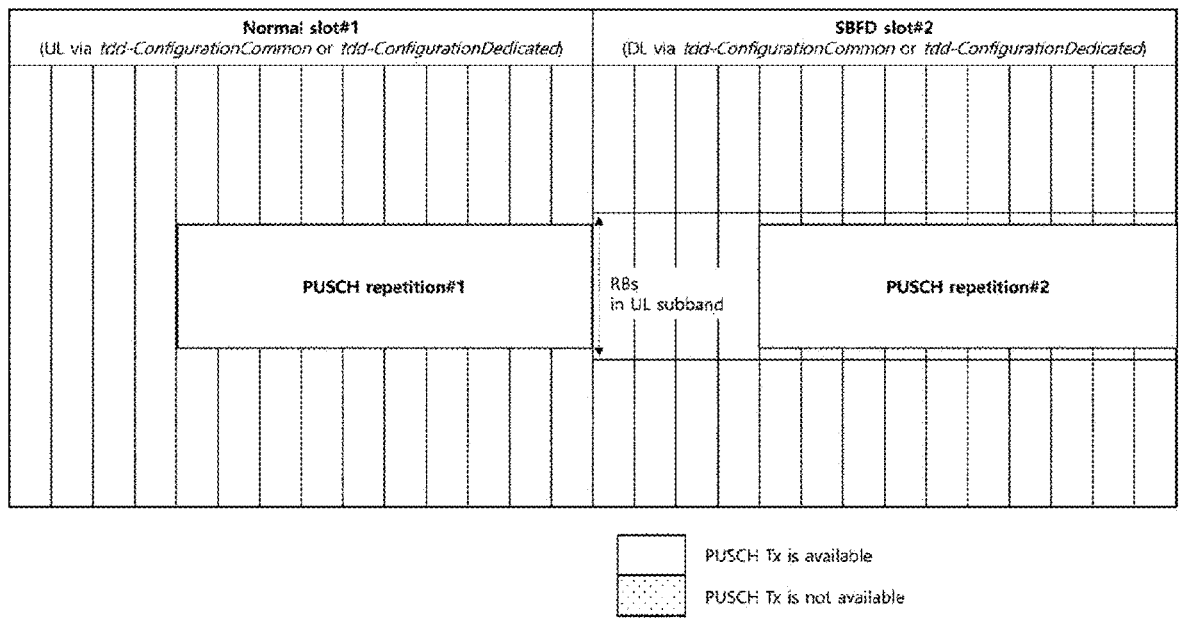

FIG. 33 illustrates the first method described above. Compared to the method of FIG. 32, which only considers the availability of resources for repeated transmission in the time domain, i.e., symbol units, the method of FIG. 33 may also consider the availability of resources for repeated transmission in the frequency domain, i.e., RB units. In the case of FIG. 33, since the symbols and RBs scheduled to transmit PUSCH or configured through RRC are available for uplink transmission, the UE may determine SBFD slot #2 as a slot in which PUSCH repeated transmission is possible.

In the first method described above, when resources configured for reception of SS/PBCH blocks and resources scheduled or configured through RRC to repeatedly transmit PUSCH or PUCCH overlap, operations of the UE according to the type of SS/PBCH block and collision situation (symbol unit or RE unit) are proposed below.

Figure 34:
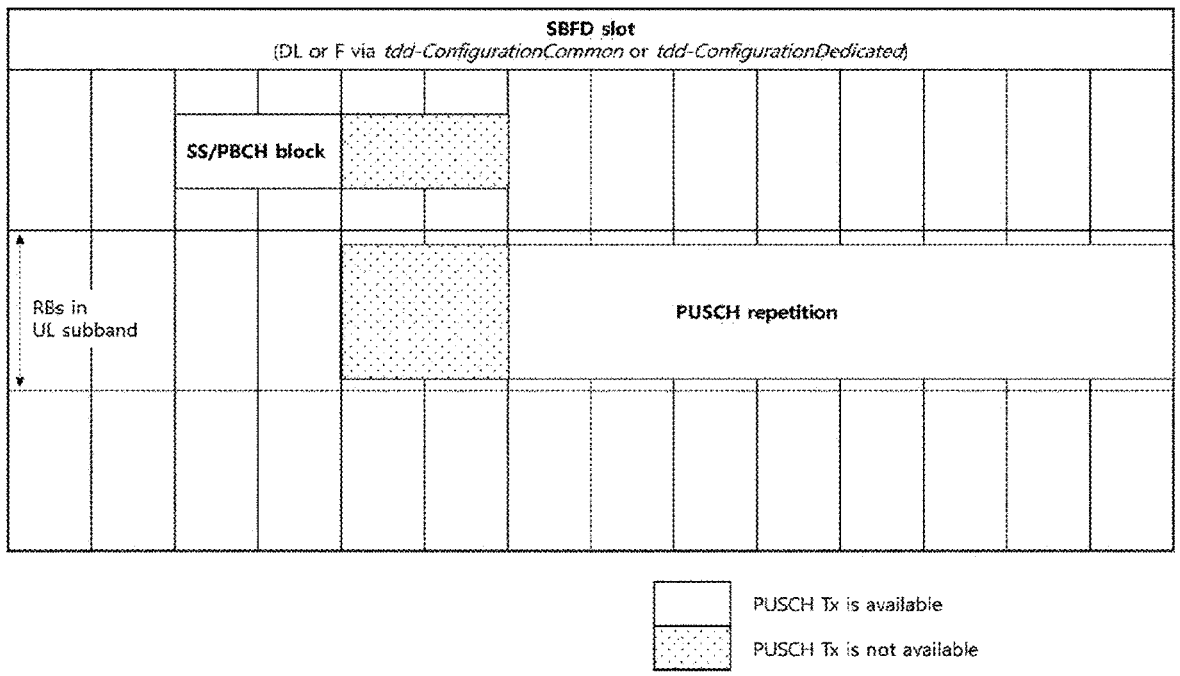

1) Symbol unit collision situation: FIG. 34 illustrates a situation in which resources configured for receiving SS/PBCH blocks and resources scheduled or configured through RRC to repeatedly transmit PUSCH or PUCCH overlap each other in symbol units. In this case, the UE operation according to the type of SS/PBCH block is as follows.

Cell-specific SS/PBCH block with same PCI from the serving cell:

The UE may be cell-specifically configured to receive SS/PBCH blocks having the same physical cell ID (PCI) as the PCI of the serving cell. The cell-specific resources for receiving SS/PBCH blocks may be configured by the RRC parameter ssb-PositionsInBurst. When the resources cell-specifically configured to receive SS/PBCH blocks and the resources scheduled for repeated transmission of PUSCH or PUCCH or configured through RRC overlap each other in symbol units, the UE operation is as follows.

As an example, when the resources cell-specifically configured to receive SS/PBCH blocks and the resources scheduled for repeated transmission of PUSCH or PUCCH or configured through RRC overlap each other in symbol units, the UE may determine the corresponding slot as a slot where PUSCH or PUCCH repeated transmission is possible. That is, the fact that the UE is scheduled or configured with a PUSCH or PUCCH through RRC by the base station to overlap with cell-specifically configured symbols to receive SS/PBCH blocks may be determined as that the reception of the SS/PBCH block is not intended in the corresponding slot and is configured or indicated to prioritize PUSCH or PUCCH transmission from the UE perspective. This is a method that allows a specific UE to transmit a PUSCH or PUCCH scheduled or configured through RRC in an uplink subband even if another UE in the cell receives SS/PBCH blocks in a downlink subband, since the base station supports a full duplex communication method.

As another example, when the symbols cell-specifically configured to receive SS/PBCH blocks and the resources scheduled for repeated transmission of PUSCH or PUCCH or configured through RRC overlap each other in symbol units, the UE may determine the corresponding slot as a slot capable of PUSCH or PUCCH repeated transmission only when it is dynamically scheduled (e.g., L1 signal or DCI), and may not determine the corresponding slot as a slot capable of PUSCH or PUCCH repeated transmission for resources configured through RRC. That is, the fact that the UE is scheduled a PUSCH or PUCCH by the base station to overlap with cell-specifically configured symbols to receive SS/PBCH blocks may be determined as that the reception of the SS/PBCH block is not intended in the corresponding slot and is indicated to prioritize PUSCH or PUCCH transmission from the UE perspective. Meanwhile, the UE may determine that the resources for PUSCH or PUCCH transmission configured through RRC are configured to prioritize SS/PBCH reception. This is a method that allows a specific UE to transmit a PUSCH or PUCCH dynamically scheduled by the base station in an uplink subband even if another UE in the cell receives SS/PBCH blocks in a downlink subband, since the base station supports a full-duplex communication method.

UE-specific SS/PBCH block with different PCI from the serving cell:

The UE may be specifically configured to receive SS/PBCH blocks having PCI rather than serving cell PCI from multiple transmission and reception points (TRPs). In this case, when the resources UE-specifically configured to receive SS/PBCH blocks and the resources scheduled for repeated transmission of PUSCH or PUCCH or configured through RRC overlap each other in symbol units, the UE operation is as follows.

The UE may not expect to be indicated to transmit PUSCH through DCI format 0_0, 0_1, or 0_2 in a symbol configured to receive SS/PBCH blocks. The UE operating in a half-duplex mode cannot perform simultaneous transmission and reception in the same symbol, and considering that the base station has configured the UE to receive SS/PBCH blocks UE-specifically for reception of PDSCHs transmitted from multiple TRPs of a non-serving cell, the reception of SS/PBCH blocks is to be prioritized over PUSCH transmission. Therefore, the UE may perform reception of SS/PBCH blocks and may not expect to be indicated to transmit PUSCH so that at least one symbol overlaps with the SS/PBCH blocks.

The UE may not expect to be indicated to transmit PUCCH through DCI format 1_0, 1_1, or 1_2 in a symbol configured to receive SS/PBCH blocks. The UE operating in a half-duplex mode cannot perform simultaneous transmission and reception in the same symbol, and considering that the base station has configured the UE to receive SS/PBCH blocks UE-specifically for reception of PDSCHs transmitted from multiple TRPs of a non-serving cell, the reception of SS/PBCH blocks is to be prioritized over PUCCH transmission. Therefore, the UE may perform reception of SS/PBCH blocks and may not expect to be indicated to transmit PUCCH so that at least one symbol overlaps with the SS/PBCH blocks.

When the symbol(s) configured to transmit the PUSCH from the higher layer and the symbol(s) configured to receive the SS/PBCH block partially overlap, the UE may receive the SS/PBCH block and transmit the PUSCH by rate-matching. For example, the UE may rate-match the PUSCH for the PUSCH resource configured in the position of the symbol to which the SS/PBCH block is mapped and the DL-to-UL switching gap symbol for RF retuning. Even though the RBs occupied by the symbol(s) configured to transmit the PUSCH from the higher layer and the RBs occupied by the symbol(s) configured to receive the SS/PBCH block do not overlap each other in the RB unit, the UE must operate in a half-duplex manner and therefore cannot perform simultaneous transmission and reception on different frequency resources of the same symbol. This method is a method that may guarantee the downlink reception and uplink transmission configured for the UE to the maximum extent possible in symbol(s) excluding symbol(s) identical to the SS/PBCH block when the UE is configured or indicated to operate as a subband.

When the symbol configured to transmit the PUSCH from the higher layer and the symbol configured to receive the SS/PBCH block fully overlap, the UE may receive the SS/PBCH block but may not transmit the PUSCH. The UE operating in a half-duplex mode cannot perform simultaneous transmission and reception in the same symbol, and considering that the base station has configured the UE to receive SS/PBCH blocks UE-specifically for reception of PDSCHs transmitted from multiple TRPs of a non-serving cell, the reception of SS/PBCH blocks is to be prioritized. Therefore, the UE may perform reception of SS/PBCH blocks but may not transmit the PUSCH.

When the symbol configured to transmit the PUCCH from the higher layer and the symbol configured to receive the SS/PBCH partially overlap, the UE may receive the SS/PBCH block but may not transmit the PUCCH. Even though the RBs occupied by the symbol(s) configured to transmit PUCCH from the higher layer and the RBs occupied by the symbol(s) configured to receive SS/PBCH blocks do not overlap each other in the RB unit, the UE cannot perform simultaneous transmission and reception on different frequency resources of the same symbol because the UE operates in a half-duplex manner. In addition, considering that the base station has configured the UE to receive SS/PBCH blocks UE-specifically for reception of PDSCHs transmitted from multiple TRPs of a non-serving cell, the reception of SS/PBCH blocks is to be prioritized over PUCCH transmission. In the above, it is possible to transmit the PUSCH by rate-matching in symbol units, but PUCCH may not be used for uplink transmission even for one of the scheduled symbols. In this case, since PUCCH cannot be transmitted in the corresponding slot, the UE may perform reception of SS/PBCH blocks but may not transmit PUCCH.

When the symbol configured to transmit the PUCCH from the higher layer and the symbol configured to receive the SS/PBCH fully overlap, the UE may receive the SS/PBCH block but may not transmit the PUCCH. The UE operating in a half-duplex mode cannot perform simultaneous transmission and reception in the same symbol, and considering that the base station has configured the UE to receive SS/PBCH blocks UE-specifically for reception of PDSCHs transmitted from multiple TRPs of a non-serving cell, the reception of SS/PBCH blocks is to be prioritized over PUCCH transmission. Therefore, the UE may perform reception of SS/PBCH blocks but may not transmit the PUCCH.

UE-specific SS/PBCH block with activated additional PCI:

Resources may be UE-specifically configured to receive an SS/PBCH block having an additional PCI associated with an activated transmission configuration indicator (TCI) state among the SS/PBCH blocks received from multiple TRPs. In this case, when the resources UE-specifically configured to receive the corresponding SS/PBCH block and the resources scheduled for repeated transmission of PUSCH or PUCCH or configured through RRC overlap each other in symbol units, the UE operation is as follows.

The UE may not expect to be indicated to transmit PUSCH through DCI format 0_0, 0_1, or 0_2 in a symbol configured to receive SS/PBCH blocks. The UE operating in a half-duplex mode cannot perform simultaneous transmission and reception in the same symbol, and this is to prioritize the reception of the SS/PBCH block having a PCI associated with an activated TCI state among the SS/PBCH blocks configured by the base station for reception of PDSCH transmitted from multiple TRPs of a non-serving cell to the UE. Therefore, the UE may perform reception of SS/PBCH blocks and may not expect to be indicated to transmit the PUSCH so that at least one symbol overlaps with the SS/PBCH blocks.

The UE may not expect to be indicated to transmit PUCCH through DCI format 1_0, 1_1, or 1_2 in a symbol configured to receive SS/PBCH blocks. The UE operating in a half-duplex mode cannot perform simultaneous transmission and reception in the same symbol, and this is to prioritize the reception of the SS/PBCH block having a PCI associated with an activated TCI state among the SS/PBCH blocks configured by the base station for reception of PDSCH transmitted from multiple TRPs of a non-serving cell to the UE. Therefore, the UE may perform reception of SS/PBCH blocks and may not expect to be indicated to transmit the PUCCH so that at least one symbol overlaps with the SS/PBCH blocks.

When the symbol(s) configured to transmit the PUSCH from the higher layer and the symbol(s) configured to receive the SS/PBCH block partially overlap, the UE may receive the SS/PBCH block. On the other hand, the UE may transmit the PUSCH by rate-matching for the PUSCH resource configured in the position of the symbol to which the SS/PBCH block is mapped and the DL-to-UL switching gap symbol. For SS/PBCH blocks that have additional PCI associated with an activated TCI state among SS/PBCH blocks received from multiple TRPs, since the base station may have intentionally configured the UE to receive the corresponding SS/PBCH, the SS/PBCH reception is prioritized. In addition, even though the RBs occupied by the PUSCH and the RBs occupied by the SS/PBCH block do not overlap each other in RB units, the UE must operate in a half-duplex manner, so the UE cannot perform simultaneous transmission and reception on different frequency resources of the same symbol. This method may guarantee the downlink reception and uplink transmission configured for the UE to the maximum extent when the UE is configured or indicated to operate as a subband.

When the symbol configured to transmit the PUSCH from the higher layer and the symbol configured to receive the SS/PBCH block fully overlap, the UE may receive the SS/PBCH block but may not transmit the PUSCH. The UE operating in a half-duplex mode cannot perform simultaneous transmission and reception in the same symbol, and configuring the UE to receive the SS/PBCH block UE-specifically by the base station is to prioritize the reception of the SS/PBCH block having a PCI associated with an activated TCI state among the SS/PBCH blocks configured by the base station for the UE to receive PDSCHs transmitted from multiple TRPs of a non-serving cell over the PUSCH transmission. Therefore, the UE may perform reception of SS/PBCH blocks but may not transmit the PUSCH.

When the symbol configured to transmit the PUCCH from the higher layer and the symbol configured to receive the SS/PBCH block partially overlap, the UE may receive the SS/PBCH block but may not transmit the PUCCH. Even though the RBs occupied by the symbol(s) configured to transmit the PUCCH from the higher layer and the RBs occupied by the symbol(s) configured to receive the SS/PBCH block do not overlap each other in the RB unit, the UE must operate in a half-duplex manner and therefore cannot perform simultaneous transmission and reception on different frequency resources of the same symbol. In addition, configuring the UE to receive the SS/PBCH block UE-specifically by the base station is to prioritize the reception of the SS/PBCH block having a PCI associated with an activated TCI state among the SS/PBCH blocks configured by the base station for the UE to receive PDSCHs transmitted from multiple TRPs of a non-serving cell over the PUCCH transmission. Meanwhile, PUSCH may be transmitted by rate-matching in symbol units, but if even one of the scheduled symbols cannot be used for uplink transmission, since the PUCCH cannot be transmitted in the corresponding slot, the UE may receive the SS/PBCH block but may not transmit the PUCCH.

When the symbol configured to transmit the PUCCH from the higher layer and the symbol configured to receive the SS/PBCH block fully overlap, the UE may receive the SS/PBCH block but may not transmit the PUCCH. The UE operating in a half-duplex mode cannot perform simultaneous transmission and reception in the same symbol, and configuring the UE to receive the SS/PBCH block UE-specifically by the base station is to prioritize the reception of the SS/PBCH block having a PCI associated with an activated TCI state among the SS/PBCH blocks configured by the base station for the UE to receive PDSCHs transmitted from multiple TRPs of a non-serving cell over the PUCCH transmission. Therefore, the UE may perform reception of SS/PBCH blocks but may not transmit the PUCCH.

UE-specific SS/PBCH block with non-activated additional PCI:

As an example, when the resources UE-specifically configured to receive an SS/PBCH block having an additional PCI associated with an inactive TCI state among the SS/PBCH blocks received from multiple TRPs and the resources scheduled for repeated transmission of PUSCH or PUCCH or configured through RRC overlap each other in symbol units, the UE may determine the slot as a slot in which PUSCH or PUCCH repeated transmission is possible. That is, the UE may determine the fact that the UE is scheduled or configured with PUSCH or PUCCH through a higher layer (e.g., RRC) to overlap with the UE-specifically configured symbol(s) to receive SS/PBCH blocks with additional PCI associated with inactive TCI state as the fact that the UE is configured or indicated to prioritize PUSCH or PUCCH transmission without reception of SS/PBCH blocks in the corresponding slot.

As another example, when the resources UE-specifically configured to receive an SS/PBCH block having an additional PCI associated with an inactive TCI state among the SS/PBCH blocks received from multiple TRPs and the resources scheduled for repeated transmission of PUSCH or PUCCH or configured through RRC overlap each other in symbol units, the UE may determine the slot as a slot in which PUSCH or PUCCH repeated transmission is possible only when the resources are dynamically (e.g., DCI) scheduled, and may not determine the corresponding slot as a slot capable of repeated transmission of PUSCH or PUCCH for resources configured through a higher layer (e.g., RRC). That is, the UE may determine the fact that the UE is scheduled with PUSCH or PUCCH through dynamic scheduling from the base station to overlap with the UE-specifically configured symbol(s) to receive SS/PBCH blocks with additional PCI associated with inactive TCI state as the fact that the UE is configured or indicated to prioritize PUSCH or PUCCH transmission without intending reception of SS/PBCH blocks in the corresponding slot. On the other hand, the UE may determine that the UE is configured to prioritize the reception of the SS/PBCH for resources for PUSCH or PUCCH transmission configured through the higher layer (e.g., RRC).

UE-specific SS/PBCH block for L1 beam measurement/reporting:

When resources UE-specifically configured for the UE to receive the SS/PBCH block for link recovery and the resources scheduled for repeated transmission of PUSCH or PUCCH or configured through RRC overlap each other in symbol units, the UE operation is as follows.

The UE may not expect to be indicated to transmit PUSCH through DCI format 0_0, 0_1, or 0_2 in a symbol configured to receive SS/PBCH blocks. The UE operating in a half-duplex mode cannot perform simultaneous transmission and reception in the same symbol, and considering that the base station configures the UE to receive SS/PBCH blocks UE-specifically for link recovery, this is to prioritize reception of SS/PBCH blocks over PUSCH transmission. Therefore, the UE may not expect to be indicated to perform reception of SS/PBCH blocks and transmission of PUSCH so that at least one symbol overlaps with the SS/PBCH blocks.

The UE may not expect to be indicated to transmit PUCCH through DCI format 1_0, 1_1, or 1_2 in a symbol configured to receive SS/PBCH blocks. The UE operating in a half-duplex mode cannot perform simultaneous transmission and reception in the same symbol, and considering that the base station configures the UE to receive SS/PBCH blocks UE-specifically for link recovery, this is to prioritize reception of SS/PBCH blocks over PUCCH transmission. Therefore, the UE may perform reception of SS/PBCH blocks and may not expect to be indicated to transmit PUCCH so that at least one symbol overlaps with the SS/PBCH blocks.

When the symbol(s) configured to transmit the PUSCH from the higher layer and the symbol(s) configured to receive the SS/PBCH block partially overlap, the UE may receive the SS/PBCH block, and transmit the PUSCH by rate-matching for the PUSCH resource configured in the position of the symbol to which the SS/PBCH block is mapped and the DL-to-UL switching gap symbol. For symbol(s) that are UE-specifically configured to receive SS/PBCH blocks for link recovery, the base station may have intentionally configured the UE to receive the corresponding SS/PBCH, so that reception of SS/PBCH is prioritized over PUSCH transmission. Even though the RBs occupied by the symbol(s) configured to transmit the PUSCH from the higher layer and the RBs occupied by the symbol(s) configured to receive the SS/PBCH block do not overlap each other in the RB unit, the UE must operate in a half-duplex manner and therefore cannot perform simultaneous transmission and reception on different frequency resources of the same symbol. This method is a method that may guarantee the downlink reception and uplink transmission configured for the UE to the maximum extent possible in symbol(s) excluding symbol(s) identical to the SS/PBCH block when the UE is configured or indicated to operate as a subband.

When the symbol configured to transmit the PUSCH from the higher layer and the symbol configured to receive the SS/PBCH block fully overlap, the UE may receive the SS/PBCH block but may not transmit the PUSCH. The UE operating in a half-duplex mode cannot perform simultaneous transmission and reception in the same symbol, and considering that the base station configures the UE to receive SS/PBCH blocks UE-specifically for link recovery, this is to prioritize reception of SS/PBCH blocks over PUSCH transmission. Therefore, the UE may perform reception of SS/PBCH blocks but may not transmit the PUSCH.

When the symbol configured to transmit the PUCCH from the higher layer and the symbol configured to receive the SS/PBCH block partially overlap, the UE may receive the SS/PBCH block but may not transmit the PUCCH. Even though the RBs occupied by the symbol(s) configured to transmit the PUCCH from the higher layer and the RBs occupied by the symbol(s) configured to receive the SS/PBCH block do not overlap each other in the RB unit, the UE must operate in a half-duplex manner and therefore cannot perform simultaneous transmission and reception on different frequency resources of the same symbol. In addition, considering that the base station configures the UE to receive SS/PBCH blocks UE-specifically for link recovery, this is to prioritize reception of SS/PBCH blocks over PUCCH transmission. Meanwhile, PUSCH may be transmitted by rate-matching in symbol units, but if even one of the scheduled symbols cannot be used for uplink transmission, PUCCH cannot be transmitted in that slot. Therefore, the UE may perform reception of SS/PBCH blocks but may not transmit the PUCCH.

When the symbol configured to transmit the PUCCH from the higher layer and the symbol configured to receive the SS/PBCH block fully overlap, the UE may receive the SS/PBCH block but may not transmit the PUCCH. The UE operating in a half-duplex mode cannot perform simultaneous transmission and reception in the same symbol, and this is to prioritize reception of SS/PBCH blocks over PUCCH transmission, considering that the base station configures the UE to receive SS/PBCH blocks UE-specifically for link recovery. Therefore, the UE may perform reception of SS/PBCH blocks but may not transmit the PUCCH.

Figure 35:
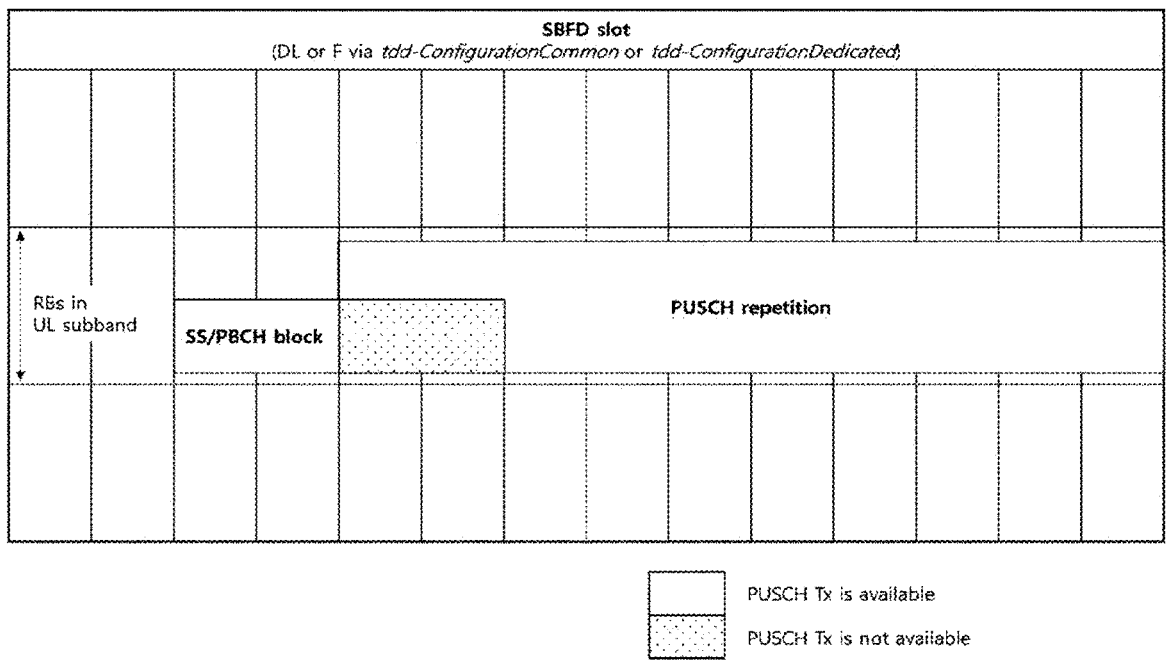

2) Resource element (RE) unit collision situation: FIG. 35 illustrates a situation in which (i) resources configured for receiving SS/PBCH blocks and (ii) resources scheduled or configured through a higher layer (e.g., RRC) to repeatedly transmit PUSCH or PUCCH overlap each other in RE units.

In this case, the UE operation according to the type of SS/PBCH block is as follows.

Cell-specific SS/PBCH block with same PCI from the serving cell:

When (i) resources configured cell-specifically for receiving SS/PBCH blocks and (ii) resources scheduled or configured through a higher layer (e.g., RRC) to repeatedly transmit PUSCH or PUCCH overlap each other in RE units, the UE operation is as follows.

The UE may not expect to be indicated to transmit PUSCH through DCI format 0_0, 0_1, or 0_2 in an RE configured to receive SS/PBCH blocks. The UE operating in a half-duplex mode cannot perform simultaneous transmission and reception in the same RE, and considering that the base station configures the UE to receive SS/PBCH blocks cell-specifically for periodic synchronization, this is to prioritize reception of SS/PBCH blocks over PUSCH transmission. Therefore, the UE may perform reception of SS/PBCH blocks and may not expect to be indicated to transmit PUSCH so that at least one RE overlaps with the SS/PBCH blocks.

The UE may not expect to be indicated to transmit PUCCH through DCI format 1_0, 1_1, or 1_2 in an RE configured to receive SS/PBCH blocks. The UE operating in a half-duplex mode cannot perform simultaneous transmission and reception in the same RE, and considering that the base station configures the UE to receive SS/PBCH blocks cell-specifically for periodic synchronization, this is to prioritize reception of SS/PBCH blocks over PUCCH transmission. Therefore, the UE may perform reception of SS/PBCH blocks and may not expect to be indicated to transmit PUSCH so that at least one RE overlaps with the SS/PBCH blocks.

When the RE(s) configured to transmit the PUSCH from the higher layer and the RE(s) configured to receive the SS/PBCH block partially overlap, the UE may receive the SS/PBCH block, and transmit the PUSCH by rate-matching for REs mapped to SS/PBCH blocks and downlink-uplink switching gap symbols. This is because, from the perspective of a UE, the UE must operate in a half-duplex manner, so the UE cannot perform transmission and reception simultaneously in the same RE unit. This method is a method that may guarantee the downlink reception and uplink transmission configured for the UE to the maximum extent possible in symbol(s) excluding same RE(s) when the UE is configured or indicated to operate as a subband.

When the RE configured to transmit the PUSCH from the higher layer and the RE configured to receive the SS/PBCH block fully overlap, the UE may receive the SS/PBCH block but may not transmit the PUSCH. The UE operating in a half-duplex mode cannot perform simultaneous transmission and reception in the same RE, and considering that the base station configures the UE to receive SS/PBCH blocks cell-specifically for periodic synchronization, this is to prioritize reception of SS/PBCH blocks over PUSCH transmission. Therefore, the UE may perform reception of SS/PBCH blocks but may not transmit the PUCCH.

When the RE configured to transmit the PUCCH from the higher layer and the RE configured to receive the SS/PBCH block partially overlap, the UE may receive the SS/PBCH block but may not transmit the PUCCH. This is because, from the perspective of a UE, the UE must operate in a half-duplex manner, so the UE cannot perform transmission and reception simultaneously in the same RE unit. in addition, the reason why the base station configures the UE to receive the SS/PBCH block cell-specifically is to prioritize the reception of the SS/PBCH block over PUCCH transmission for periodic synchronization. The PUSCH may be transmitted by rate-matching in RE units, but if even one of the scheduled symbols cannot be used for uplink transmission, the PUCCH cannot be transmitted in the corresponding slot. Therefore, the UE may perform reception of SS/PBCH blocks but may not transmit the PUCCH.

When the RE configured to transmit the PUCCH from the higher layer and the RE configured to receive the SS/PBCH block fully overlap, the UE may receive the SS/PBCH block but may not transmit the PUCCH. The UE operating in a half-duplex mode cannot perform simultaneous transmission and reception in the same RE, and considering that the base station configures the UE to receive SS/PBCH blocks cell-specifically for periodic synchronization, this is to prioritize reception of SS/PBCH blocks over PUCCH transmission. Therefore, the UE may perform reception of SS/PBCH blocks but may not transmit the PUCCH.

UE-specific SS/PBCH block with different PCI from the serving cell:

When (i) resources configured UE-specifically for receiving SS/PBCH blocks with different PCIs from the serving cell physical cell ID (PCI) received from multiple TRPs and (ii) resources scheduled or configured through RRC to repeatedly transmit PUSCH or PUCCH overlap each other in RE units, the UE operation is as follows.

The UE may not expect to be indicated to transmit PUSCH through DCI format 0_0, 0_1, or 0_2 in an RE configured to receive SS/PBCH blocks. The UE operating in a half-duplex mode cannot perform simultaneous transmission and reception in the same RE, and the reason why the base station configures the UE to receive the SS/PBCH block UE-specifically is to prioritize the reception of the SS/PBCH block considering that the base station configures the UE to receive PDSCHs transmitted from multiple TRPs of cells other than the serving cell. Therefore, the UE may perform reception of SS/PBCH blocks and may not expect to be indicated to transmit the PUSCH so that at least one RE overlaps with the SS/PBCH blocks.

The UE may not expect to be indicated to transmit PUCCH through DCI format 1_0, 1_1, or 1_2 in an RE configured to receive SS/PBCH blocks. The UE operating in a half-duplex mode cannot perform simultaneous transmission and reception in the same RE, and the reason why the base station configures the UE to receive the SS/PBCH block UE-specifically is to prioritize the reception of the SS/PBCH block considering that the base station configures the UE to receive PDSCHs transmitted from multiple TRPs of cells other than the serving cell. Therefore, the UE may perform reception of SS/PBCH blocks and may not expect to be indicated to transmit the PUCCH so that at least one RE overlaps with the SS/PBCH blocks.

When the RE(s) configured to transmit the PUSCH from the higher layer and the RE(s) configured to receive the SS/PBCH block partially overlap, the UE may receive the SS/PBCH block, and transmit the PUSCH by rate-matching. For example, the UE may rate-match the PUSCH for the RE to which the SS/PBCH block is mapped and the downlink-uplink switching gap symbol. This is because the UE must operate in a half-duplex manner and cannot perform simultaneous transmission and reception in the same RE unit. This method is a method that may guarantee the downlink reception and uplink transmission configured for the UE to the maximum extent possible in symbol(s) excluding same RE(s) when the UE is configured or indicated to operate as a subband.

When the RE configured to transmit the PUSCH from the higher layer and the RE configured to receive the SS/PBCH block fully overlap, the UE may receive the SS/PBCH block but may not transmit the PUSCH. The UE operating in a half-duplex mode cannot perform simultaneous transmission and reception in the same RE, and considering that the base station configures the UE to receive SS/PBCH blocks UE-specifically for reception of PDSCH transmitted from multiple TRPs of non-serving cells, this is to prioritize reception of SS/PBCH blocks. Therefore, the UE may perform reception of SS/PBCH blocks but may not transmit the PUSCH.

When the RE configured to transmit the PUCCH from the higher layer and the RE configured to receive the SS/PBCH block partially overlap, the UE may receive the SS/PBCH block but may not transmit the PUCCH. This is because the UE must operate in half-duplex mode, so transmission and reception cannot be performed simultaneously in the same RE unit. In addition, considering that the base station configures the UE to receive SS/PBCH blocks UE-specifically for reception of PDSCH transmitted from multiple TRPs of non-serving cells, this is to prioritize reception of SS/PBCH blocks. Meanwhile, when it is possible to transmit the PUSCH by rate-matching in RE units, but if even one of the scheduled symbols cannot be used for uplink transmission, PUCCH cannot be transmitted in the corresponding slot. Accordingly, the UE may perform reception of SS/PBCH blocks but may not transmit PUCCH.

When the RE configured to transmit the PUCCH from the higher layer and the RE configured to receive the SS/PBCH block fully overlap, the UE may receive the SS/PBCH block but may not transmit the PUCCH. The UE operating in a half-duplex mode cannot perform simultaneous transmission and reception in the same RE, and considering that the base station configures the UE to receive SS/PBCH blocks UE-specifically for reception of PDSCH transmitted from multiple TRPs of non-serving cells, this is to prioritize reception of SS/PBCH blocks over PUCCH transmission. Therefore, the UE may perform reception of SS/PBCH blocks but may not transmit the PUCCH.

UE-specific SS/PBCH block for L1 beam measurement/reporting:

When (i) resources configured UE-specifically for receiving SS/PBCH blocks for link recovery and (ii) resources scheduled or configured through a higher layer (e.g., RRC) to repeatedly transmit PUSCH or PUCCH overlap each other in RE units, the UE operation is as follows.

The UE may not expect to be indicated to transmit PUSCH through DCI format 0_0, 0_1, or 0_2 in an RE configured to receive SS/PBCH blocks. The UE operating in a half-duplex mode cannot perform simultaneous transmission and reception in the same RE, and considering that the base station configures the UE to receive SS/PBCH blocks UE-specifically for link recovery, this is to prioritize reception of SS/PBCH blocks over PUSCH transmission. Therefore, the UE may perform reception of SS/PBCH blocks and may not expect to be indicated to transmit PUSCH so that at least one RE overlaps with the SS/PBCH blocks.

The UE may not expect to be indicated to transmit PUCCH through DCI format 1_0, 1_1, or 1_2 in an RE configured to receive SS/PBCH blocks. The UE operating in a half-duplex mode cannot perform simultaneous transmission and reception in the same RE, and considering that the base station configures the UE to receive SS/PBCH blocks UE-specifically for link recovery, this is to prioritize reception of SS/PBCH blocks over PUCCH transmission. Therefore, the UE may perform reception of SS/PBCH blocks and may not expect to be indicated to transmit PUCCH so that at least one RE overlaps with the SS/PBCH blocks.

When the RE(s) configured to transmit the PUSCH from the higher layer and the RE(s) configured to receive the SS/PBCH block partially overlap, the UE may receive the SS/PBCH block, and transmit the PUSCH by rate-matching. For example, the UE may transmit the PUSCH by rate-matching for the RE to which the SS/PBCH block is mapped and the downlink-uplink switching gap symbol. This is because the UE must operate in a half-duplex manner and cannot perform simultaneous transmission and reception in the same RE unit. This method is a method that may guarantee the downlink reception and uplink transmission configured for the UE to the maximum extent possible in symbol(s) excluding collision RE(s) when the UE is configured or indicated to operate as a subband.

When the RE configured to transmit the PUSCH from the higher layer and the RE configured to receive the SS/PBCH block fully overlap, the UE may receive the SS/PBCH block but may not transmit the PUSCH. The UE operating in a half-duplex mode cannot perform simultaneous transmission and reception in the same RE, and considering that the base station configures the UE to receive SS/PBCH blocks UE-specifically for link recovery, this is to prioritize reception of SS/PBCH blocks over PUSCH transmission. Therefore, the UE may perform reception of SS/PBCH blocks but may not transmit the PUSCH.

When the RE configured to transmit the PUCCH from the higher layer and the RE configured to receive the SS/PBCH block partially overlap, the UE may receive the SS/PBCH block but may not transmit the PUCCH. This is because the UE must operate in a half-duplex manner and cannot perform simultaneous transmission and reception in the same RE unit. In addition, considering that the base station configures the UE to receive SS/PBCH blocks UE-specifically for link recovery, this is to prioritize reception of SS/PBCH blocks over PUCCH transmission. Meanwhile, when it is possible to transmit the PUSCH by rate-matching in RE units, but if even one of the scheduled symbols cannot be used for uplink transmission, PUCCH cannot be transmitted in the corresponding slot. Accordingly, the UE may perform reception of SS/PBCH blocks but may not transmit PUCCH.

When the RE configured to transmit the PUCCH from the higher layer and the RE configured to receive the SS/PBCH block fully overlap, the UE may receive the SS/PBCH block but may not transmit the PUCCH. The UE operating in a half-duplex mode cannot perform simultaneous transmission and reception in the same RE, and considering that the base station configures the UE to receive SS/PBCH blocks UE-specifically for link recovery, this is to prioritize reception of SS/PBCH blocks over PUCCH transmission. Therefore, the UE may perform reception of SS/PBCH blocks but may not transmit the PUCCH.

When the PUSCH is repeatedly transmitted for the first time in the symbol unit or RE unit collision situation, the UE may transmit the remaining repeated transmissions by rate-matching like the first repeated transmission. This is to facilitate soft combining of PUSCH repeated transmissions by the base station by allowing the UE to determine the TB size (TBS) for repeated transmissions to be the same before transmission.

In the above collision situation, if PUSCH transmission is not the first repeated transmission, the UE may not determine that the slot is a slot that allows repeated transmission, and thus may not transmit PUSCH. This is to facilitate soft combining of PUSCH repeated transmissions by the base station by allowing the UE to determine the TBS for repeated transmissions to be the same before transmission.

According to Method 2, the UE may not always determine the slot operating as a subband as a slot capable of repeated transmission. That is, if the UE is configured or indicated to repeatedly transmit PUSCH or PUCCH in multiple slots, the UE may determine only the slot not operating as a subband as a slot capable of repeated transmission.

(4-4) Uplink Transmission and HARQ Process Number (HPN)

One of the problems to be solved in the disclosure is a method for determining an HPN when a UE is indicated to transmit multiple PUSCHs in multiple slots with one DCI in a slot or symbol(s) configured as a subband. Here, the multiple PUSCHs may be PUSCHs including different TBs. For example, a DCI scheduling M PUSCHs may be received in slot n. In this case, when K2=3 and M=4, PUSCH transmissions may be scheduled in slot n+3, slot n+4, slot n+5, and slot n+6. The UE may be configured with independent an SLIV value for the PUSCH of each slot. For example, the UE may be configured with M=4 SLIV value through the TDRA field in the DCI.

Basically, in a NR-based system, when the UE is scheduled for multiple PUSCHs through one DCI, the method for determining the HPN of each PUSCH is as follows. The UE may determine the value indicated in the "HARQ process ID" field in the DCI that schedules multiple PUSCHs as the HPN of a first PUSCH. Here, the first PUSCH may be the PUSCH that is the earliest in the time domain among the multiple PUSCHs, i.e., the PUSCH transmitted in the slot indicated by the K2 value. Here, the first PUSCH is a PUSCH that does not overlap with a cell-specific downlink symbol, a UE-specific downlink symbol, or a symbol for receiving an SS/PBCH block configured with ssb-PositionsInBurst. The UE increments the HPN by 1 for the subsequent PUSCH(s). When any symbol of the subsequent PUSCH overlaps with the cell-specific downlink symbol, the UE-specific downlink symbol, or the symbol for receiving an SS/PBCH block configured with ssb-PositionsInBurst, the UE does not increase the HPN for the corresponding PUSCH.

Figure 36:
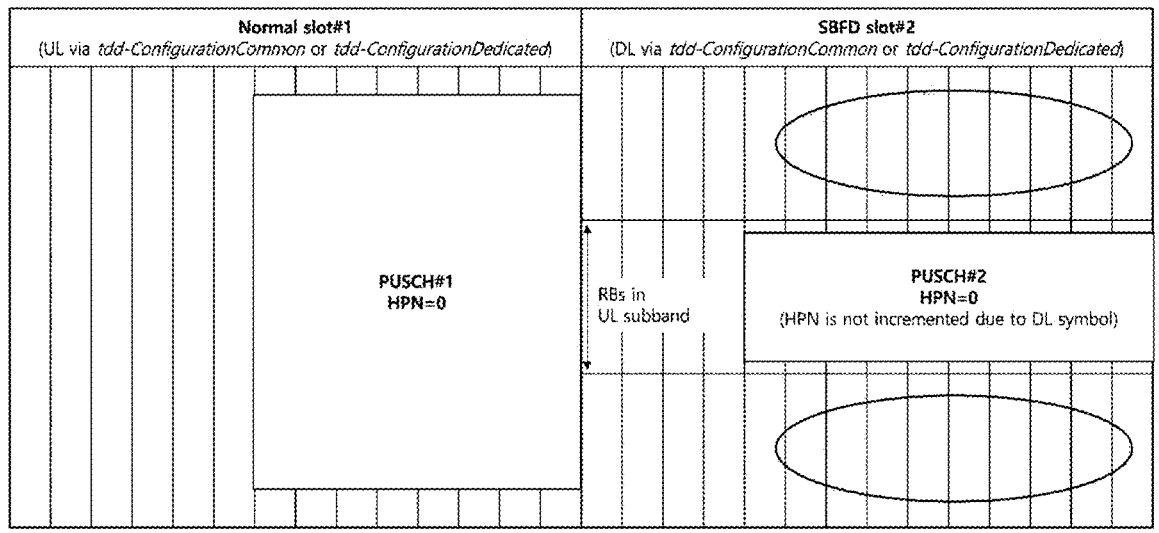

FIG. 36 illustrates a problem when a UE is indicated to transmit multiple PUSCHs in multiple slots with one DCI in a slot or symbol(s) in which the UE operates as a subband. The UE may determine the HPN of PUSCH #1 scheduled in normal slot #1 or configured through a higher layer (e.g., RRC) as the value (e.g., HPN=0) indicated in the "HARQ process ID" field in the DCI. The subsequent slot, SBFD slot #2, may be configured or indicated for the UE to operate as a subband for a cell-specific or UE-specific downlink symbol. In this case, the symbol scheduled for PUSCH #2 or configured through RRC overlaps with the cell-specific downlink symbol or the UE-specific downlink symbol (circle) on the downlink subband in a symbol unit basis. Therefore, despite transmitting TB different from the previous PUSCH #1 because the UE may transmit PUSCH #2, HPN does not increase according to the prior art (i.e., HPN=0). In this case, since the UE uses the same HPN for PUSCH #1 and PUSCH #2 having different TBs, an HPN collision problem may occur. Therefore, when the base station indicates the UE to retransmit either PUSCH #1 or PUSCH #2, ambiguity may occur as to which PUSCH the UE indicates retransmission.

Figure 37:
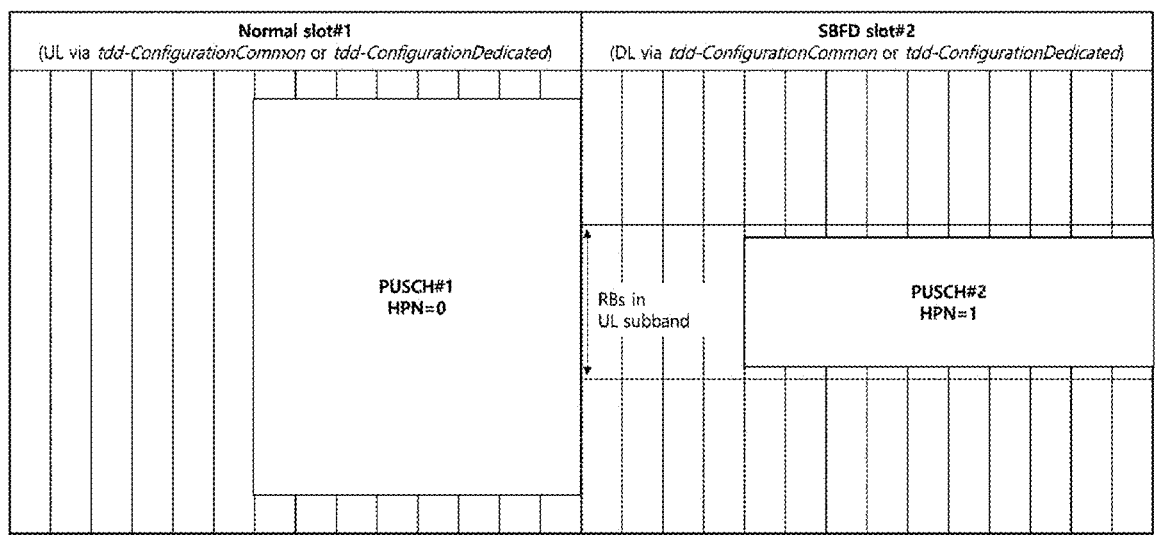

An example of the disclosure for solving this problem is illustrated in FIG. 37. The UE may be configured to operate as a subband, and may be scheduled with multiple PUSCHs in different slots through one DCI or scheduled with multiple PUSCHs in different slots through RRC. In this case, the HPN of the PUSCH transmitted in each slot may be determined as follows by additionally considering the availability of the corresponding PUSCH resource in the time domain, i.e., symbol unit, as well as the availability of the corresponding PUSCH resource in the frequency domain, i.e., RB unit.

The UE may determine the value indicated in the "HARQ process ID" field in the DCI scheduling multiple PUSCHs as the HPN of the first PUSCH. Here, the first PUSCH may be the PUSCH transmitted in the slot indicated by the K2 value, which is the earliest PUSCH among the multiple PUSCHs in the time domain, or may be the slot closest to the slot indicated by the K2 value among the slots in which PUSCH transmission is possible. Here, the first PUSCH 1) must be within an uplink symbol capable of uplink transmission or an RB belonging to an uplink subband, and 2) is a PUSCH that does not overlap with a cell-specific downlink symbol or a UE-specific downlink symbol included in an RB (i.e., an RB within a downlink subband or a guard band) that is not an uplink subband, and/or does not overlap with a symbol for reception of an SS/PBCH block configured with ssb-PositionsInBurst in an RB (i.e., an RB within a downlink subband or a guard band) that is not an uplink subband.

The UE increments the HPN by 1 for the subsequent PUSCH(s). If any symbol of the subsequent PUSCH overlaps with a cell-specific downlink symbol or a UE-specific downlink symbol included in an RB (i.e., an RB within a downlink subband or a guard band) other than an uplink subband, or overlaps with a symbol for receiving an SS/PBCH block configured with ssb-PositionsInBurst included in an RB (i.e., an RB within a downlink subband or a guard band) other than an uplink subband, the HPN is not increased for the PUSCH.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment (UE) configured to operate in a wireless communication system, the UE comprising:
a communication module; and
a processor, wherein the processor is configured to:
receive a time division duplex uplink-downlink (TDD UL-DL) configuration including a slot format, the slot format including at least a semi-static DL symbol, a semi-static flexible symbol or a semi-static UL symbol; and
transmit physical UL channel repetitions over multiple slots, the multiple slots including at least one normal slot and at least one subband non-overlapping full duplex (SBFD) slot,
wherein when semi-static DL symbols allocated for a physical UL channel repetition in a slot are normal symbols, the physical UL channel repetition is not transmitted,
wherein when the semi-static DL symbols allocated for the physical UL channel repetition in the slot are all SBFD symbols and not include a symbol of a synchronization signal and physical broadcast channel (SS/PBCH) block, the physical UL channel repetition is transmitted on the semi-static DL symbols, and
wherein when the semi-static DL symbols allocated for the physical UL channel repetition in the slot are all SBFD symbols and include the symbol of the SS/PBCH block, a transmission of the physical UL channel repetition is restricted at least on the symbol of the SS/PBCH block.

2. The UE of claim 1, wherein a SBFD symbol includes DL usable resource blocks (RBs) and UL usable RBs in a frequency domain.

3. The UE of claim 1, wherein a SBFD symbol includes DL usable resource blocks (RBs) and UL usable RBs in a frequency domain.

4. The UE of claim 3, wherein the physical UL channel repetition is placed within the UL usable RBs in the SBFD symbol.

5. The UE of claim 1, wherein the physical UL channel repetitions include physical uplink shared channel (PUSCH) repetitions or physical uplink control channel (PUCCH) repetitions.

6. The UE of claim 1, wherein when a channel state information reference signal (CSI-RS) resource is divided by UL usable RBs in a SBFD symbol, a channel measurement is performed only on a CSI-RS resource part on DL usable RBs in the SBFD symbol.

7. The UE of claim 1, wherein the processor is configured to receive resource allocation information, and
wherein an interpretation of frequency domain resource scheduled by the resource allocation information is determined based on whether symbols scheduled by the resource allocation information are normal symbols or SBFD symbols.

8. The UE of claim 1, wherein the physical UL channel repetitions include physical uplink shared channel (PUSCH) repetitions, and a hybrid ARQ process number (HPN) for each PUSCH repetition,
wherein when the semi-static DL symbols allocated for a PUSCH repetition in the slot are normal symbols, the HPN of the PUSCH repetition is maintained, and
wherein when the semi-static DL symbols allocated for the PUSCH repetition in the slot are all SBFD symbols, the HPN of the PUSCH repetition is changed.

9. A method performed by a user equipment (UE) configured to operate in a wireless communication system, the method comprising:
receiving a time division duplex uplink-downlink (TDD UL-DL) configuration including a slot format, the slot format including at least a semi-static DL symbol, a semi-static flexible symbol or a semi-static UL symbol; and
transmitting physical UL channel repetitions over multiple slots, the multiple slots including at least one normal slot and at least one subband non-overlapping full duplex (SBFD) slot,
wherein when semi-static DL symbols allocated for a physical UL channel repetition in a slot are normal symbols, the physical UL channel repetition is not transmitted,
wherein when the semi-static DL symbols allocated for the physical UL channel repetition in the slot are all SBFD symbols and not include a symbol of a synchronization signal and physical broadcast channel (SS/PBCH) block, the physical UL channel repetition is transmitted on the semi-static DL symbols, and
wherein when the semi-static DL symbols allocated for the physical UL channel repetition in the slot are all SBFD symbols and include the symbol of the SS/PBCH block, a transmission of the physical UL channel repetition is restricted at least on the symbol of the SS/PBCH block.

10. The method of claim 9, wherein a SBFD symbol includes DL usable resource blocks (RBs) and UL usable RBs in a frequency domain.

11. The method of claim 9, wherein a SBFD symbol includes DL usable resource blocks (RBs) and UL usable RBs in a frequency domain.

12. The method of claim 11, wherein the physical UL channel repetition is placed within the UL usable RBs in the SBFD symbol.

13. The method of claim 9, wherein the physical UL channel repetitions include physical uplink shared channel (PUSCH) repetitions or physical uplink control channel (PUCCH) repetitions.

14. The method of claim 9, wherein when a channel state information reference signal (CSI-RS) resource is divided by UL usable RBs in a SBFD symbol, a channel measurement is performed only on a CSI-RS resource part on DL usable RBs in the SBFD symbol.

15. The method of claim 9, wherein the processor is configured to receive resource allocation information, and
wherein an interpretation of frequency domain resource scheduled by the resource allocation information is determined based on whether symbols scheduled by the resource allocation information are normal symbols or SBFD symbols.

16. The method of claim 9, wherein the physical UL channel repetitions include physical uplink shared channel (PUSCH) repetitions, and a hybrid ARQ process number (HPN) for each PUSCH repetition,
wherein when the semi-static DL symbols allocated for a PUSCH repetition in the slot are normal symbols, the HPN of the PUSCH repetition is maintained, and
wherein when the semi-static DL symbols allocated for the PUSCH repetition in the slot are all SBFD symbols, the HPN of the PUSCH repetition is changed.

* * * * *